(12) United States Patent
Hitomi et al.

(10) Patent No.: US 7,784,443 B2
(45) Date of Patent: *Aug. 31, 2010

(54) SPARK-IGNITION GASOLINE ENGINE

(75) Inventors: Mitsuo Hitomi, Fuchu-cho (JP);
Noriyuki Iwata, Fuchu-cho (JP);
Masahisa Yamakawa, Fuchu-cho (JP);
Toshiaki Nishimoto, Fuchu-cho (JP);
Takashi Yohso, Fuchu-cho (JP);
Takayoshi Hayashi, Fuchu-cho (JP)

(73) Assignee: Mazda Motor Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/362,645

(22) Filed: Jan. 30, 2009

(65) Prior Publication Data

US 2009/0159045 A1 Jun. 25, 2009

Related U.S. Application Data

(62) Division of application No. 11/727,890, filed on Mar. 28, 2007, now Pat. No. 7,484,498.

(30) Foreign Application Priority Data

| Mar. 31, 2006 | (JP) | ............................. 2006-100952 |
| Mar. 31, 2006 | (JP) | ............................. 2006-100954 |
| Feb. 20, 2007 | (JP) | ............................. 2007-039897 |
| Feb. 20, 2007 | (JP) | ............................. 2007-039898 |

(51) Int. Cl.
*F02P 5/15* (2006.01)
*F02B 75/10* (2006.01)

(52) U.S. Cl. ............. 123/406.47; 123/316; 123/406.48; 123/406.59

(58) Field of Classification Search ............ 123/406.29, 123/406.3, 406.45, 406.47, 406.48, 568.11, 123/568.14, 568.21, 295, 299, 305, 316, 123/406.58, 406.59; 701/101–105, 108, 701/110, 111
See application file for complete search history.

(56) References Cited

U.S. PATENT DOCUMENTS 4,696,273 A * 9/1987 Otobe et al. ........... 123/406.65

(Continued)

FOREIGN PATENT DOCUMENTS

JP 2001020744 A * 1/2001 ................. 123/305

(Continued)

*Primary Examiner*—Willis R Wolfe, Jr.
(74) *Attorney, Agent, or Firm*—Studebaker & Brackett PC; Donald R. Studebaker

(57) ABSTRACT

A spark-ignition gasoline engine having at least a spark plug, the engine including an engine body having a geometrical compression ratio set at 14 or more, and an intake valve and an exhaust valve provided, respectively, in intake and exhaust ports connected to each of a plurality of cylinders of the engine body. The intake and exhaust valves are adapted to open and close corresponding respective ones of the intake and exhaust ports. The engine further includes an operation-state detector adapted to detect an operation state of the engine body and a control system adapted, based on detection of the operation-state detector, to perform at least an adjustment control of an ignition timing of the spark plug, the control system being operable, when an engine operation zone is a high-load operation zone including a wide open throttle region within at least a low speed range, to retard the ignition timing to a point within a predetermined stroke range just after a top dead center of a compression stroke.

21 Claims, 32 Drawing Sheets

U.S. PATENT DOCUMENTS

| | | |
|---|---|---|
| 4,958,606 A | 9/1990 | Hitomi et al. |
| 5,443,050 A | 8/1995 | Hitomi et al. |
| 5,884,605 A * | 3/1999 | Nagaishi et al. ........ 123/406.29 |
| 6,508,229 B2 * | 1/2003 | Miyakubo et al. ............ 123/305 |
| 6,769,404 B2 * | 8/2004 | Aoyama et al. ........ 123/406.29 |
| 6,830,020 B1 | 12/2004 | El Tahry et al. |
| 6,968,825 B2 * | 11/2005 | Hitomi et al. ............ 123/406.3 |
| 7,121,255 B2 | 10/2006 | Liu et al. |
| 7,484,498 B2 * | 2/2009 | Hitomi et al. .......... 123/406.45 |
| 2006/0169246 A1 | 8/2006 | Asai |

FOREIGN PATENT DOCUMENTS

| | | |
|---|---|---|
| JP | 2005-076579 | 3/2005 |
| JP | 2005-146991 | 6/2005 |

* cited by examiner

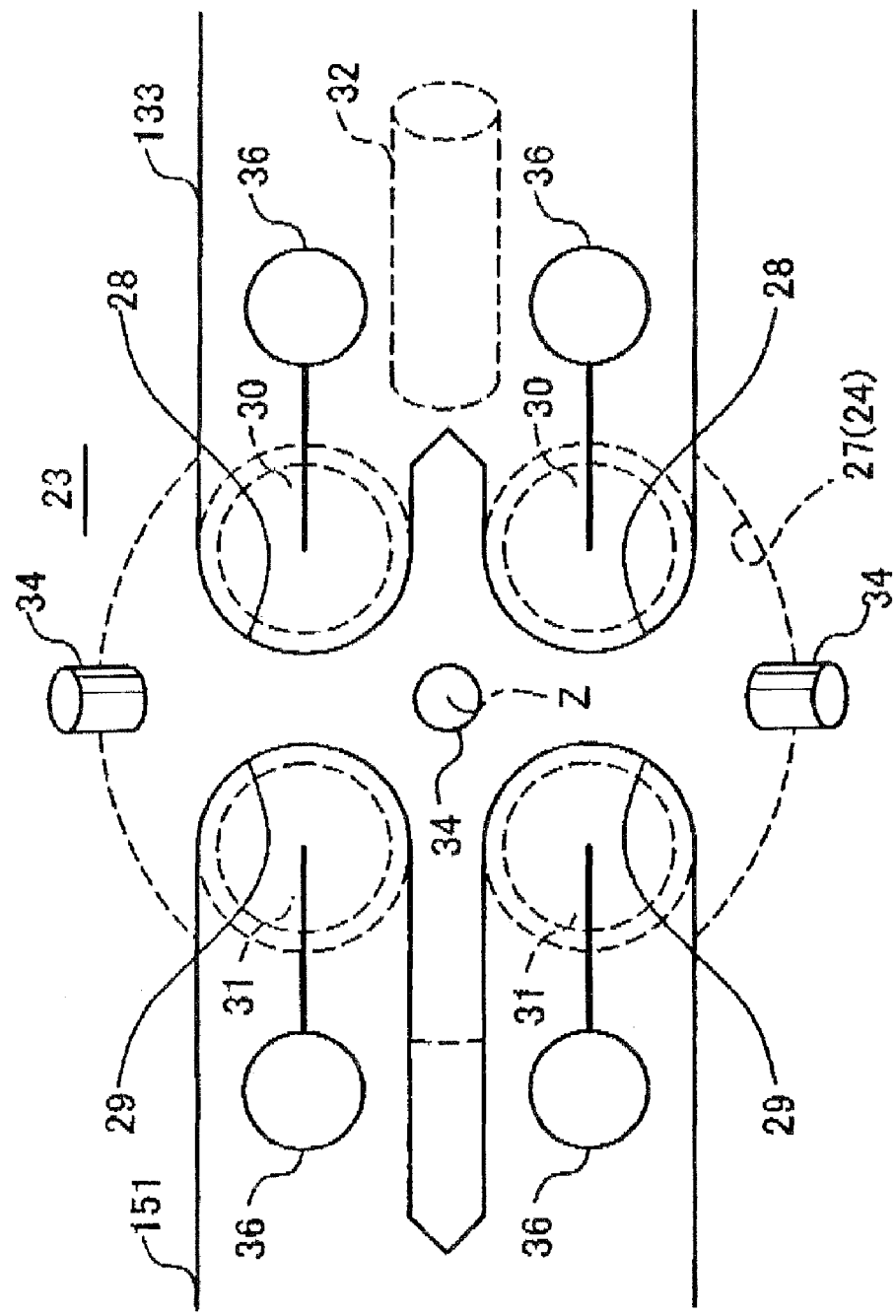

SPARK-IGNITION GASOLINE ENGINE

This application is a divisional application of U.S. application Ser. No. 11/727,890, filed Mar. 28, 2007.

BACKGROUND OF THE INVENTION

1. Field of the Invention

The present invention relates to a spark-ignition gasoline engine.

2. Description of the Related Art

A spark-ignition gasoline engine is regarded as following an Otto Cycle in theory, wherein its theoretical thermal efficiency $\eta_{th}$ is expressed by the following Formula, as disclosed, for example, in "Internal Combustion Engine Fundamentals" (Document D1) authored by John B. Heywood:

$$\eta_{th} = 1 - (1/\epsilon^{\kappa-1}) \quad (1)$$

wherein $\epsilon$ is a compression ratio, and $\kappa$ is a specific heat ratio.

As is clear from Formula (1), the theoretical thermal efficiency (i.e., indicated, net thermal efficiency) of the spark-ignition gasoline engine is improved up to a certain level as the compression ratio is set at a higher value. In this relation, the Document D1 reports a research on changes in theoretical thermal efficiency at various compression ratios ($8 \leq \epsilon \leq 20$) under the conditions that a spark-ignition gasoline engine is operated at wide open throttle (WOT) and 2000 rpm. The report says that each of the theoretical thermal efficiency and a mean effective pressure (MEP) goes up in proportion to an increase in compression ratio up to around 17, and then remains on the same level despite a further increase in compression ratio.

Based on the above research result, great efforts have been made for practical realization of an engine with a higher compression ratio (i.e., high-compression engine).

In reality, a high-compression spark-ignition engine inevitably involves lowering of engine power due to engine knock occurring in a high-load operation zone including a wide open throttle region.

As conventional measures against this problem, there has been widely known an ignition retarding control of retarding an ignition timing. However, it has been considered that a technique of avoiding knock based on the ignition retarding control causes excessive lowering of engine power in a high-load operation zone and critical deterioration in merchantability.

FIG. 1 is a graph showing one example of the ignition retarding control in a high-load operation zone.

As shown in FIG. 1, for example, in a usual compression ratio ($\epsilon=11$) which is widely employed in conventional engines, no knock occurs when the ignition timing is set at 4 degrees (CA) before a top dead center of a compression stroke (hereinafter referred to as "compression TDC"). By contrast, in a high compression ratio ($\epsilon=13$), a knock occurs even when the ignition timing is set at 4 degrees before a compression TDC. Therefore, it has been considered that a high compression ratio has to be employed in combination with a greater amount of ignition timing retard. This led to one conclusion that a decrease in engine power due to ignition timing retard required for preventing the occurrence of knock at an increased compression ratio of about 13 goes beyond an increase in engine power provided by the increased compression ratio. Thus, in consideration of lowering in engine power due to ignition timing retard, conventional high-compression engines have been designed to set an upper limit of compression ratio at 12 for a high-load operation zone including a wide open throttle region, and avoid using a higher compression ratio than the upper limit in the high-load operation zone.

As to a high-load operation zone including a wide open throttle region, there has been known a technique of reducing an effective compression ratio using a so-called "Atkinson Cycle" or "Miller Cycle". However, if the effective compression ratio is reduced by changing an intake-valve closing timing during a high-load operation, an in-cylinder pressure is lowered in an intake stroke due to loss of fresh air to cause deterioration in charging efficiency and lowering in engine power.

With a view to avoiding this problem, there has also been known a technique of reducing a geometrical compression ratio of an engine in a high-load operation zone including a wide open throttle region. For example, JP 2005-076579A (Document D2) and JP 2005-146991A (Document D3) disclose a technique of changing a geometrical compression ratio depending on engine operation states by use of a variable compression ratio mechanism provided in an engine.

The technique disclosed in the Documents D2, D3 is designed to reduce a compression ratio in a wide open throttle region so as to avoid the occurrence of knock. Therefore, an approach to high compression ratio in spark-ignition gasoline engines has been obliged to choice between only two techniques: one achieved at the sacrifice of engine power; and the other achieved at the sacrifice of cost.

Moreover, the use of a mechanism for changing a geometrical compression ratio, as disclosed in the Documents D2, D3, leads to structural complexity of an engine and increase in cost.

In view of the above problems, it is an object of the present invention to provide a spark-ignition gasoline engine having both a low-cost performance and a high engine-power performance even in a high-load operation zone (particularly wide open throttle region) in a low speed range.

SUMMARY OF THE INVENTION

As a result of various researches, the inventors found that, in an engine having a high compression ratio ($\epsilon=13$ or more) at a level necessary for an ignition timing defined as a knock limit to be set at a point after a compression TDC, a cool-flame reaction in cylinders becomes prominent after a compression TDC to allow an increase in engine power provided by an increased compression ratio to become far greater than a decrease in engine power due to ignition timing retard. Based on this knowledge, the inventors have accomplished the present invention.

Specifically, in order to achieve the above object, the present invention provides a spark-ignition gasoline engine having at least a spark plug, which comprises an engine body having a geometrical compression ratio set at 14 or more, an intake valve and an exhaust valve which are provided, respectively, in intake and exhaust ports connected to each of a plurality of cylinders of the engine body, and adapted to open and close corresponding ones of the intake and exhaust ports, operation-state detection means adapted to detect an engine operation state, and control means adapted, based on detection of the operation-state detection means, to perform at least an adjustment control of an ignition timing of the spark plug, and an adjustment control of an effective compression ratio by means of an adjustment control of a closing timing of the intake valve. The control means is operable, when an operation zone of the engine body is a high-load operation zone including a wide open throttle region within at least a low speed range, to adjust a closing timing of the intake valve in such a manner as to maintain the effective compression ratio at 13 or more, and retard the ignition timing to a point within a predetermined stroke range just after a top dead center of a compression stroke. The effective compression ratio is calculated based on an intake-valve closing timing defined by a valve lift amount of 1 mm.

According to the present invention, even in an engine operation zone where it has been generally believed that a large amount of ignition timing retard is essentially required for preventing knock, the effective compression ratio calculated based on an intake-valve closing timing defined by a valve lift amount of 1 mm can be maintained at 13 or more to allow the engine to be operated while keeping high torque and fuel economy. Specifically, in an engine having an ignition timing retarded to a point after a compression TDC to avoid knock, a cool-flame reaction becomes prominent in cylinders after a compression TDC, and a multistage flaming phenomenon occurs in a combustion process after the compression TDC. This makes it possible to maintain a heat generation rate (dQ/dθ) while reducing a combustion time loss, so as to obtain a sufficient torque. The maintained heat generation rate also makes it possible to minimize an amount of ignition timing retard. Further, in the combustion process with the cool-flame reaction, a mol-number (i.e., the number of moles of in-cylinder gas) is increased to moderate an increase in in-cylinder temperature in spite of an increase in in-cylinder pressure. In addition, the cool-flame reaction occurs in a central region of a combustion chamber but the occurrence is less prominent in an end gas region. Thus, the increase in in-cylinder temperature is further suppressed. Under such temperature conditions, formaldehyde (HCHO) can be produced to facilitate consumption of OH radicals causing knock, so as to further suppress autoignition. In a design process of increasing a compression ratio in an engine operation zone which is a high-load operation zone including a wide open throttle (WOT) region within at least a low speed range, the above anti-knock mechanism can be incorporated to provide an improvement in thermal efficiency based on the cool-flame reaction which is enough to compensate for lowering in engine power due to ignition timing retard, and obtain fuel economy closer to those of diesel engines without sacrificing engine power. Further, the engine is designed to reduce the effective compression ratio by means of controllably adjusting the closing timing of the intake valve. This can eliminate the need for employing a complicate mechanism for changing a geometrical compression ratio.

As above, the engine of the present invention can avoid knock while maintaining a high compression ratio in an engine operation zone where an effective compression ratio has been conventionally lowered using a costly mechanism or an adjustment control of intake-valve closing timing while sacrificing engine power. Thus, the present invention has significant advantages of being able to satisfy both cost performance and high engine power performance and obtain fuel economy closer to those of diesel engines.

These and other objects, features and advantages of the invention will become more apparent upon reading the following detailed description along with the accompanying drawings.

BRIEF DESCRIPTION OF THE DRAWINGS

FIG. 15 is a schematic enlarged top plan view of the cylinder in FIG. 14.

DESCRIPTION OF THE PREFERRED EMBODIMENTS

Combustion/Power Creation Mechanism of High-Compression Engine

A relationship between high compression ratio and knock suppression in the present invention will be specifically described below.

Figure 2:
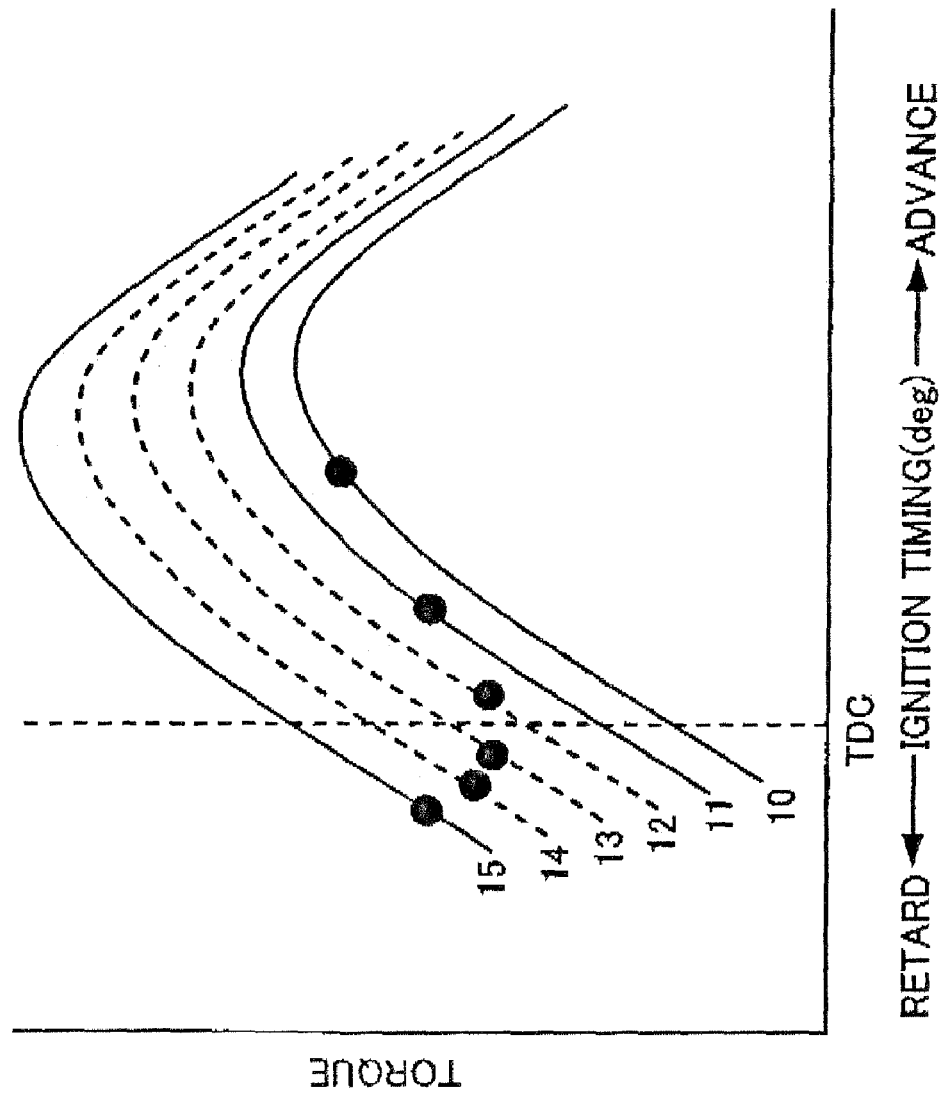
FIG. 2 is a graph showing a relationship between a crank angle and a torque to explain a hypothesis in a development process concerning the present invention.

In a course of researches on a relationship between knock and geometrical compression ratio, the inventors found a phenomenon that, when a compression ratio is increased up to a level necessary for a knock limit (i.e., an ignition timing at which knock starts occurring) to be set at a point after a compression TDC, an amount of ignition timing retard required for preventing knock becomes smaller to allow an increase in engine power provided by an increased compression ratio to become far greater than a decrease in engine power due to the ignition timing retard for preventing knock. As to this phenomenon, the inventors made a hypothesis that, when a compression ratio is increased up to 13 or more, the above retard amount gradually decreases within a relatively small stroke range, as indicated by the circular marks in FIG. 2.

This hypothesis was based on a concept that, when an ignition timing is retarded to a point after a compression TDC, although an in-cylinder pressure/temperature is increased once due to an increase in compression ratio, the ignition retard allows a piston to be rapidly moved downward before autoignition occurs in end gas residing in the cylinder, so as to lower the in-cylinder pressure/temperature to suppress the occurrence of autoignition.

In order to verify this hypothesis, the inventors simulated a relationship between an indicated mean effective pressure (IMEP) and an igniting timing, based on numerical simulation. As a result, a graph illustrated in FIG. 3 was obtained.

Figure 3:
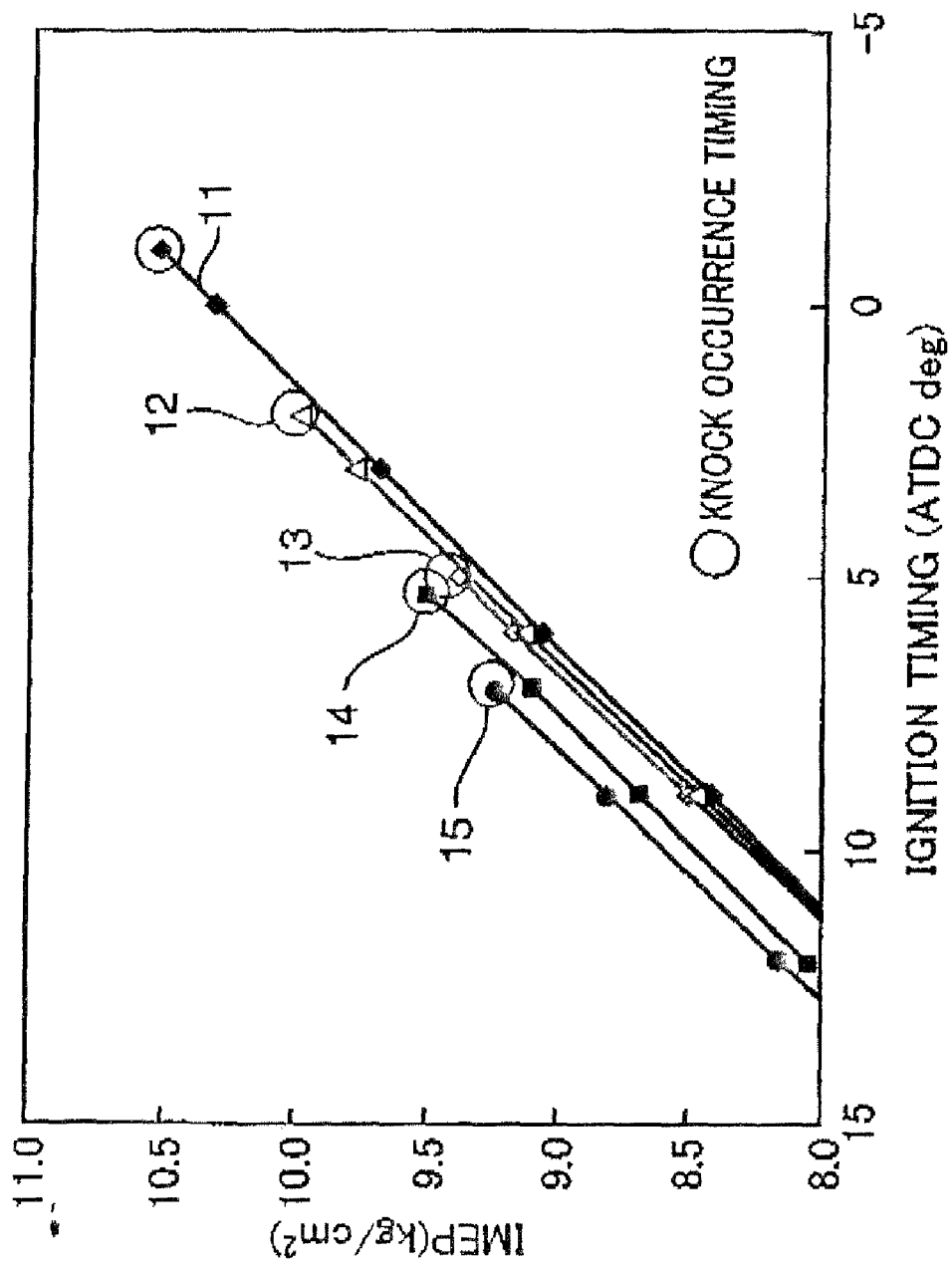
FIG. 3 is a graph showing a simulation result presenting a relationship between an ignition timing and an indicated mean effective pressure (IMEP).

As shown in FIG. 3, the numerical simulation result showed that the IMEP slightly increases in each comparison between the characteristic lines for respective compression ratios of 11 and 12 and between the characteristic lines for respective compression ratios of 12 and 13, whereas the IMEP largely increases in a comparison between the characteristic lines for respective compression ratios of 13 and 14, and an increase rate of the IMEP in a comparison between the characteristic lines for respective compression ratios of 14 and 15 becomes smaller than that in the comparison between the characteristic lines for respective compression ratios of 13 and 14. In order to verify this change in engine power, the inventors checked a heat generation rate in each compression ratio.

Figure 4:
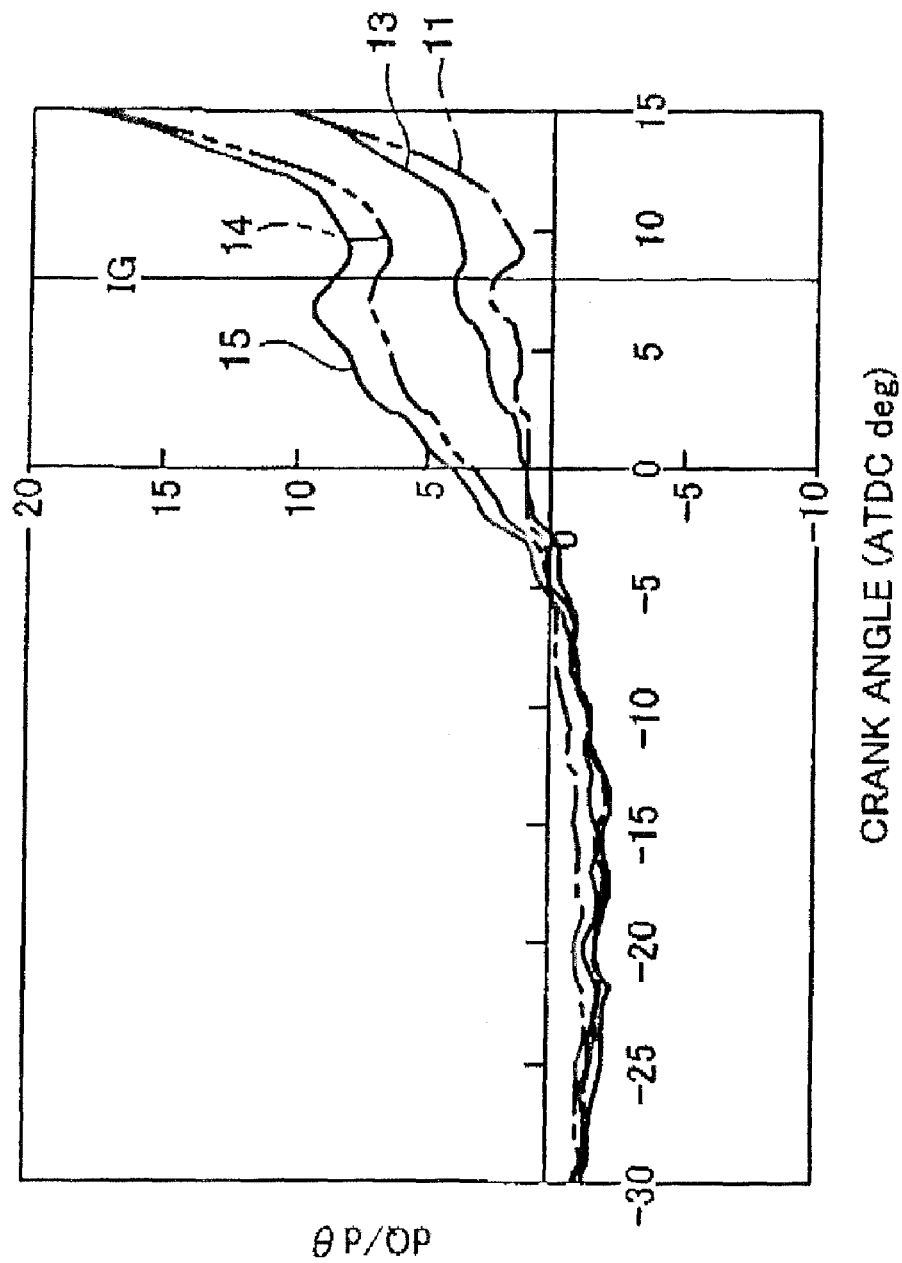
FIG. 4 is a graph showing a relationship between a heat generation rate and a crank angle in various engines having compression ratios of 11, 13, 14 and 15, wherein an ignition timing is set at 8 CA degrees after a compression TDC.

As shown in FIG. 4, the heat generation rate in each of the characteristic curves for respective compression ratios of 11 and 13 slightly increases in a crank angle (CA) range of from a compression TDC to an ignition timing, whereas the heat generation rate in the characteristic curve for a compression ratio of 14 largely increases just before the ignition timing. From this result, it was proven that, when the compression ratio is set at a high value ranging from a first value ($\epsilon=13$ in an engine using fuel with a research octane number of 96, i.e., 96 RON) to a second value ($\epsilon=14$ in an engine using fuel with 96 RON), an increase in in-cylinder pressure due to an upward movement of a piston produces a cool-flame reaction with a slight exothermic reaction which generates heat greater than a cooling loss caused by a peripheral wall defining a combustion chamber.

From the results illustrated in FIGS. 3 and 4, it was proved that, when the compression ratio is set at the high value and the ignition timing is retarded to a point after the compression TDC, a multistage flaming phenomenon occurs in a combustion process after the compression TDC, and the cool-flame reaction becomes prominent, particularly in a specific compression ratio (e.g., a geometrical compression ratio of 14 in an engine using fuel with 96 RON). The following description will be made about an anti-knock effect of the cool-flame reaction.

Figure 5:
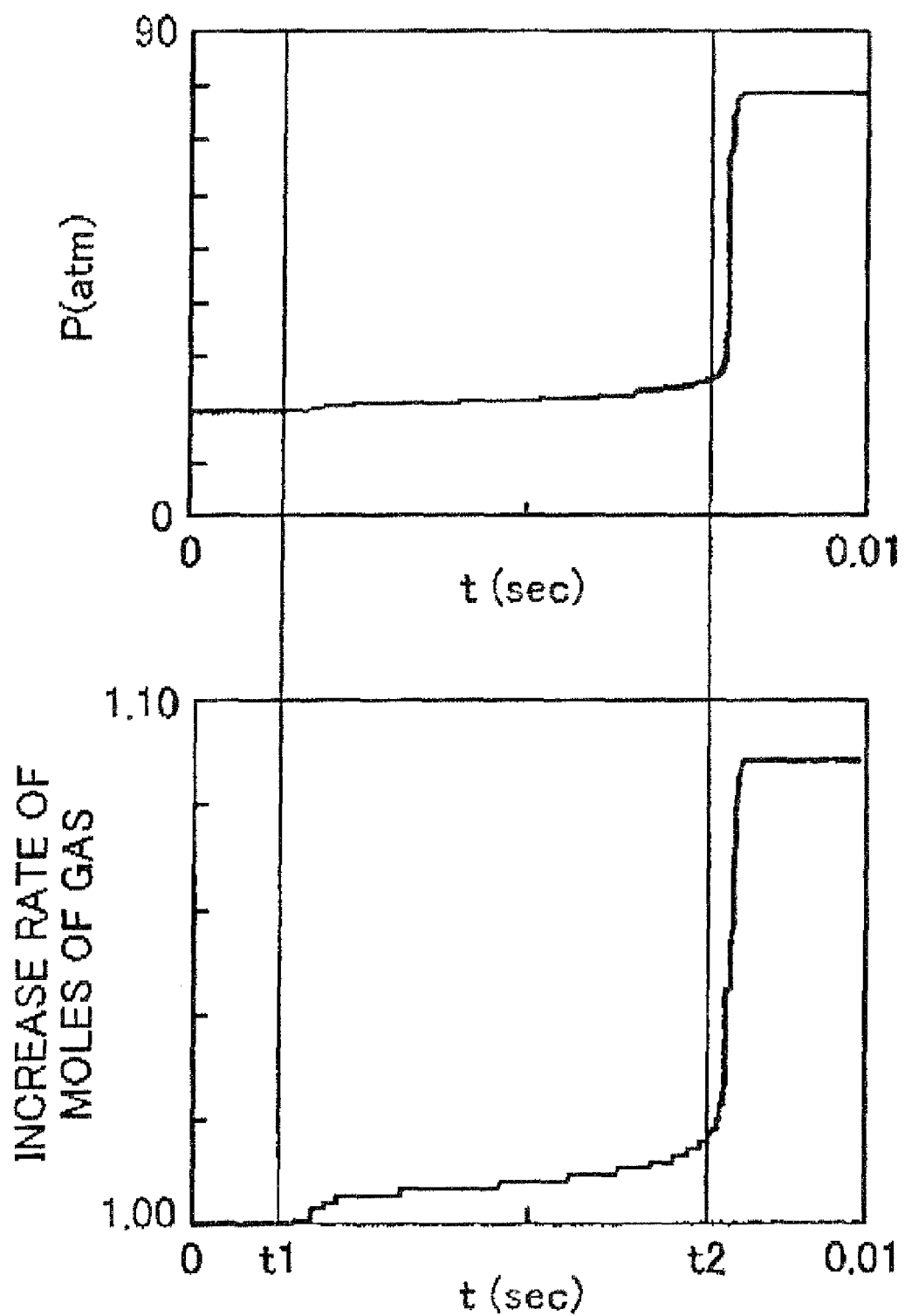
FIG. 5 is graphs obtained by simulating a combustion process after a compression TDC in an engine with a high compression ratio, wherein an upper graph shows a relationship between an in-cylinder pressure and an elapsed time, and a lower graph shows a relationship between a mol-number increase rate and an elapsed time.

FIG. 5 is graph obtained by simulating a combustion process after a compression TDC in an engine with a high compression ratio, wherein an upper graph shows a relationship between an in-cylinder pressure and an elapsed time, and a lower graph shows a relationship between an increase rate of the number of moles of gas (hereinafter referred to as "mol-number increase rate") and an elapsed time. These simulated values were obtained by preparing a high-temperature/high-pressure vessel with a fixed volume, and calculating respective changes of an in-cylinder pressure and a mole number in a time-series manner.

As shown in FIG. 5, when the elapsed time reaches t1 after a piston passes beyond the compression TDC, the cool-flame reaction occurs to slightly increase the in-cylinder pressure. During the cool-flame reaction period, the mole number will increase under the condition of a constant volume, and therefore no temperature rise causing an increase in in-cylinder pressure occurs, as evidenced by the following ideal gas state equation:

$$PV = nRT \qquad (1\text{-}1)$$

wherein P is a pressure; V is a volume; n is a mol number; R is a gas constant; and T is a temperature.

Thus, as to the in-cylinder temperature, no temperature rise causing an increase in in-cylinder pressure occurs even in end gas residing in the cylinder, and therefore autoignition can be suppressed. Then, in the combustion chamber (fixed-volume vessel), at a time (t2) after an elapse of a given time, a hot-flame reaction occurs as a chain reaction to increase the in-cylinder pressure. In this manner, the multistage flaming phenomenon occurs.

Figure 6:
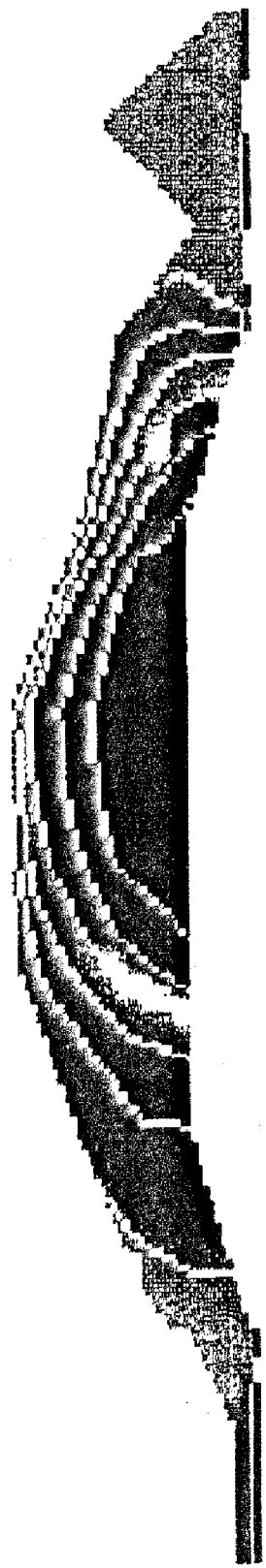
FIG. 6 is a contour map showing a temperature distribution in a combustion chamber at a time when a piston reaches a compression TDC.

Then, at a time when the piston reaches the compression TDC, the in-cylinder temperature changes as shown in FIG. 6.

As illustrated in FIG. 6, while a central region of the combustion chamber at the time when the piston reaches the compression TDC has a high temperature due to the cool-flame combustion, a peripheral region (end-gas region) of the combustion chamber is kept at about 800 K, because the cool-flame reaction cannot smoothly extend thereto due to a relatively low temperature of a cylinder wall. Thus, during the cool-flame reaction period, the combustion will progress while allowing the in-cylinder temperature in the peripheral region to be kept at a relatively low value, and therefore knock can be suppressed.

In the time period where the cool-flame reaction progresses in the combustion chamber, formaldehyde (HCHO) will be created. This formaldehyde functions to absorb OH radicals causing knock so as to further suppress knock.

Figure 7:
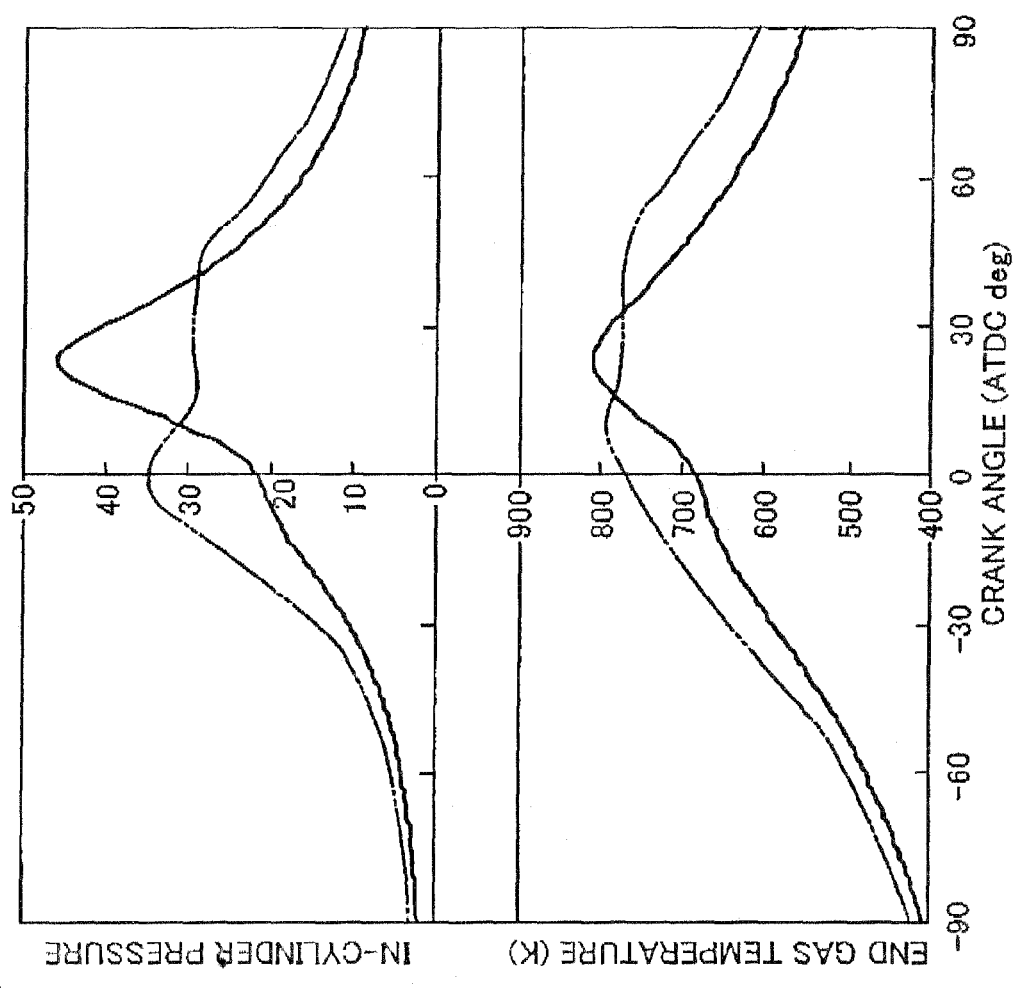
FIG. 7 is graphs showing an in-cylinder pressure and an adiabatic compression temperature history in an end-gas region (i.e., peripheral region) of a combustion chamber, during combustion, wherein an upper graph shows a relationship between an in-cylinder pressure and a crank angle, and a lower graph shows a relationship between an end-gas temperature and a crank angle.

FIG. 7 is graphs showing an in-cylinder pressure and an adiabatic compression temperature history in an end-gas region (i.e., peripheral region) of a combustion chamber, during combustion, wherein an upper graph and a lower graph show respective relationships between an in-cylinder pressure and a crank angle and between an end-gas temperature and a crank angle, and a solid line and a two-dot chain line indicate respective characteristics of a port fuel injection-type engine and a direct fuel injection-type engine.

As shown in FIG. 7, in a course where a piston of a certain cylinder is moved from a bottom dead center of a compression stroke (hereinafter referred to as "compression BDC") to a bottom dead center of an expansion stroke (hereinafter referred to as "expansion BDC") through a compression TDC, an in-cylinder pressure increases in a given CA range after the compression TDC, and therefore an in-cylinder temperature increases at the same timing as that of the increase in in-cylinder pressure. However, as long as an intake-air temperature is not extremely high, a temperature in an end-gas region of a combustion chamber never becomes greater than 900 K. From the above results, it was proved that, in the engine having a high compression ratio in a level necessary for an ignition timing defined a knock limit to be set at a point after a compression TDC, the multistage flaming phenomenon also occurs, and formaldehyde created in the cool-flame reaction effectively contributes to suppression of knock.

As described above, it was verified that, in the engine having a high compression ratio in a level necessary for an ignition timing defined as a knock limit to be set at a point after a compression TDC, the following points act as an anti-knock mechanism:

(1) The cool-flame reaction allows a combustion chamber to have no temperature rise causing an increase in in-cylinder pressure;

(2) The cool-flame reaction is produced primarily in a central region of the combustion chamber to allow a temperature in an end-gas region to be kept at a relatively low value; and (3) The combustion chamber is kept at a given temperature (900 K) or less even after a piston passes beyond a compression TDC, to allow formaldehyde to consume OH radicals.

Then, the inventors added the above anti-knock mechanism to a calculation based on a conventional chemical reaction, to calculate a knock limit.

The circular marks in FIG. 3 indicate a simulation result of the knock limit in each compression ratio. As indicated by the circular marks in FIG. 3, it was proven that, as to knock limits in the characteristic lines for respective compression ratios of 11, 12, 13, 14 and 15, a retard amount in a comparison between the knock limits in respective compression ratios of 11 and 12 increases in substantially the same level as that in a comparison between the knock limits in respective compression ratios of 12 and 13, whereas the retard amount in a comparison between the knock limits in respective compression ratio at 13 and 14 has almost no change. It was also proven that the retard amount in a comparison between the knock limits in respective compression ratio at 14 and 15 increases again.

From the above results, it was proven that the retard amount required for suppressing knock is dependent on an amount of heat generated from the cool-flame reaction, wherein the retard amount decreases when the compression ratio is increased beyond a certain value having a peak retard amount, and then increases again when at the compression ratio is further increased.

Then, the inventors carried out a simulation of a relationship between the cool-flame reaction and a torque.

Figure 8:
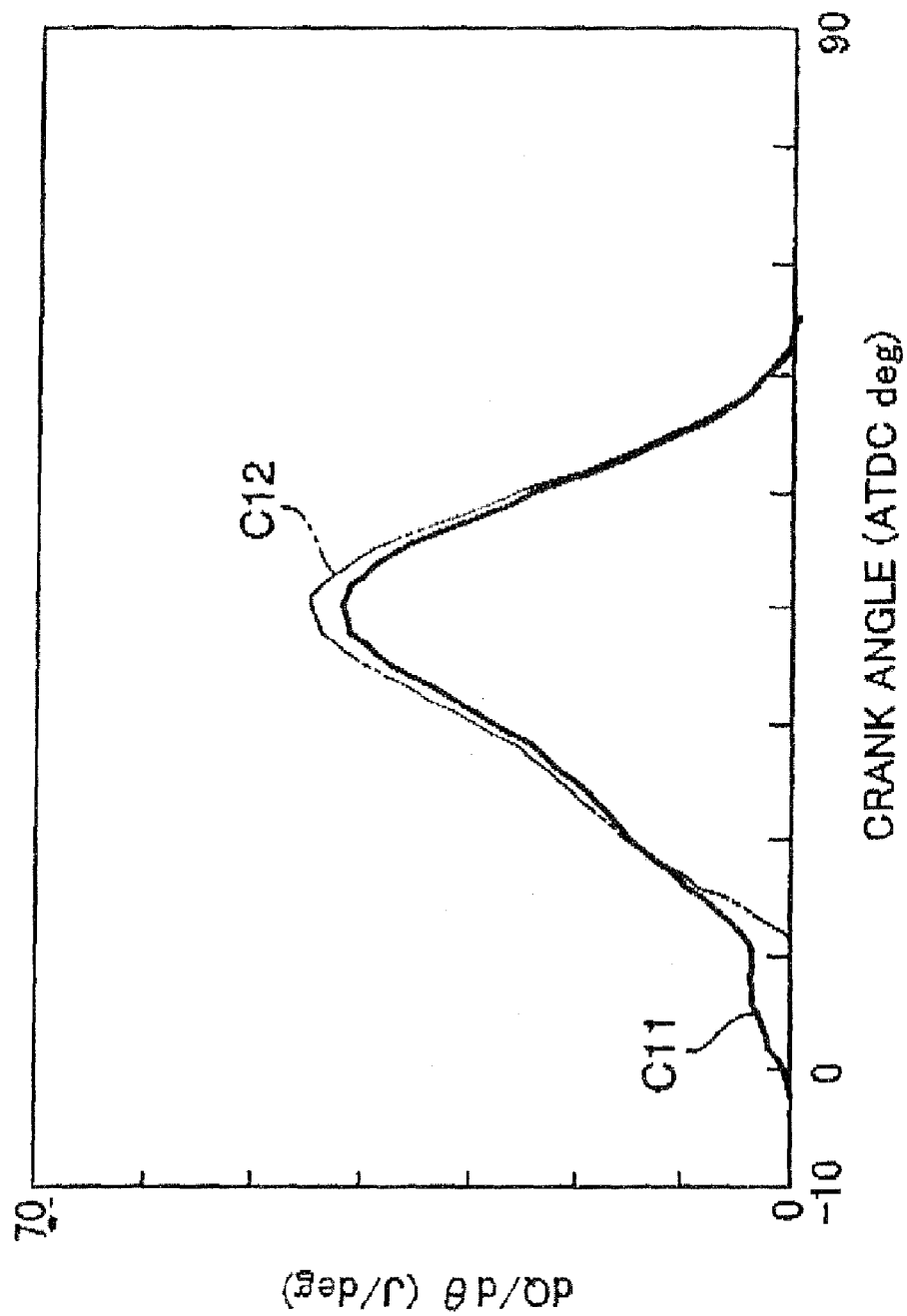
FIG. 8 is a graph showing a relationship between a heat generation rate and a crank angle in an engine with a compression ratio of 14.
Figure 9:
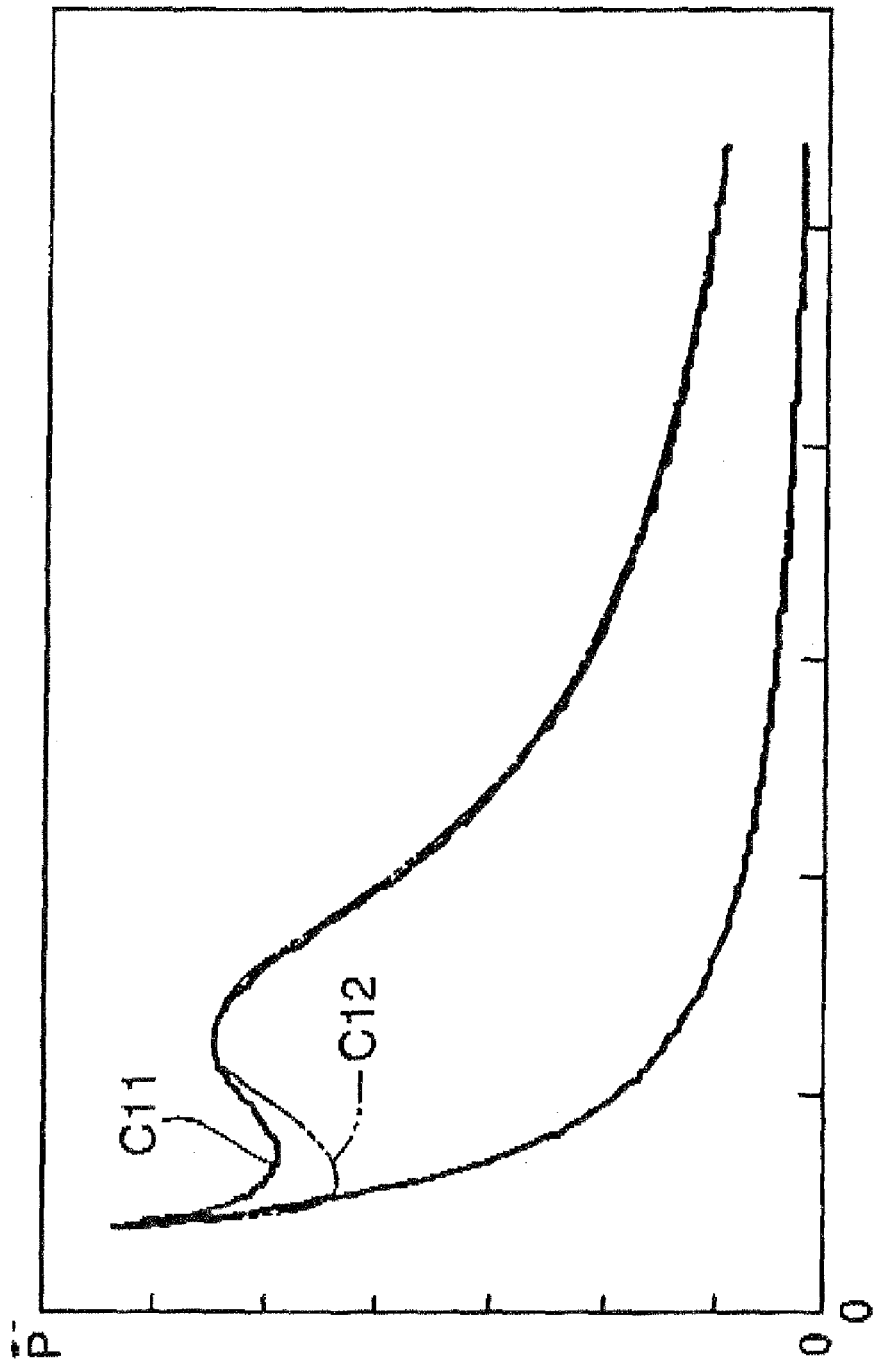
FIG. 9 is a PV diagram in an engine with a compression ratio of 14, based on numerical simulation.

FIG. 8 is a graph showing a relationship between a heat generation rate and a crank angle in an engine with a compression ratio of 14. FIG. 9 is a PV diagram in the engine with a compression ratio of 14, based on numerical simulation. In FIGS. 8 and 9, C11 indicates a curve obtained by producing the cool-flame reaction after a compression TDC as with an actual engine, and C12 indicates a curve obtained by purposely precluding the cool-flame reaction from being produced.

As shown in FIG. 8, when the cool-flame reaction is produced after the compression TDC by an ignition retarding control, the heat generation rate slightly increases just after the compression TDC, and then will adequately increase after ignition (8 CA degrees after the compression TDC) without occurrence of preignition.

Based on this premise, a PV characteristic was calculated. From the calculation result, it was proven that a combustion progresses while maintaining a high in-cylinder pressure after the compression TDC to allow a combustion time loss (i.e., finite combustion duration) to be reduced as compared with the case of having no cool-flame reaction, as shown in the PV diagram of FIG. 9.

From these simulation results, it was proven that, in cases where the compression ratio is set at high values and the ignition timing is retarded to a point after the compression TDC, when the compression ratio is set at 14, the heat generation rate in the cool-flame reaction can be largely increased to reduce the combustion time loss so as to obtain a higher torque.

Then, the inventors checked a change in the above relationship between a compression ratio and a knock limit depending on octane numbers.

Figure 10:
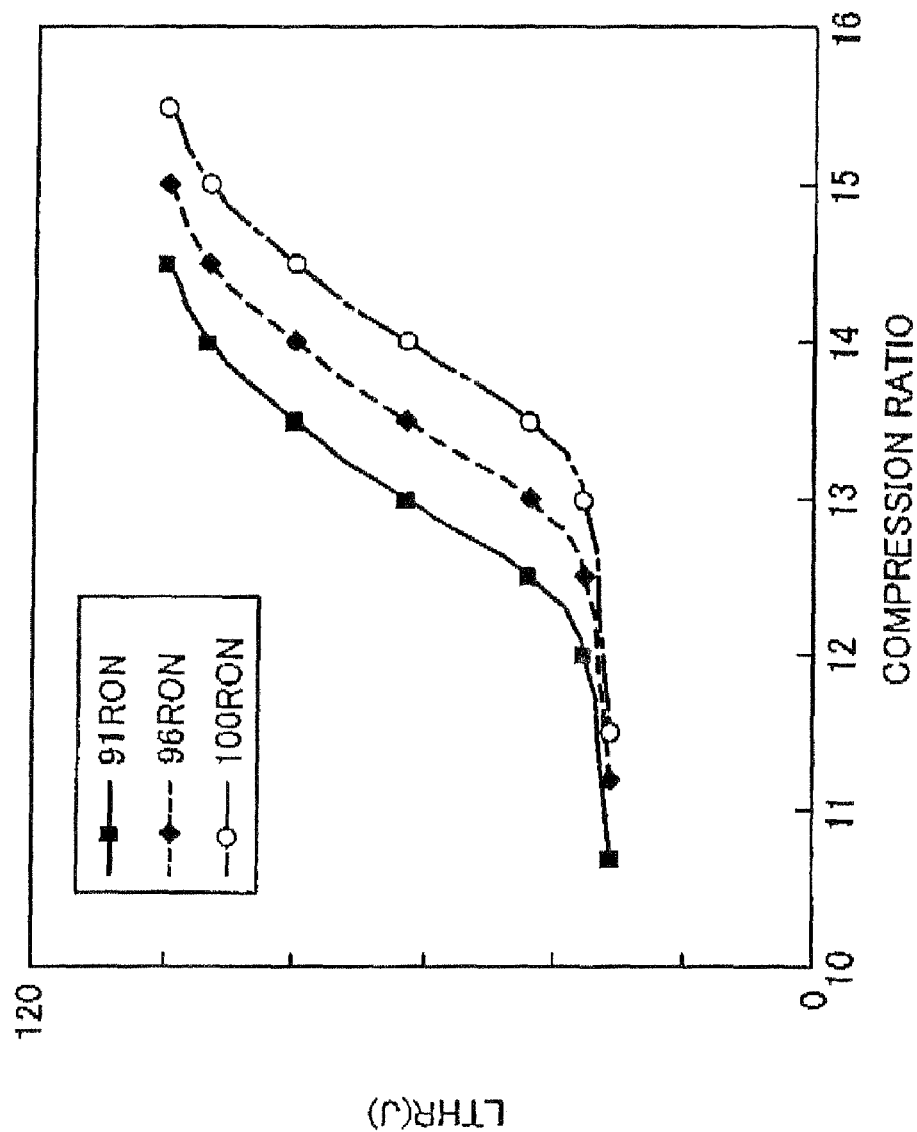
FIG. 10 is a graph showing a relationship between a compression ratio and a cold-flame reaction-generated heat amount with respect to each octane number.

Specifically, an amount of heat generated from the cool-flame reaction was measured and calculated while variously changing a combination of an octane number and a compression ratio. In the measurement using fuel with 96 RON, the cool-flame reaction became prominent in engines with a compression ratio of 12.5 or more, and gradually decreased in engines with a compression ratio of 15 or more. Based on these actually measured values, the amount of heat generated from the cool-flame reaction was calculated for engines using fuels with 91 RON and 100 RON. In the calculation for engines using 91 RON, the cool-flame reaction became prominent in engines with a compression ratio of 12.0 or more, and gradually decreased in engines with a compression ratio of 14.5 or more. In the calculation for engines using fuel with 100 RON, the cool-flame reaction became prominent in engines with a compression ratio of 13.0 or more, and gradually decreased in engines with a compression ratio of 15.5 or more. These results are shown in FIG. 10. Based on the graph in FIG. 10, an engine power at a knock occurrence timing was calculated with respect to each octane number.

Figure 11:
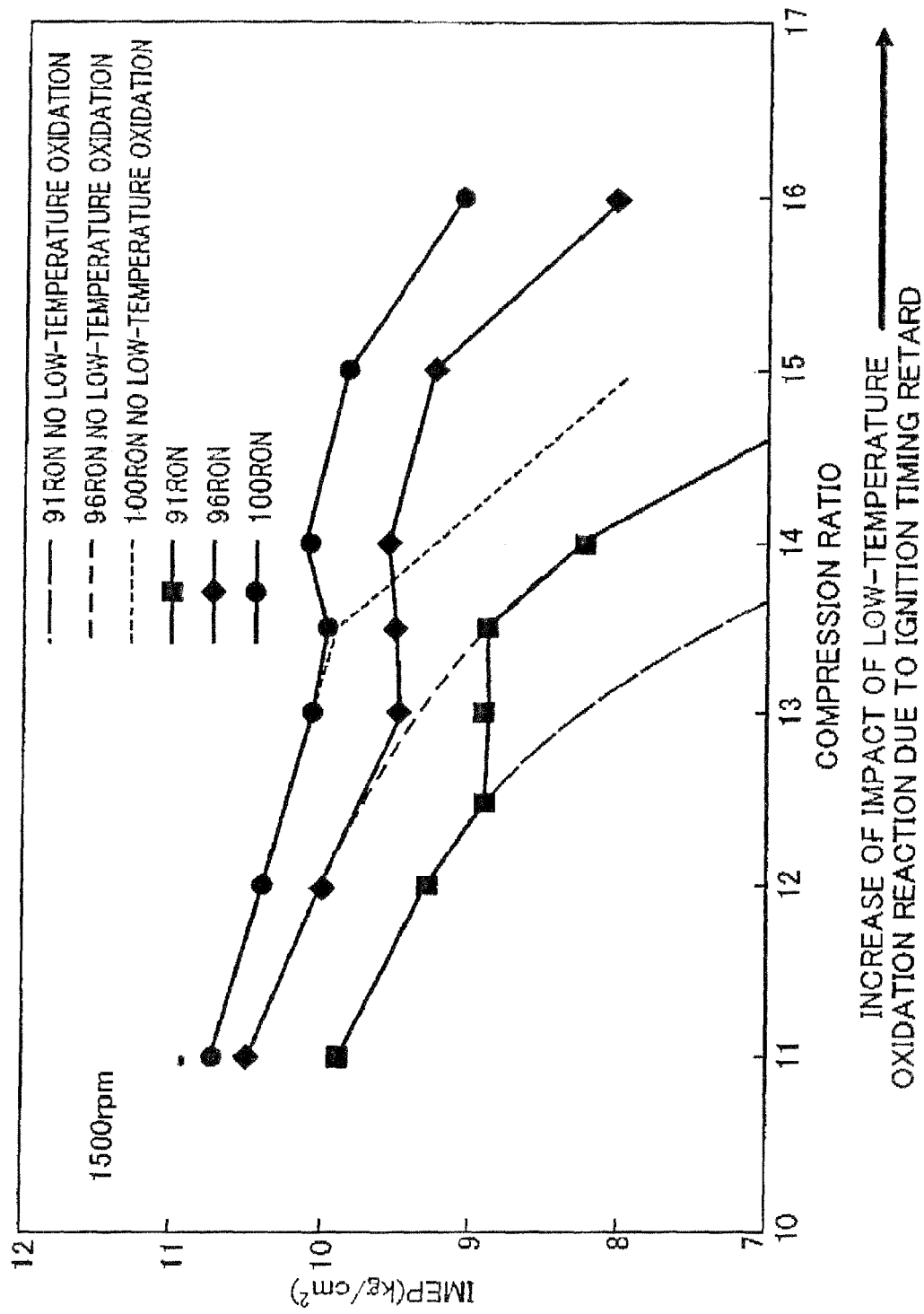
FIG. 11 is a graph showing a relationship between a compression ratio and an IMEP with respect to each octane number, which is calculated based on the graph in FIG. 10.

As shown in FIG. 11, in the calculation for engines using fuel with 96 RON, the cool-flame reaction becomes prominent in engines with a compression ratio ranging from 13 to 15, and the engine power is improved by effects of a reduction in combustion time loss and an anti-knock mechanism based on the cool-flame reaction, and an effect of an increased compression ratio. Similarly, in engines using fuel with 91 RON and having a compression ratio of 13.5 to 15 and in engines using fuel with 100 RON and having a compression ratio of 12.5 to 13.5, the engine power is improved as compared with that in a compression ratio just before the occurrence of the cool-flame reaction.

In particular, it was verified that, in the engines using fuels with 96 RON and 100 RON, the engine power is improved around a compression ratio of 14 which allows the cool-flame reaction to become most prominent.

The following description will be made about an upper limit of the compression ratio.

Figure 12:
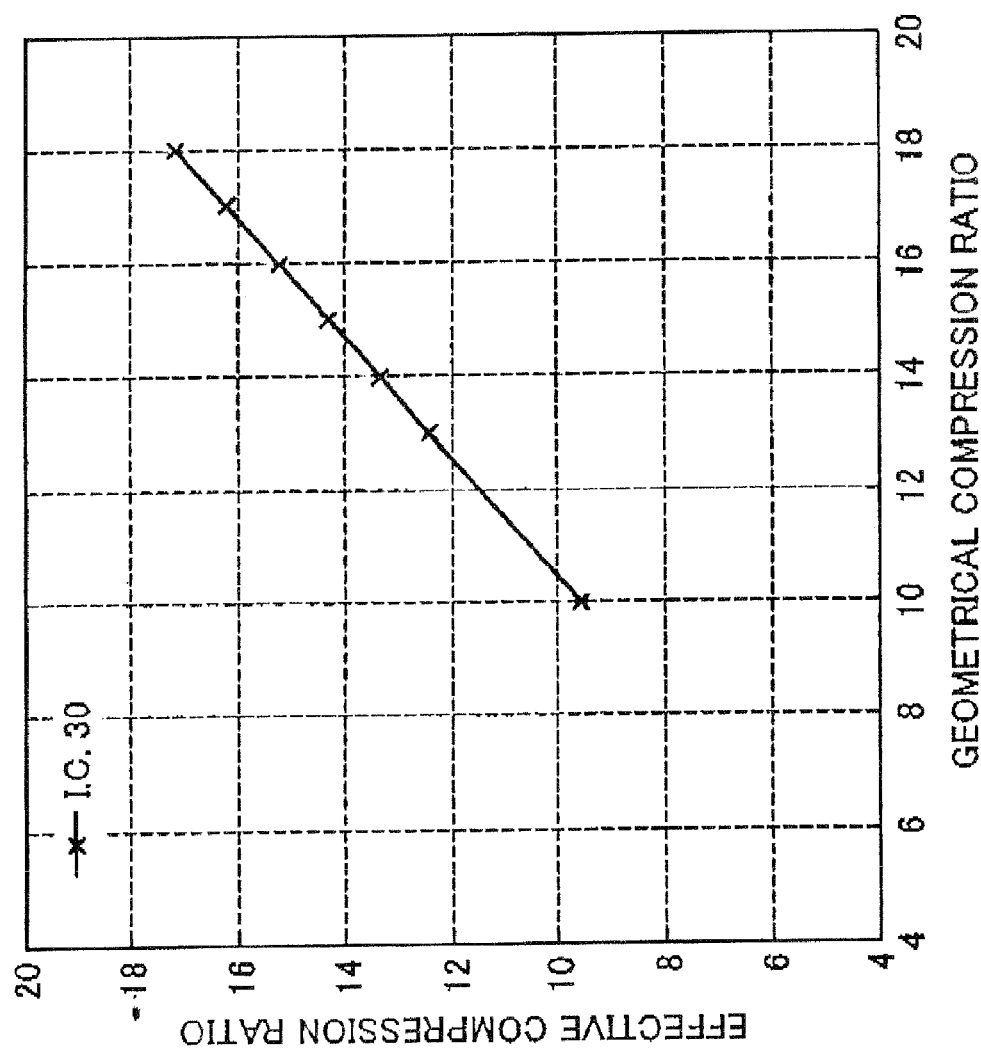
FIG. 12 is a graph showing a relationship between a geometrical compression ratio and an effective compression ratio in an engine employing a variable valve timing system.

In a compression ratio required for retarding an ignition timing to a point after a compression TDC, the engine power is increased by the cool-flame reaction. If the cool-flame reaction continues for a relatively long time under the condition that an in-cylinder temperature and an in-cylinder pressure are relatively high, preignition is likely to occur. For example, given that a vehicle with a fully warmed-up engine is temporarily stepped at a parking area, and air residing in and around an intake system is heated up to a high temperature. In this case, when the engine is restarted, an intake-air temperature is likely to excessively increase to cause a rapid increase in temperature of air charged in a combustion chamber, resulting in occurrence of preignition. Further, in late years, an engine equipped with a variable valve timing (VVT) system designed to variably adjust an intake-valve closing timing has become widely used. In the engine, the intake-valve closing timing in a wide open throttle (WOT) condition in a low speed range is generally set at 30 CA degrees after a bottom dead center of an intake stroke (hereinafter referred to as "intake BDC") or less. Thus, as shown in FIG. 12, a difference between an effective compression ratio and a geometrical compression ratio is equal to or less than one. That is, even if the system for changing the intake-valve closing timing is employed, the effective compression ratio can be reduced only in a limited range. Therefore, it is preferable to set an upper limit of the geometrical compression ratio based on some criteria. Moreover, depending on operation states, the VVT system cannot reduce the effective compression ratio in a part of a low-speed/high-load operation zone. For this reason, the present invention is intended to set a combination of the geometrical compression ratio, the effective compression ratio and the octane number, as shown in Table 1, so as to satisfy both the needs for improving the engine power and suppressing knock.

TABLE 1

| Octane Number (RON) | Geometrical Compression Ratio | | Effective Compression Ratio in low-speed/high-load zone |
|---|---|---|---|
| | Lower Limit | Upper Limit | |
| 91 | 13.5 | 15.5 | 12.5 or more |
| 96 | 14.0 | 16.0 | 13.0 or more |
| 100 | 14.0 | 16.5 | 13.0 or more |

Late years, bio-fuels based on ethanol (ethyl alcohol), methanol (methyl alcohol), or methyl ester made of edible oil have been developed for use as fuel for automobiles. An octane number of the bio-fuel for use in engines is being increased, and therefore the technical concept of the present invention can also be applied to bio-fueled engines.

Embodiment

Figure 13:
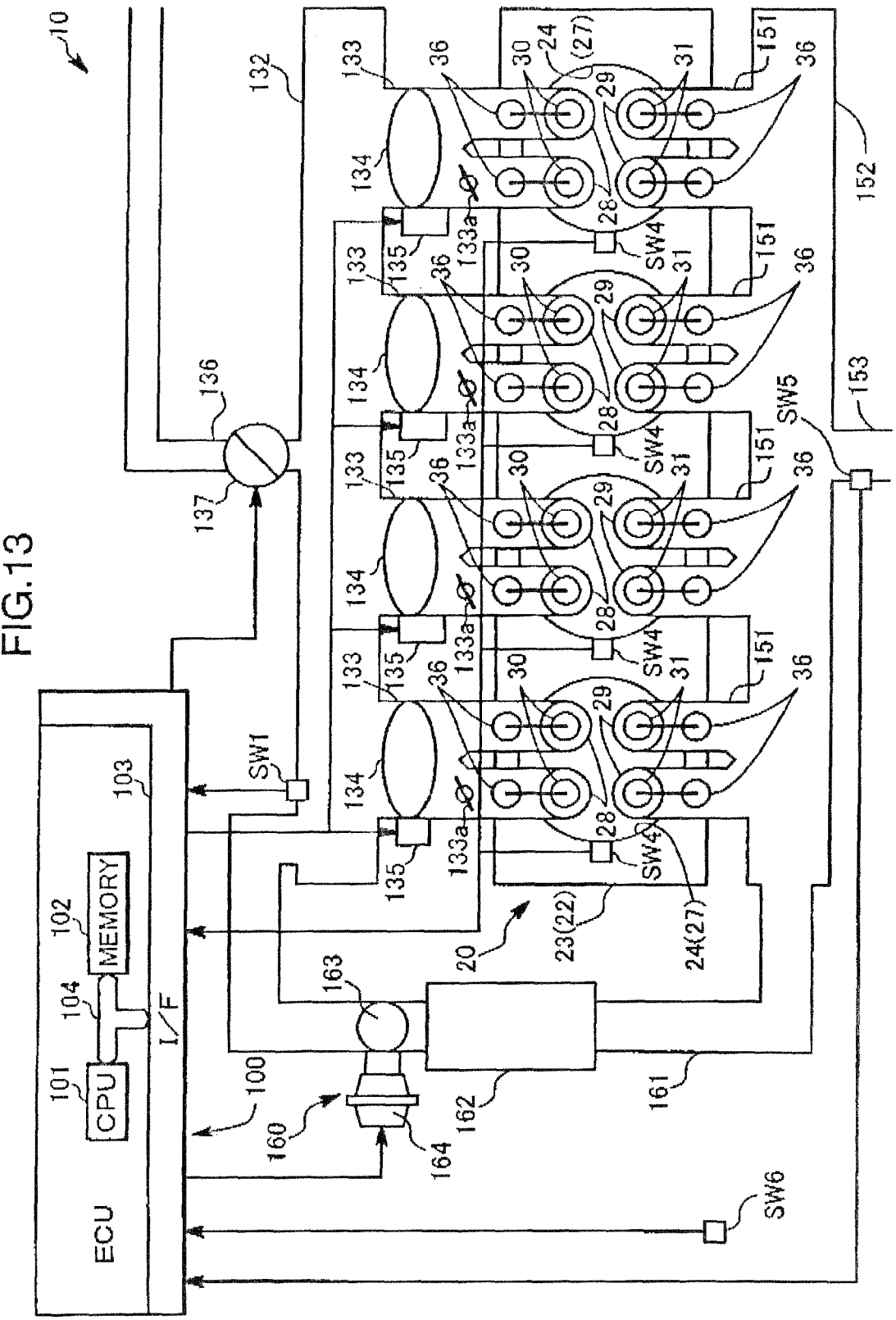
FIG. 13 is a schematic diagram showing a control system of a four-stroke spark-ignition gasoline engine according to one embodiment of the present invention.
Figure 14:
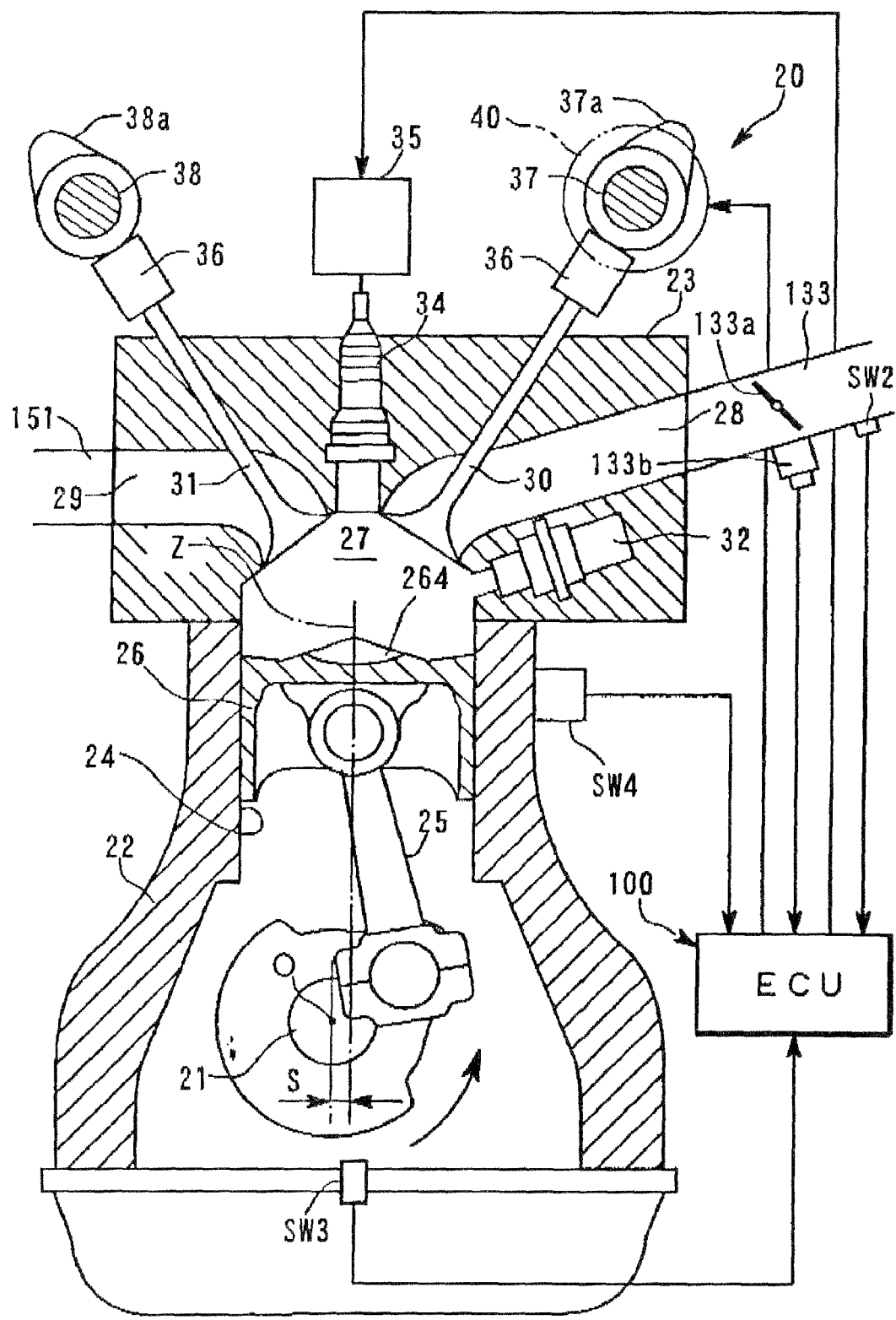
FIG. 14 is a schematic sectional view showing one cylinder of the engine in FIG. 13.

Referring to FIGS. 13 and 14, a four-stroke spark-ignition gasoline engine 10 according to one embodiment of the present invention comprises an engine body 20, and a control unit 100 for controlling various engine systems associated with the engine body 20.

The engine body 20 integrally has a cylinder block 22 rotatably supporting a crankshaft 21, and a cylinder head 23 disposed on a top surface of the cylinder block 22. The cylinder block 22 and the cylinder head 23 are designed to internally define a plurality of cylinders 24.

Each of the cylinders 24 is provided with a piston 26 connected to the crankshaft 21 through a connecting rod 25. The piston 26 defines a combustion chamber 22 in an upper region of the cylinder 24 in cooperation with the cylinder clock 22 and the cylinder head 23. In this embodiment, a geometrical compression ratio in each of the cylinders 24 is set at 14.

Referring to FIG. 14, in the engine body 20 in this embodiment, each of the cylinders 24 has a cylinder-bore axis Z (see FIG. 15) which is offset rightward from a rotation center of the crankshaft 21 when viewed from a side where the crankshaft 21 is rotated in a clockwise direction (i.e., in FIG. 14). For example, when the cylinder 24 has a bore diameter of 70 mm, the offset S is set in the range of 1 to 2 mm.

Referring to FIG. 15, the cylinder head 23 has a lower surface serving as a roof of the combustion chamber 27 in each of the cylinders 24. This roof is formed in so-called "pent-roof shape" which has two inclined surfaces each extending from a central portion thereof to a bottom of the cylinder head 23.

The cylinder head 23 has a fuel injection valve 32 which is disposed on a lateral side relative to the combustion chamber, and adapted to receive a fuel injection pulse from the control unit 100 and inject fuel into the combustion chamber 27 in an amount corresponding to the pulse width of the received fuel injection pulse.

Each of the cylinders 24 is provided with three spark plugs 34 each fixed to the cylinder head 23 and adapted to generate a spark inside the combustion chamber 27. The spark plugs 34 are aligned along a diametral direction of the cylinder parallel to a ridge line of the piston 26. More specifically, a central one of the spark plugs 34 is located on the cylinder-bore axis Z, and each of lateral ones of the spark plugs 34 is located at a peripheral edge of the combustion chamber 27. Each of the spark plugs 34 is electrically connected to an ignition circuit 35 (see FIG. 14) adapted to adjust an ignition timing on an electronic control basis. The control unit 100 is operable to control the ignition circuit 35 so as to selectively activate the spark plugs 34.

Referring to FIGS. 15 and 16A to 16D, two independent intake ports 28 are opened to one (right inclined surface in FIGS. 16A and 16B) 27a of the inclined surfaces constituting the roof of the combustion chamber 27, and two exhaust ports 29 are opened to the other inclined surface (left inclined surface in FIGS. 16A and 16B) 27b. An intake valve 30 is associated with an open end of each of the intake ports 28, and an exhaust valve 31 is associated with an open end of each of the exhaust ports 29. Each of the intake ports 28 is formed as a straight port which linearly extends obliquely upwardly and rightwardly from the combustion chamber 27, in such a manner as to depart from the cylinder-bore axis Z toward an upstream of an intake passage, in the section illustrated in FIG. 16.

Two squish-area forming surfaces 33a, 33b are formed, respectively, in a given range of an intake-side peripheral area of a crown surface of the piston 26, and in a given range of an exhaust-side peripheral area of the crown surface, to inclinedly extend along the respective inclined surfaces of the cylinder head 23. The piston crown surface also includes a raised portion 33 on an inward side of the squish-area forming surfaces 33a, 33b.

The raised portion 33 is formed in a given range including respective projection areas of the intake ports 30 and the exhaust ports 31. The raised portion 33 has a skirt formed in a chevron shape including a pair of inclined surfaces 33a, 33b approximately parallel to the respective inclined surfaces 27a, 27b of the combustion-chamber roof. The inclined surfaces 33a, 33b are raised to form a pent-roof shape which approximately corresponds to the roof of the combustion chamber 27 and has a top 33c at a position corresponding to a ridge line of the roof. Further, the piston crown surface is formed with a concave portion 264 over a range of the top 33c and the inclined surfaces 33a, 33b of the raised portion 33. The concave portion 264 has a bottom surface formed as an approximately-spherical/curved surface. The concave portion 264 has an approximately-circular shape in top plan view, specifically an oval shape having a minor axis extending along the top (ridge line) and a major axis orthogonal to the minor axis and slightly longer than the minor axis.

Thus, the above engine body in this embodiment has the following functions.

Figure 16A:
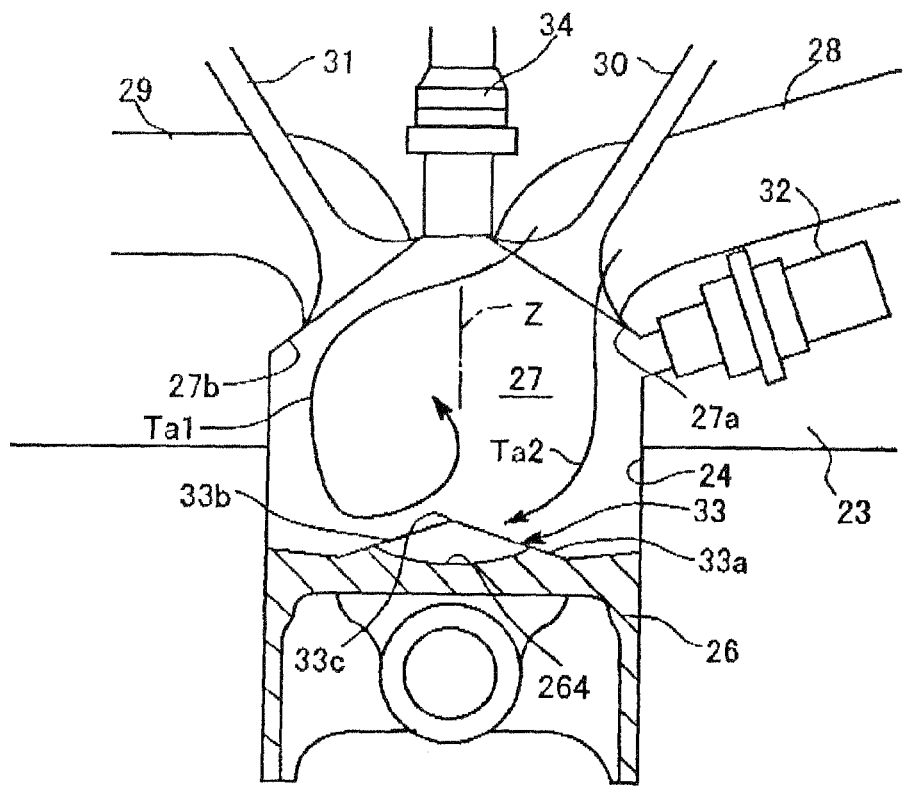
FIG. 16A is an explanatory diagram showing a gas flow in a combustion chamber of the engine in FIG. 13, in an initial stage of a compression stroke.
Figure 16B:
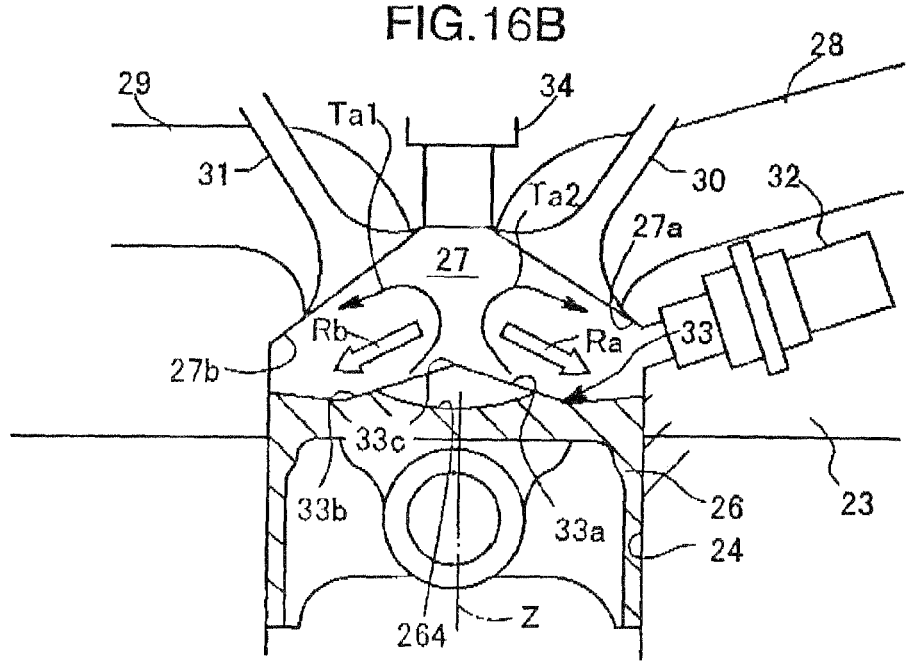
FIG. 16B is an explanatory diagram showing a gas flow in the combustion chamber in FIG. 16A, in an initial stage of an expansion stroke.

An intake air sucked into the combustion chamber 27 along with a downward movement of the piston 26 in an intake stroke forms two types of airflows, as indicated by Ta1, Ta2 in FIG. 16A. The airflow Ta1 introduced into the combustion chamber 27 primarily from a part of the open end of the intake port 28 located closer to the spark plugs 34 moves toward an exhaust-side peripheral wall surface of the combustion chamber 27, and then turns downwardly along the exhaust-side peripheral wall surface. Subsequently, the airflow Ta1 turns toward and moves along the intake-side area of the piston crown surface, and then turns upwardly along the inclined surface 33b. The other airflow Ta2 is a weak flow introduced from a throat portion of the intake port 28 on the side of the periphery of the cylinder bore. In the above manner, theses airflows Ta1, Ta2 are formed as a normal tumble flow Ta1 swirling in a counterclockwise direction, and a reverse tumble flow Ta2 swirling in a clockwise direction, and a reverse, respectively, as shown in FIG. 16.

In a subsequent compression stroke, respective downstream sides of the normal and reverse tumble flows Ta1, Ta2 moves side-by-side in a central region of the combustion chamber 27 while being vertically compressed along with an upward movement of the piston 26, and turned in opposite directions to depart from the center cylinder-bore axis.

In an initial to intermediate stage of the compression stroke, the normal tumble flow Ta1 is larger and stronger than the reverse tumble flow Ta2. Then, when the piston 26 is moved closer to the combustion-chamber roof along with a progress of the compression stroke, a center of the tumble flow Ta1 is gradually shifted toward an exhaust-side region of the combustion chamber, and the tumble flow Ta1 becomes weak. In a final stage of the compression stroke or an initial stage of a subsequent compression stroke around a compression TDC, the normal and reverse tumble flows Ta1, Ta2 will swirl in opposite directions with approximately the same volume and strength, separately in respective exhaust-side and intake-side regions of the combustion chamber 27. In a final stage of the compression stroke where the piston is moved close to the compression TDC, two normal squish flows are produced by the normal and reverse tumble flows Ta1, Ta2, in directions from respective squish areas defined between the inclined surfaces 27a, 27b of the combustion-chamber roof and the piston crown surface, to the central region of the combustion chamber 27 (i.e., directions opposite to the outline arrows Ra, Rb in FIG. 16B). Then, in the initial stage of the expansion stroke where the piston 26 starts being moved downwardly after reaching the compression TDC, two reverse squish flows Ra, Rb as indicated by the outline arrows are produced in directions from the central region of the combustion chamber 27 to the squish areas.

In this process, each of the normal and reverse tumble flows Ta1, Ta2 moves in a direction opposite to that of a corresponding one of the normal squish flows, and in the same direction as that of a corresponding one of reverse squish flows Ra, Rb. This makes it possible to weaken the normal squish flows in the final stage of the compression stroke so as to facilitate producing the reverse squish flows Ra, Rb while strengthening the reverse squish flows.

The reverse squish flows Ra, Rb strengthened in the above manner can sufficiently increase a combustion speed in the squish areas to increase a speed of a primary flaming combustion so as to achieve rapid combustion. In addition, the normal tumble flow Ta1 can be appropriately weakened to reasonably increase a speed of initial combustion so as to prevent autoignition from being induced in an air-fuel mixture in an end-gas region. That is, a time period of primary combustion can be drastically reduced without excessively reducing a time period of the initial combustion, to prevent the occurrence of knock, and reduce a combustion time loss based on the rapid combustion so as to provide enhanced thermal efficiency.

Further, the pair of inclined surfaces 33a, 33b are disposed in parallel relation to the respective inclined surfaces 27a, 27b of the combustion-chamber roof. This makes it possible to evenly promote flame propagation in a space defined therebetween so as to effectively prevent detonation.

Furthermore, the concave portion 264 is formed in the central area of the crown surface of the piston 26 to ensure a flying distance of injected fuel. Thus, fuel injected into a cylinder can generate turbulences in an air-fuel mixture to further reduce the combustion time. In a region where the engine is operated at an effective compression ratio $\epsilon_r$ of 13 or more, the concave portion 264 also contributes to produce a cool flame in the combustion chamber 27 after the compression TDC so as to serve as means for providing further enhanced engine power.

Each of the intake valves 30 is designed to be driven by a valve operating mechanism 40. The valve operating mechanism 40 is provided with a variable camshaft timing (VCT) mechanism 42 operable to steplessly changing opening/closing timings of the intake valve 30, and a variable valve event (VVE) mechanism 43 operable to steplessly changing a lift amount (opening space) of the intake valve 30.

Figure 1:
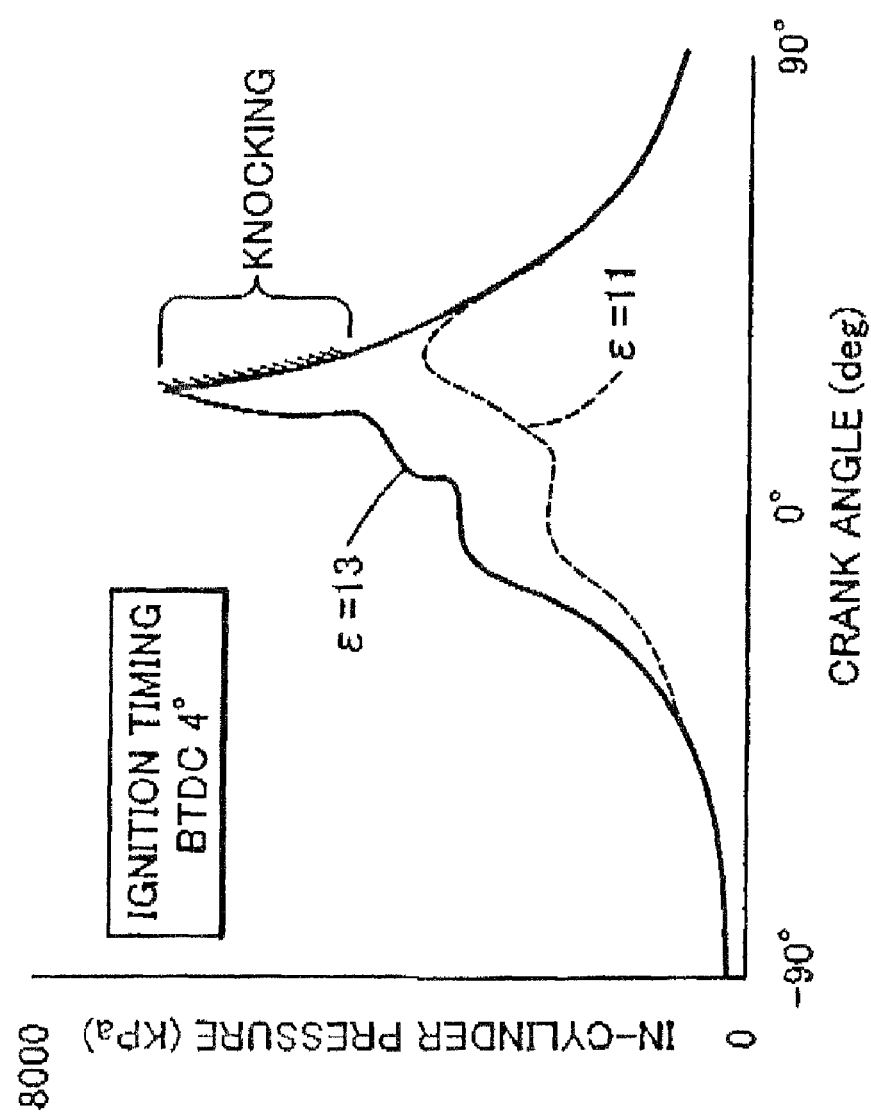
FIG. 1 is a graph showing one example of an ignition retarding control during a high-load operation.
Figure 17:
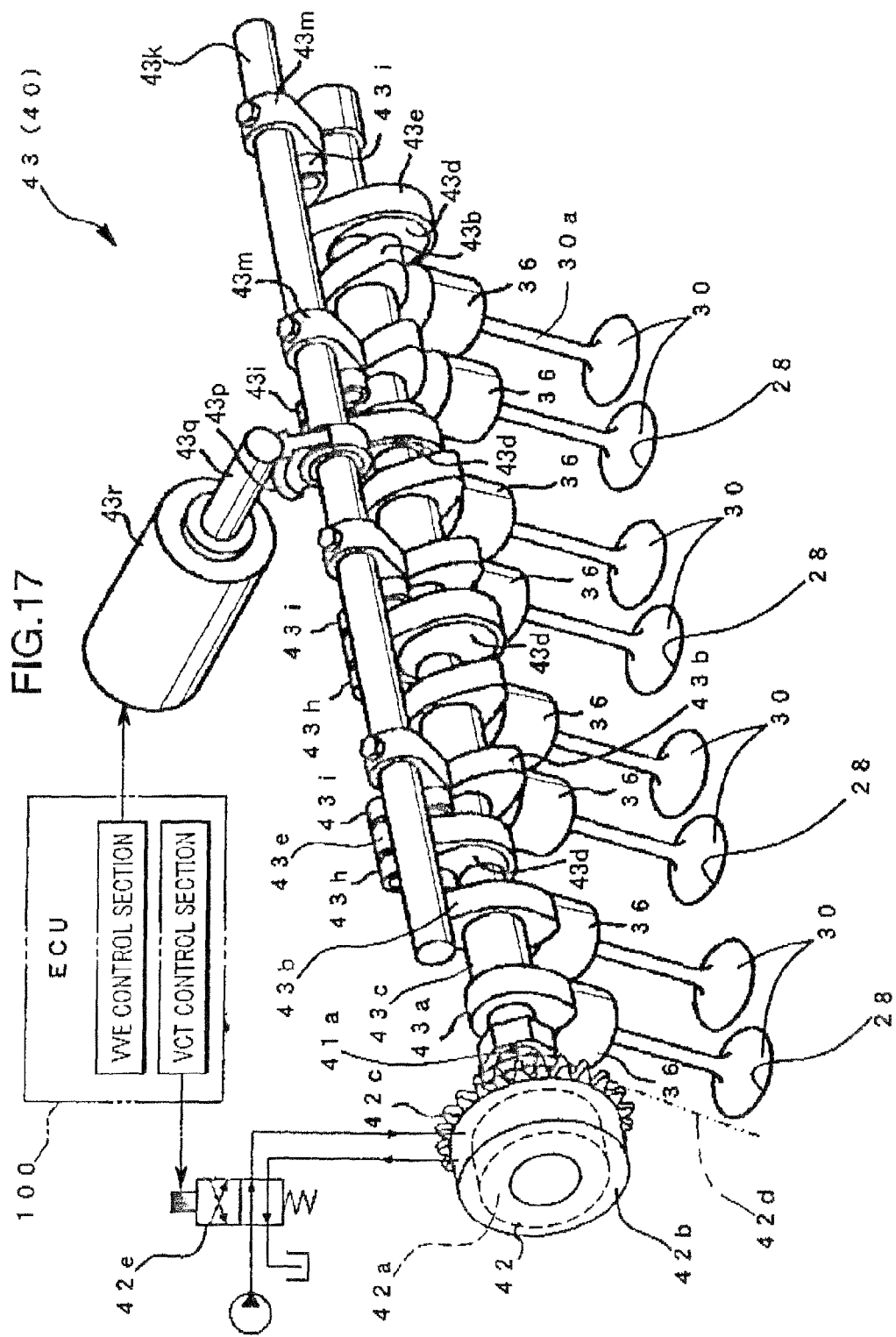
FIG. 17 is a perspective view showing a specific structure of a valve operating mechanism of the engine in FIG. 13.

Referring to FIG. 17, the valve operating mechanism 40 comprises a camshaft 41a extending along an arrangement direction of the cylinders 24 (see FIG. 1), and the VCT and VVE mechanisms 42, 43 are associated with the camshaft 41a.

The VCT mechanism 42 includes a rotor (input member) 42a fixed to one end of the camshaft 41a, a casing (output member) 42a coaxially disposed around an outer periphery of the rotor 42b, and a sprocket 42a disposed around an outer periphery of the camshaft 41a in a relatively rotatable manner. A chain 42d is wound around the sprocket 42c to transmit a driving force from the crankshaft 21 (see FIG. 13). A working oil chamber is formed, but not shown, between the rotor 42a and the casing 42b, and the rotor 42a and the casing 42b is designed to be switched between an integral rotation mode and a relative rotation mode according to an oil pressure control using a solenoid valve 42e. Bases on the oil pressure control, the VCT mechanism 42 can serve as an operation-timing changing mechanism for simultaneously changing an opening timing and a closing timing of the intake valve 30. The control unit 100 is operable to controllably drive the solenoid valve 42e so as to selectively connect/disconnect the rotor 42a to/from the casing 42b, as described in detail later.

The VVE 43 includes a pair of first and second intake cams 43a, 43b associated with each of the pair of intake valves 30. The first intake cam 43a is fixed to the camshaft 41a, and the second intake cam 43b is attached to the camshaft 41a in a relatively rotatable manner through a cam journal 43c.

Figure 18A:
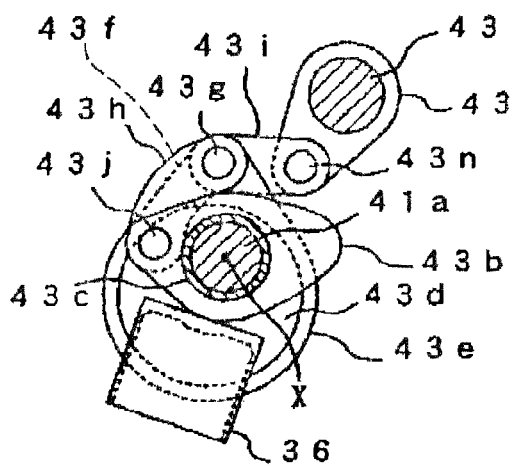
FIG. 18A is a fragmentary sectional view showing the valve operating mechanism in FIG. 17, in a position where a lift amount is zero in a high-lift control mode.
Figure 18B:
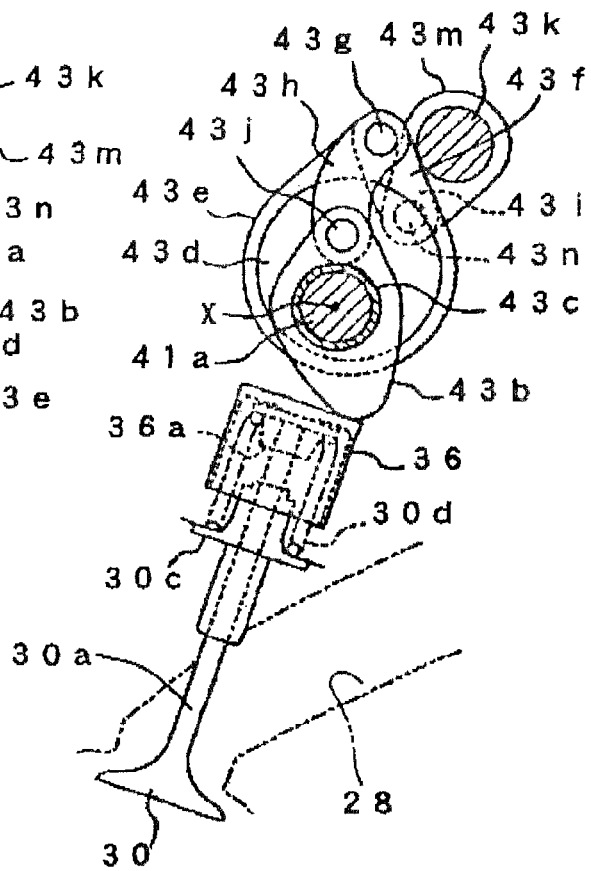
FIG. 18B is a fragmentary sectional view showing the valve operating mechanism in FIG. 17, in a position where the lift amount is maximized in the high-lift control mode.
Figure 18C:
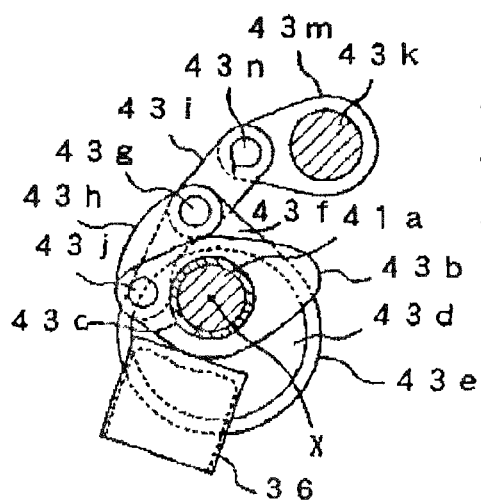
FIG. 18C is a fragmentary sectional view showing the valve operating mechanism in FIG. 17, in a position where the lift amount is zero in a low-lift control mode.

Referring to FIGS. 17 and 18A to 18B, an eccentric cam 43d fixed to the camshaft 41a is provided for each of the cylinders 24 to allow the second intake cam 43b attached to the camshaft 41a in a relatively rotatable manner to be driven in synchronization with the first intake cam 43a. As is clear from FIGS. 18A to 18D, the eccentric cam 43d is concentric to the camshaft 41a. An offset link 43e is rotatably attached onto an outer peripheral surface of the eccentric cam 43d. The offset link 43e has an outer peripheral surface integrally formed with a convex portion 43f protruding in a radial direction of the eccentric cam 43d. The convex portion 43f has a connection pin 43g which penetrates therethrough and extends parallel to the camshaft 41a. The connection pin 43g is provided with first and second link arms 43h, 43i in such a manner that respective one ends of the first and second link arms 43h, 43i are rotatably attached to the connection pin 43g on opposite sides of the offset link 43e. The first link arm 43h is provided as means to couple the offset link 43e to the second intake cam 43b, and the other end of the first link arm 43h is rotatably attached to a convex portion of the second intake cam 43b through a pin 43j extending parallel to the camshaft 41a. The second link arm 43i is provided as means to couple the offset link 43e to an eccentric shaft 43k for changing a phase of the offset link 43e, and the other end of the second link arm 43i is rotatably attached to an end of a control arm 43m fixed to the eccentric shaft 43k, through a pin 43n extending parallel to the camshaft 41a.

As shown in FIG. 17, a sector-shaped worm wheel 43p is fixed at an intermediate portion of the eccentric shaft 43k, and engaged with a worm gear 43q adapted to be rotationally driven by a stepping motor 43r. The control unit 100 is operable to controllably drive the stepping motor 43r, as described in detail later. Through this drive control, a phase of the control arm 43m is determined to thereby determine the phase of the offset link 43e, so that a rotational locus of the second intake cam 43b adapted to drive a corresponding tappet 36 is changed in an axial direction of the corresponding intake valve 30 to steplessly change the valve lift amount.

Referring to FIG. 18B, each of the intake valves 30 has a valve stem 30a, and the valve tappet 36 is fixed to an end of the valve stem 30a. The valve stem 30a of the intake valve 30 is guided by a conventional valve guide 30b. The valve guide 30b has a spring seat 30c integrally formed on an outer peripheral surface thereof, and a valve spring 30d is seated on the spring seat 36c in such a manner as to be compressedly installed between an innermost wall of the tappet 36 and the spring seat 36c.

The second intake cam 43b is in contact with the tappet 36, and therefore a biasing force of the valve spring 30d is applied to the second intake cam 43b.

As shown in FIGS. 18A to 18B, in the above structure, when the stepping motor 43r is activated to rotate the eccentric shaft 43k and the control arm 43m so as to allow the pin 43n to be positioned below the eccentric shaft 43k, a rocking angle of the second intake cam 43b is increased, and the valve operating mechanism is set in a high-lift control mode for maximizing a valve lift amount at a peak lift. When the control arm 43m and other related elements are rotated to move upwardly from the above position, the rocking angle of the second intake cam 43b is gradually reduced. Then, as shown in FIGS. 18A and 18B, when the pin 43n is positioned just above the camshaft 41a, the valve operating mechanism is set in a low-lift control mode for minimizing the valve lift.

Figure 18D:
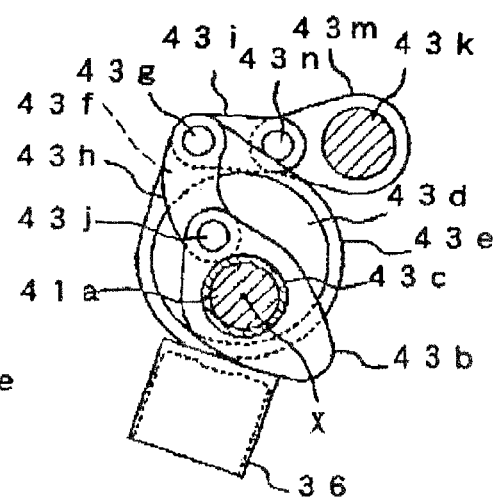
FIG. 18D is a fragmentary sectional view showing the valve operating mechanism in FIG. 17, in a position where the lift amount is maximized in the low-lift control mode.

In the high-lift control mode illustrated in FIGS. 18A and 18B, the second intake cam 43b is rocked between a peak-lift position for pressing the tappet 36 by a tip of a cam nose of the second intake cam 43b to largely lift the intake valve 30 through the tappet 36, as shown in FIG. 18B (a position for allowing the second intake cam 43b to largely lift the intake valve 30 through the tappet 36), and a zero-lift position for reducing the lift amount of the intake valve 30 to zero, as shown in FIG. 18D. Similarly, in the low-lift control mode illustrated in FIGS. 18C and 18D, the second intake cam 43b is rocked between a peak-lift position (where the tappet 36 is pressed by a base of the cam nose), and a zero-lift position (see FIGS. 18C and 18D)

Figure 19A:
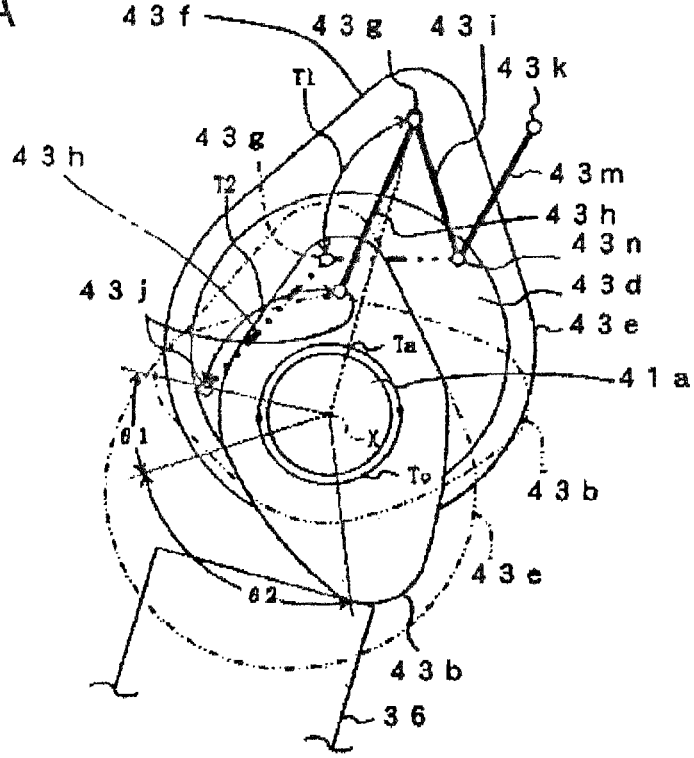
FIG. 19A is a schematic diagram showing the valve operating mechanism in FIG. 18B at a maximum lift position in the high-lift control mode.
Figure 19B:
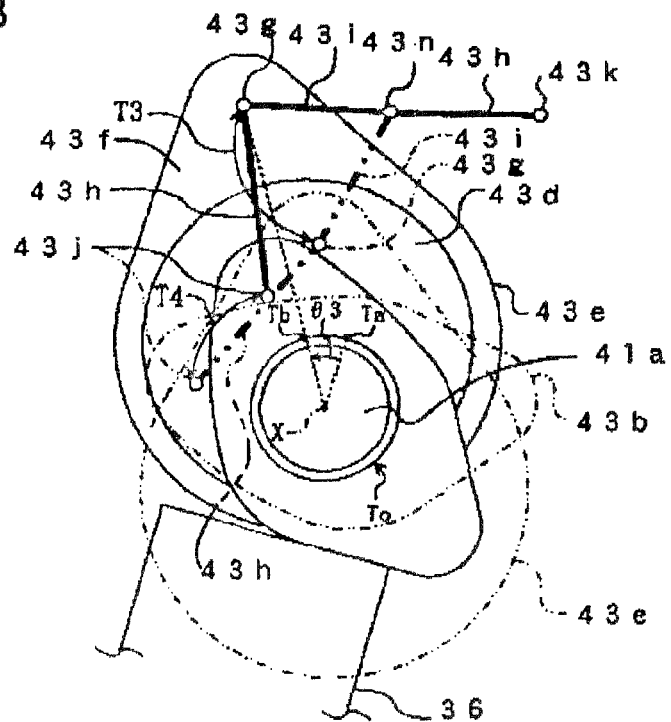
FIG. 19B is a schematic diagram showing the valve operating mechanism in FIG. 18D at a maximum lift position in the low-lift control mode.

In FIGS. 19A and 19B, the control arm 43m and the first and second link arms 43h, 43i are simply illustrated by solid lines, and a rotational locus of a center of the eccentric cam 43d (center of an outer ring portion of the offset link 43e) is indicated by the code T0.

With reference to FIG. 19A, a profile of the second intake cam 43b itself will be firstly described. The second intake cam 43b has an outer peripheral surface which includes a base circle surface (base circle zone) $\theta 1$ having a constant a curvature radius in a predetermined angular range, and a cam surface (lift zone) $\theta 2$ which continuously extends from the base circle surface $\theta 1$ and has a curvature radius which gradually increases.

In FIG. 19, the solid lines indicate the position where the intake valve 30 has approximately a peak lift position as illustrated in FIG. 18B. Specifically, in this position, the pin 43*j* is moved to an uppermost position by the first link arm 43*h*, and the tip of the cam nose of the cam surface θ2 of the second intake cam 43*b* is in contact with the tappet 36. Further, the two-dot chain lines indicate the position where the valve lift amount H is zero (FIG. 18A). Specifically, in this position, the base circle surface θ1 of the second intake cam 43*b* is in contact with the tappet 36, and the intake valve 30 is closed.

When the camshaft 41*a* (eccentric cam 43*d*) is rotated in a clockwise direction, the other end (lower end in FIG. 19A) of the offset link 43*e* (the first link arm 43*h*) is moved around an axis X of the camshaft 41*a* as indicated by the arrow in FIG. 19A, and a displacement of the one end of the offset link 43*e* is restricted by the second link arm 43*i* coupled thereto. Specifically, the second link arm 43*i* is rocked between respective positions indicated by the solid line and the two-dot chain line in FIG. 19A, about the pin 43*n* positioned below the eccentric shaft 43*k*, and the one end (the connection pin 43*g*) of the offset link 43*e* will be reciprocatingly moved about the pin 43*n* in an arc pattern every a 360-degree rotation of the eccentric cam 43*b* (a locus of the connection pin 43*g* is indicated by T1).

Along with the reciprocating arc movement T1 of the connection pin 43*g*, the other end (pin 43*j*) of the first link arm 43*h* having the one end coupled to the offset link 43*e* through the connection pin 43*g* is reciprocatingly moved in an arc pattern indicated by T2 in FIG. 19A, and the intake cam 43*b* coupled to the first link arm 43*h* through the pin 43*j* is rocked between respective positions indicated by the solid line and the two-dot chain line in FIG. 19A. Specifically, when the connection pin 43*g* is moved upwardly, the pin 43*j* is pulled upwardly by the first link arm 43*h*, and therefore the cam nose of the intake cam 43*b* presses the tappet 36 downwardly to lift the intake valve 30 while compressing the valve spring 30*d* (see FIG. 18B).

When the connection pin 43*g* is moved downwardly, the pin 43*j* is pushed downwardly by the first link arm 43*h*. Thus, the cam nose of the intake cam 43*b* is moved upwardly, and the tappet 36 is pressed upwardly by a reaction force of the compressed valve spring 30*d* to follow the upward movement of the cam nose. Consequently, the intake valve 30 is moved upwardly to close the intake port 28.

As above, in the high-lift control mode, the intake cam 43*b* is largely rocked to press the tappet 36 by approximately the entirety of the base circle surface θ1 and the cam surface θ2 in the outer peripheral surface thereof, and largely increase the valve lift amount based on the large rocking angle.

The high-lift control mode can be shift to the low-lift control mode by rotating the control arm 43*m* upwardly about the axis of the eccentric shaft 43*k* to an approximately horizontal position, so as to allow the pin 43*n* as a pivot shaft of the second link arm 43*i* to be positioned on a trailing side relative to the position in the high-lift control mode in a rotation direction of the camshaft 41*a*. In FIG. 19B, the solid lines indicate the position where the intake valve 30 has approximately a peak lift position, and the two-dot chain lines indicate the position where the valve lift amount H is zero, as with FIG. 19A.

When the camshaft 41*a* (eccentric cam 43*d*) is rotated, a displacement of the connection pin 43*g* of the offset link 43*e* is restricted by the second link arm 43*i*, and reciprocatingly moved about the pin 43*n* located on a lateral side of the eccentric shaft 43*k* (the second link arm 43*i* is reciprocatingly rotated between respective positions indicated by the solid line and the two-dot chain line in FIG. 19B). Along with the reciprocating arc movement T3 of the connection pin 43*g*, the pin 43*j* of the first link arm 43*h* has a reciprocating arc movement T4, and the intake cam 43*b* coupled to the first link arm 43*h* through the pin 43*j* is rocked between respective positions indicated by the solid line and the two-dot chain line in FIG. 19B, to open and close the intake valve 30.

As compared with the high-lift control mode, in the low-lift control mode, the rocking angle of the intake cam 43*b* is reduced to press the tappet 36 by only a part of the base circle surface θ1 and the cam surface θ2 in the outer peripheral surface of the intake cam 43*b*, so that the valve lift amount is reduced.

The above valve operating mechanism 40 may also be provided in each of the exhaust valves 31 to advance a closing timing of the exhaust valve 31 to a point before a top deaf center of an exhaust stroke so as to allow burnt gas in each cylinder to be left for a subsequent intake stroke to provide an internal EGR function.

Referring to FIGS. 13 and 14, a plurality of branched intake pipes 133 of an intake manifold 132 are connected to the intake ports 28 of the engine body 20. Specifically, the branched intake pipes 133 are provided on a cylinder-by-cylinder basis in such a manner as to define a plurality of intake passages each having the same length, in the intake manifold 132 independently. Further, in the illustrated embodiment, each of the branched intake pipes 133 has a downstream end formed in a two-forked shape in conformity to the pair of intake ports 28 in each of the cylinders 24. Each of the branched intake pipes 133 has an upstream junction portion provided with an openable/closable control valve 134. Each of the control valves 134 is comprised of a three-way solenoid valve, and designed to open and close the junction portion of a corresponding one of the branched intake pipes 133 by a desired degree of opening, independently. Further, as shown in FIG. 14, a conventional swirl-forming control valve 133*a* is provided in one of the two-forked downstream ends of the branched intake pipe 43. The swirl-forming control valve 133*a* is designed to be driven by an actuator 133*b* in an openable/closable manner. Thus, the swirl-forming control valve 133*a* can be closed to shut one of the two-forked downstream ends of the branched intake pipe 133 to allow intake air passing through the other downstream end to form a swirl in the combustion chamber 27, and then the swirl-forming control valve 133*a* can be opened to weaken the swirl depending on the degree of opening.

A common intake passage 136 is connected to an upstream end of the intake manifold 132 to introduce flesh air into the intake manifold 132. The intake passage 136 is provided with a throttle valve 137.

The exhaust ports 29 are connected to a plurality of branched exhaust pipes 151*a* each provided on a cylinder-by-cylinder basis and formed in a two-forked shape. Each of the branched exhaust pipes 151 has a downstream end connected to an exhaust manifold 152. The exhaust manifold 152 is connected to an exhaust passage 153 for discharging burnt gas.

An external EGR system 160 is provided between the intake manifold 132 and the exhaust manifold 152 to recirculate exhausted burnt gas to the intake manifold 132.

This external EGR system 160 may be a conventional system which comprises a recirculation passage defined between the intake manifold 132 and the exhaust manifold 152, an EGR cooler 162, an EGR valve 163, and an actuator 164 for driving the EGR valve 163.

Referring to FIG. 13, the intake passage 136 is provided with an airflow sensor SW1 for detecting an operation state of the engine, and an intake-air temperature sensor SW2 (see FIG. 14) disposed on a downstream side of the control valve 134 to estimate an in-cylinder temperature. Further, the cylinder block 22 is provided with a crank angle sensor SW3 for detecting a rotational speed of the crankshaft 21, and an engine coolant temperature sensor SW4 (see FIG. 14) for detecting a coolant temperature. The exhaust passage 153 is provided with an oxygen concentration sensor SW5 for controlling an air/fuel ratio.

The control unit 100 serving as control means is associated with an input element comprising the airflow sensor SW1, the intake-air temperature sensor SW2, the crank angle sensor SW3, the engine coolant temperature sensor SW4, the oxygen concentration sensor SW5 and an accelerator pedal position sensor SW6 for detecting an engine load. Each of the sensors SW1 to SW6 is shown as a specific example of operation-state detection means sensor in this embodiment. Further, the control unit 100 is associated with an control element comprising a valve operating mechanism 40, an actuator 133b for the swirl-forming control valve 133a, an actuator 135 for the control valve 134, an actuator for the throttle valve 134, and an actuator 164 of the external EGR system 160.

Referring to FIG. 13, the control unit 100 comprises a CPU 101, a memory 102, an interface 103 and a bus 104 connecting between these units 101 to 103, and functionally makes up operation-state determination means for determining an operation state, based on a program and data stored in the memory 102.

The memory 102 stores various control maps as described in detail later. Based on these stored maps, the control unit 110 is operable to desirably operate the engine depending on operation states.

Figure 20:
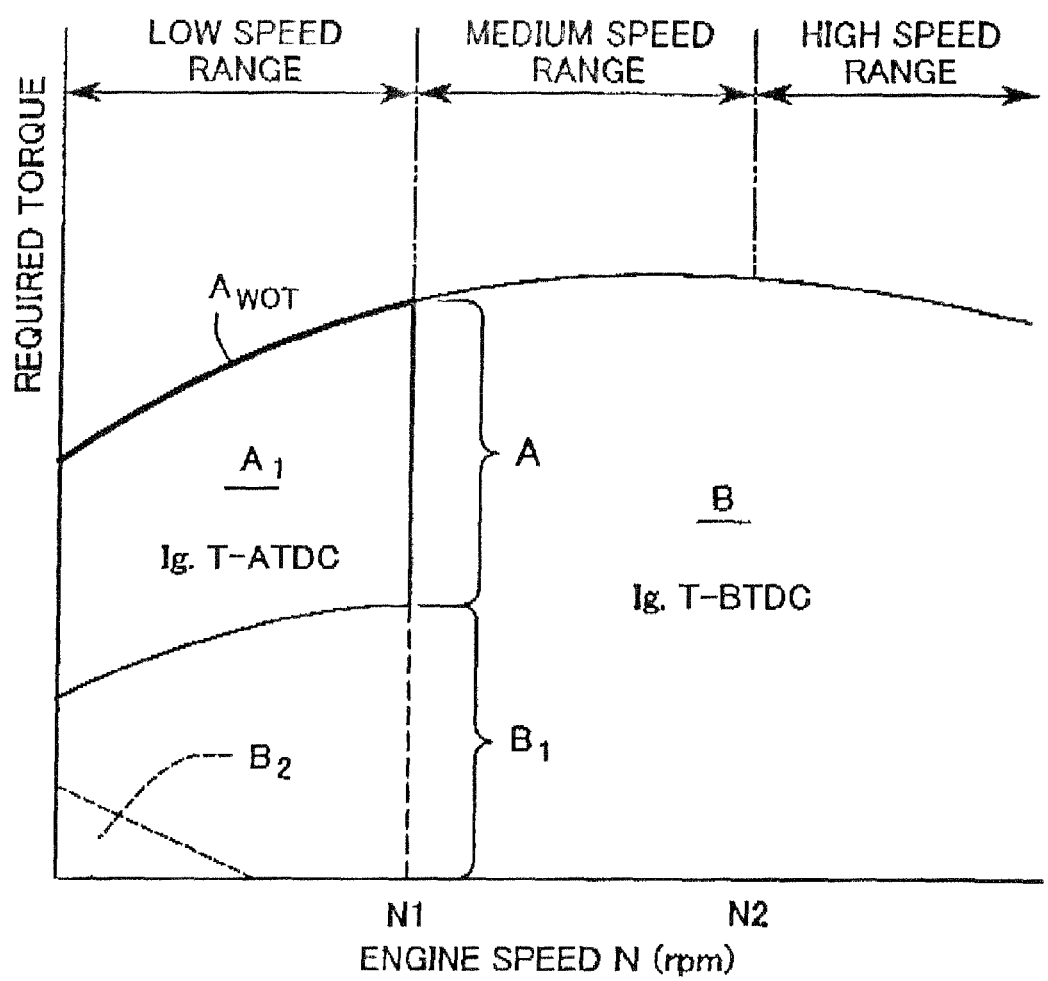
FIG. 20 is a graph showing a relationship between an engine speed and a required torque, which serves as a basis for a control map of the control system in FIG. 13.

Referring to FIG. 20, in the illustrated embodiment, on the basis of ignition timing, an engine operation zone is roughly classified into an ignition-retard operation zone (low-speed/medium-to-high-load operation zone) A where the ignition timing is retarded to a point after a compression TDC, and a normal-ignition operation zone B where the ignition timing is set at a point before the compression TDC. In case of dividing an entire region of engine speed N into three levels: low speed range; a medium speed range and a high speed range, the ignition-retard operation zone A is a load operation zone ranging from a given medium ignition-retard operation zone A1 to a WOT region A$_{WOT}$, within the above low speed range. Further, in this embodiment, in the ignition-retard operation zone A, a valve closing timing of the intake valve 30 is set to allow the engine to be operated under the condition that an effective compression ratio $\epsilon_r$ is maintained at 13 or more, wherein the effective compression ratio $\epsilon_r$ is calculated based on a value defined by an intake-valve closing timing at a time when a valve lift amount is 1 mm.

Figure 21:
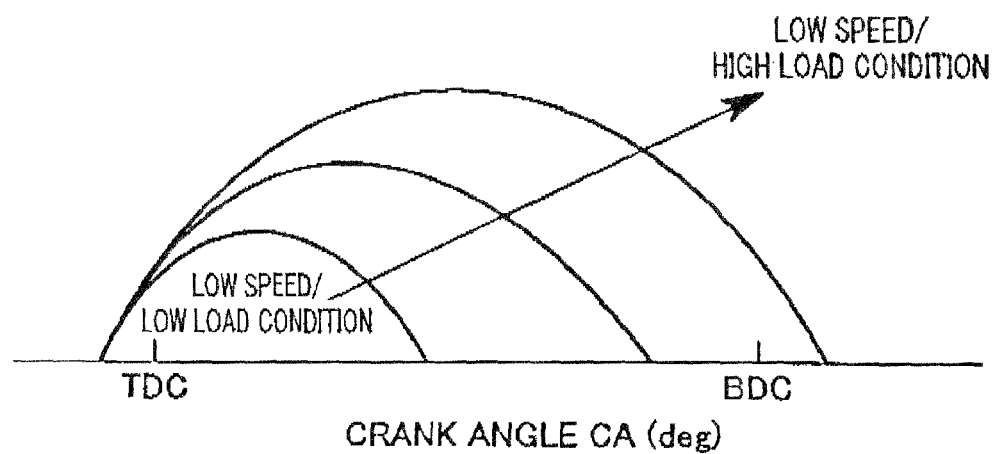
FIG. 21 is a timing chart showing one example of an effective compression ratio control, which serves as a basis for a control map of the control system in FIG. 13.

Referring to FIG. 21, in this embodiment, the valve operating mechanism 40 equipped with the VVE mechanism 43 is employed, as mentioned above. This valve operating mechanism 40 is used for steplessly controlling a valve closing timing and a valve lift amount of the intake valve 30.

In this embodiment, as seen in FIG. 21, in the ignition-retard operation zone A, the valve closing timing of the intake valve 30 is retarded to a point after an intake BDC (up to 30 CA degrees) to maintain the effective compression ratio $\epsilon_r$ at 13 or more, and the ignition timing is retarded to a point after a compression TDC to reliably prevent knock in the ignition-retard operation zone A.

Further, in the remaining operation zone B, the intake valve 30 is fundamentally closed at a relatively early timing to reduce the effective compression ratio $\epsilon_r$ to less than 13 (e.g., 8). This makes it possible to reduce a pumping loss. The effective compression ratio $\epsilon_r$ can be expressed by the following formula:

$$\varepsilon_r = 1 + \frac{V_s}{V_c}\left\{\frac{1}{2}(1-\cos\theta) + \frac{1}{8R}(1-\cos 2\theta)\right\} \quad (2)$$

$$= 1 + (\varepsilon - 1)\left\{\frac{1}{2}(1-\cos\theta) + \frac{1}{8R}(1-\cos 2\theta)\right\}$$

wherein: $\epsilon$ is a geometrical compression ratio;

Vs is a stroke volume;

Vc is a clearance volume;

$\theta$ is a crank angle of a valve closing timing of the intake valve 30 at a time when a valve lift amount is 1 mm; and R is a rod ratio (connecting rod length/crankshaft radius).

The effective compression ratio $\epsilon_r$ can be calculated by the formula (2), based an angle of valve opening (CA) of the intake valve 30 at a time when the valve lift amount is 1 mm, to obtain data about a control map of a relationship between and the effective compression ratio $\epsilon_r$ and the angle of valve opening (CA) and create a control map based on the data, and the control map can be used for effectively controlling the effective compression ratio $\epsilon_r$ with a high degree of accuracy.

Figure 22:
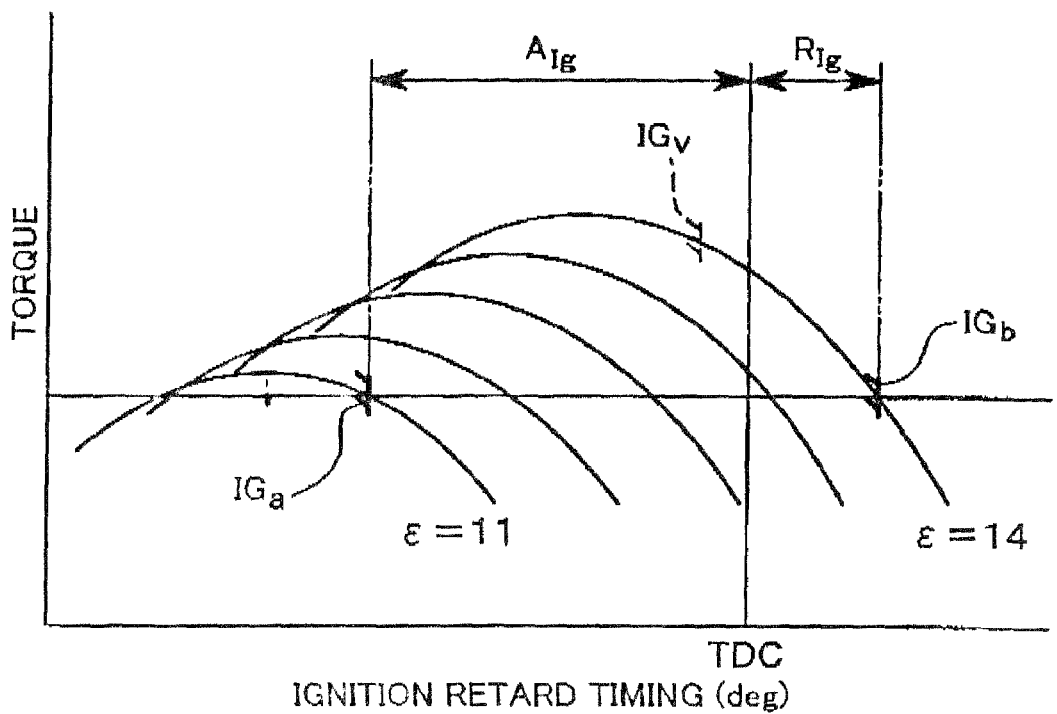
FIG. 22 is a graph showing one example of an ignition timing which serves as a basis for a control map of the control system in FIG. 13.

Referring to FIG. 22, in an engine having a geometrical compression ratio of 11, as indicated by IGa, the ignition timing during a normal engine operation is on an advance side relative to a compression TDC by a relatively large value (e.g., the engine speed: 1500 rpm, the ignition timing (CA): 6 to 8 degrees). In an engine having a geometrical compression ratio of 14 and the same anti-knock characteristics as that in a geometrical compression ratio of 11, the ignition timing has been conventionally set at a point just before the compression TDC, as indicated by IGv. By contrast, in this embodiment, as indicated by IGb, the ignition timing is set on a retard side beyond the compression TDC. This makes it possible to maintain a high compression ratio ($\epsilon_r \leq 14$) in the retard operation zone (low-speed/medium-to-high-load operation zone including the WOT region A$_{WOT}$) A, without deterioration in toque (see FIGS. 11 and 22).

In a conventional design process of retarding the ignition timing to a point after a compression TDC, data about related retard amount R$_{Ig}$ is experimentally collected in consideration of factors causing knock, such as in-cylinder temperature and in-cylinder pressure, and the collected data is formed as a control map. In this embodiment, for example, the retard amount R$_{Ig}$ relative to the compression TDC is set within 10% of entire stroke after the compression TDC (within around 36 CA degrees after the compression TDC). While the ignition timing IGb retarded to a point after the compression TDC has an advantage of being able to operate an engine at a high compression ratio while suppressing knock, it also brings disadvantages in terms of a combustion time. Thus, in this embodiment, with a view to quickly burning fuel just after transition to a subsequent compression stroke while maintaining the desired anti-knock mechanism, the retard amount R$_{Ig}$ is set within a stroke range of 10% after the piston passes beyond the compression TDC.

Figure 24:
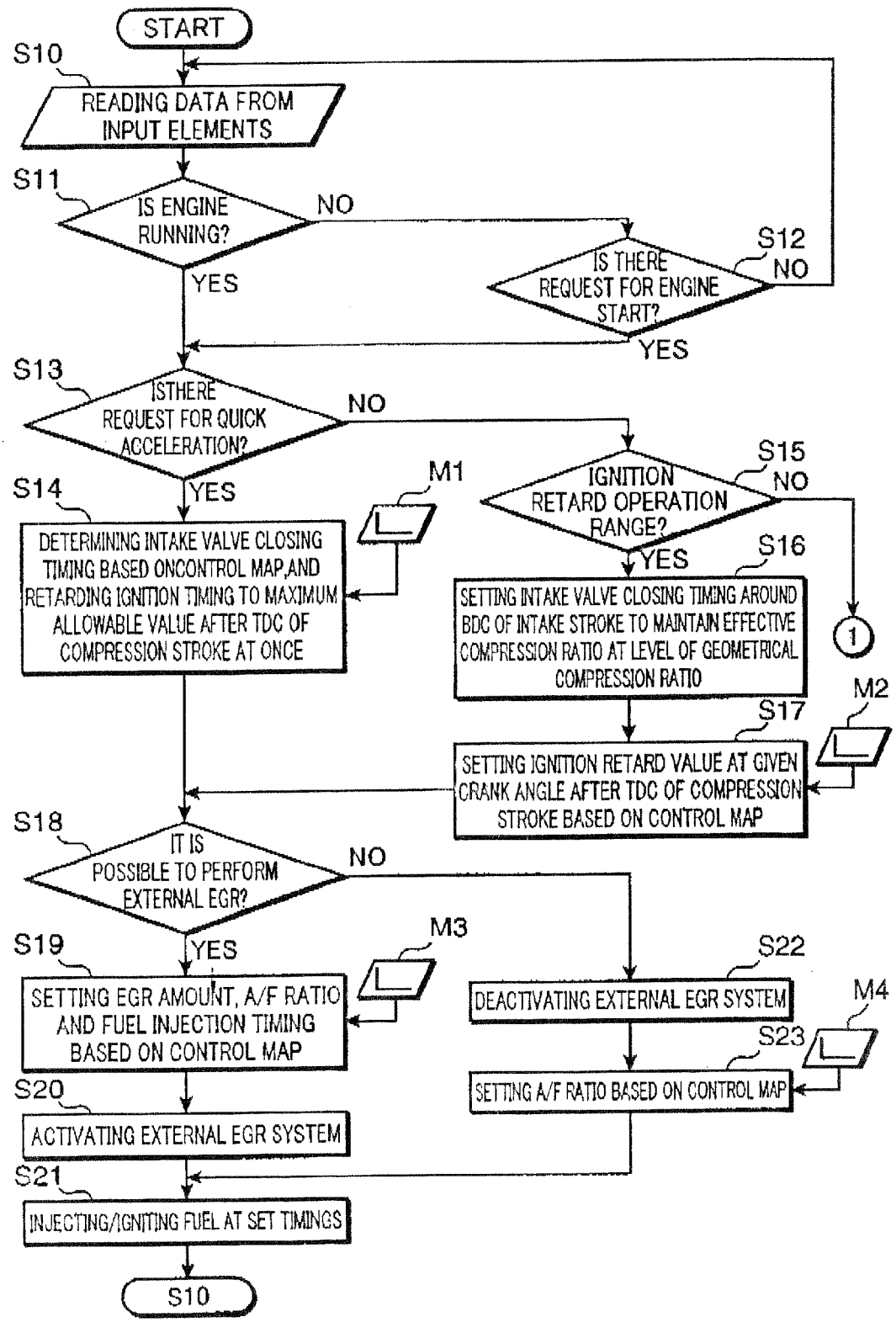
FIG. 24 is a flowchart showing a control process of the control system in FIG. 13.

Further, the control unit 100 in this embodiment is designed such that, when the engine is operated in the ignition-retard operation zone A, a split injection is performed at a fuel injection timing illustrated in FIG. 24.

Figure 23A:
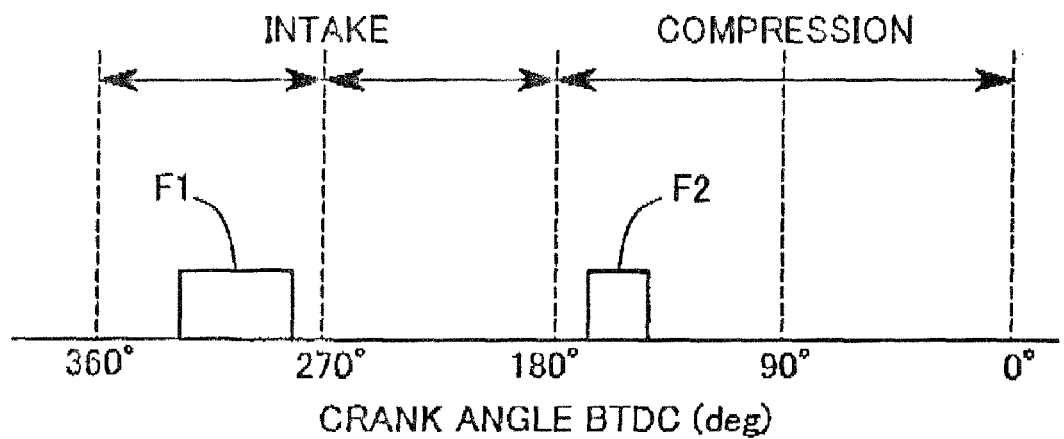
FIG. 23A is a graph showing one example of a split injection for forming a weakly-stratified air-fuel mixture which is a fuel injection timing serving as a basis for a control map of the control system in FIG. 13.
Figure 23B:
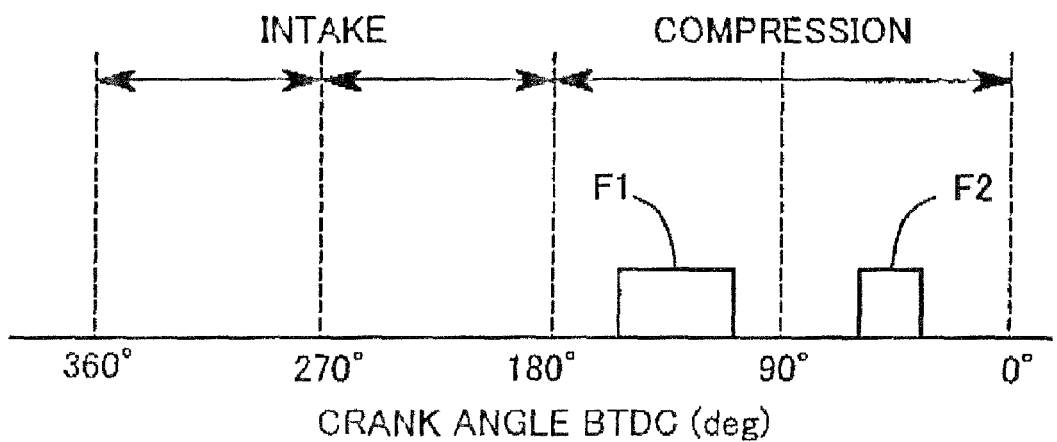
FIG. 23B is a graph showing one example of a split injection for forming a stratified air-fuel mixture which is a fuel injection timing serving as a basis for a control map of the control system in FIG. 13.

Referring to FIGS. 23A and 23B, when a fuel injection is performed at two fuel injection timings F1, F2 or more, vaporization/atomization of injected fuel can be further facilitated, and fuel injected at the later fuel injection timing F2 can additionally generate turbulences in the cylinder to contribute to rapid combustion.

In this embodiment, a control map is created based on data about the fuel injection timings F1, F2 for various engine operation states, and used for fuel injection control.

In an example illustrated in FIG. 23A, for example, the initial fuel injection timing F1 is set in an intermediate phase of an intake stroke (e.g., timing of completion of fuel injection: 275 CA degrees before a compression TDC), and the later fuel injection timing F2 is set in an initial phase of a compression stroke (e.g., timing of completion of fuel injection: 150 CA degrees before a compression TDC). Further, a ratio of respective fuel amounts to be injected at the timings F1, F2 is set at 4/5:1/5. In this example, vaporization/atomization of fuel injected in the intake stroke can be facilitated to form a weakly stratified air-fuel mixture in the combustion chamber 27 so as to reduce the combustion time to provide high engine power and enhanced fuel economy.

In the example illustrated in FIG. 23B, for example, the initial fuel injection timing F1 is set in an initial phase of a compression stroke, and the later fuel injection timing F2 is set in an intermediate or last phase of the compression stroke. Further, a ratio of respective fuel amounts to be injected at the timings F1, F2 is set at 4/5:1/5. In this example, the later fuel injection can generate large turbulences in the cylinder to reduce the combustion time even when the ignition timing is retarded, so as to obtain high engine power and enhanced fuel economy. In this embodiment, the concave portion 264 is formed in the central area of the crown surface of the piston 26. Thus, fuel injected at the later fuel injection timing F2 can be trapped by the depressing 264, to form a stratified air-fuel mixture in the ignition-retard operation zone A. In the example illustrated in FIG. 23B, respective fuel amounts to be injected at the timings F1, F2 can be adjusted to form a weakly stratified mixture at an ignition timing.

Referring to FIG. 24, in the engine according to this embodiment, based on input from the input element (SW1 to SW8) (Step S10), the control unit 100 serving as control means determines whether the engine is operated (Step S11).

When the engine is in a stopped state, the control unit 100 determines whether there is a predetermined request for engine start (e.g., whether an accelerator pedal is depressed) (Step S12). If there is no engine start request, the process returns to Step S10, and will keep a standby state. When the engine start request is issued, the process advances to Step S13.

When the engine is operated or the engine start request is detected, the control unit 100 determines whether there is a request for rapid acceleration from a low-load operation zone B (Step S13). If there is the request for rapid acceleration from a low-load operation zone B, the control unit 100 operates to retard the ignition timing directly to an allowable maximum value after a compression TDC (35 CA degrees), using an experimentally-predetermined control map M1 (Step S14), because in view of meeting the requirement of rapid acceleration from the low-load operation zone B, it is desired to set an effective compression ratio at a high value.

In Step S13, if there is no request for rapid acceleration, the control unit 100 determines whether the engine is operated in the ignition-retard operation zone A (Step S15). When the engine operation zone is determined to be in the ignition-retard operation zone A, the control unit 100 operates to retard the closing timing of the intake valve 30 to a point after the intake BDC, as shown in FIG. 21, to maintain the effective compression ratio $\epsilon_r$ at 13 or more (Step S16). Then, the control unit 100 operates to set the retard amount $R_{Ig}$ of the spark plug 34 to a given crank angle after the compression TDC (in this embodiment, within the stroke range of 10% after the piston 26 passes beyond the compression TDC, using a control map M2 based on FIG. 22, to promptly initiate combustion while suppressing knock, so as to obtain larger torque (Step S17).

After Step S14 or Step S17, the control unit 100 determines whether the engine is operated in a state which allows externals EGR gas to be introduced based on the externals EGR system (Step S18). This determination may be performed by detecting or estimating an in-cylinder temperature and an in-cylinder pressure, as in a conventional manner. In this embodiment, the control unit 100 is designed to introduce external EGR gas, particularly when the engine is operated in the ignition-retard operation zone A including the WOT region $A_{WOT}$.

If the engine operation state meets the introduction of external EGR gas, the control unit 100 operates to set a EGR amount, an air/fuel ratio and a fuel injection timing based on a control map M3 (Step S19), and then activate the external EGR system 160 (Step S20) to produce combustion under external EGR (Step S20). Thus, burnt gas is introduced into the cylinder to allow the engine to be operated at a lower temperature so as to minimize a thermal loss. After Step S21, the process returns to Step S10, and will repeatedly perform the above process.

In Step S18, if the introduction of external EGR gas is determined to be impermissible, the control unit 100 operates to cease from activating the external EGR system 160 (Step S22), and setting an air/fuel ratio based on a control map M4 (Step S23). Then, the process advances to Step S21.

Figure 25:
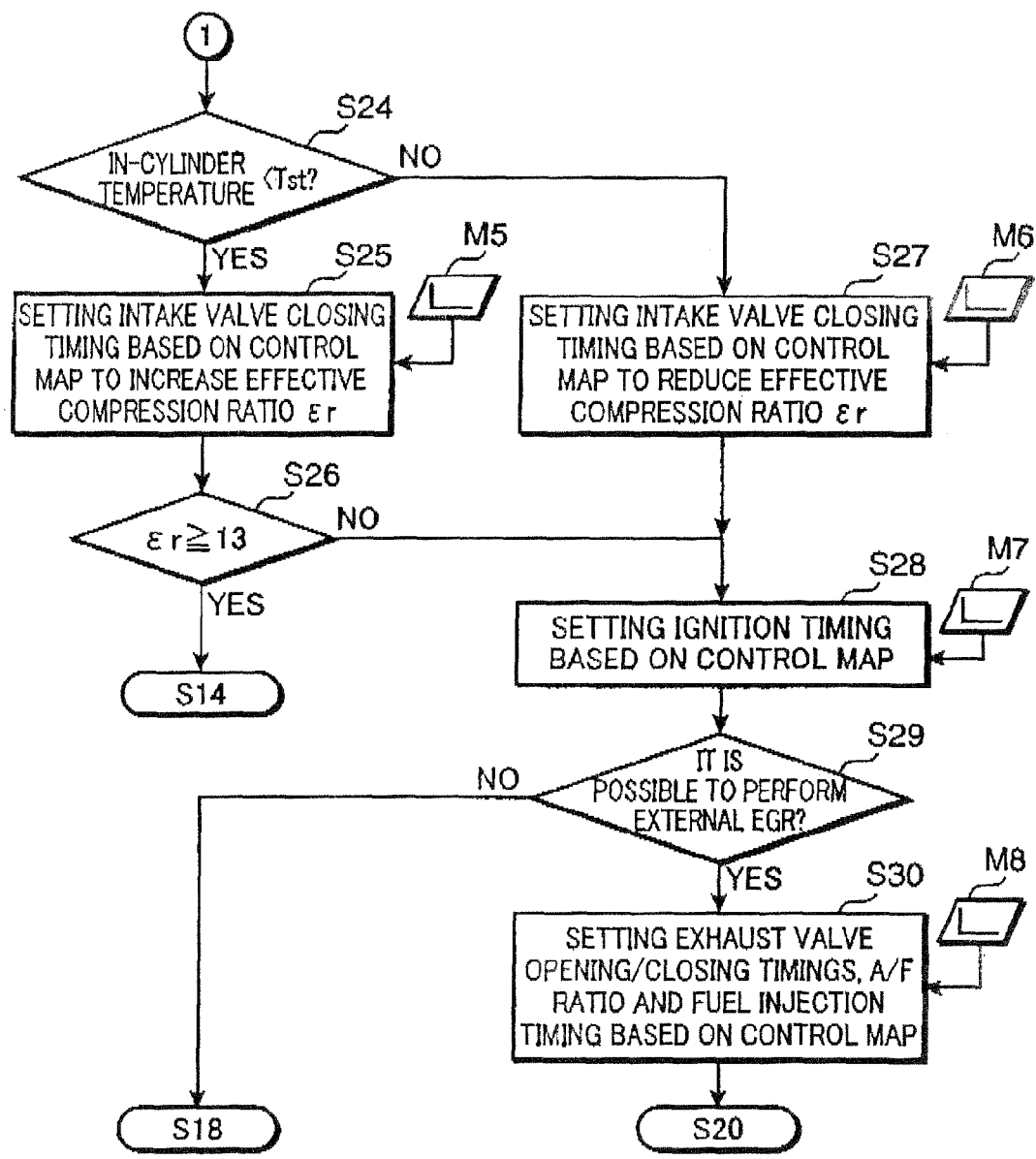
FIG. 25 is a flowchart showing a control process of the control system in FIG. 13.

With reference to FIG. 25, a control to be performed when it is determined in Step S15 that the engine operation zone is not the ignition-retard operation zone A will be described below.

As shown in FIG. 25, in this embodiment, when the engine operation zone is not the ignition-retard operation zone A, the control unit 100 estimates an in-cylinder temperature T based on a detection value from the engine coolant temperature sensor SW2 and/or the intake-air temperature sensor SW2, and determines whether the estimated temperature T is less than a predetermined reference value $T_{ST}$ (Step S24). If the estimated temperature T is less than a predetermined reference value $T_{ST}$, the control unit 100 sets a closing timing of the intake valve 30 based on a control map M 5, and operates to increase the effective compression ratio $\epsilon_r$ (Step S25). Specifically, during a warm-up period (i.e., cold-start operation), the effective compression ratio $\epsilon_r$ will be kept at a low level due to insufficiency in vaporization/atomization of injected fuel and large ignition lag to end gas, and therefore an the heat generation rate will also be kept at a low level. In this embodiment, the engine body has a geometrical compression ratio set at a relatively high. Thus, by taking advantage of this high geometrical compression ratio, the effective compression ratio $\epsilon_r$ can be effectively increased during a given warm-up operation to provide enhanced engine power and fuel economy.

Further, the control unit 100 determines whether the effective compression ratio $\epsilon_r$ to be set is 13 or more (Step S26). If the effective compression ratio $\epsilon_r$ is 13 or more, the process advances to Step S14, and the control unit 100 operates to perform the same process as that in the ignition-retard operation zone A. This makes it possible to reliably prevent knock which would otherwise occur when a high compression ratio is maintained. In Step S24, when the in-cylinder temperature T is equal to or greater than reference value $T_{ST}$, the control unit sets a closing timing of the intake valve 30 based on a control map M6 to reduce the effective compression ratio $\epsilon_r$ (Step S27). If it is determined, subsequently or in Step S26, that the effective compression ratio $\epsilon_r$ is set at a value of less than 13, the control unit 100 sets an ignition timing based on a control map M7 (Step S28). Then, it is determined whether internal EGR is allowable (Step S29). If YES, the control unit 100 sets exhaust-valve opening/closing timings, an air/fuel ratio and a fuel injection timing based on a control map M8 (Step S30). If the engine operation state does not allow the internal EGR, the process skips to Step S18 to determine whether external EGR is allowable. In the above Steps S19, A23, A30, each of the control maps M3, M4, M8 is designed such that if the engine operation zone is a low-speed/low-load operation zone B1, the effective compression ratio is reduced, and then fuel is injected to form a mixture with a stoichiometric air/fuel ratio. The engine according to this embodiment is designed to reduce an effective compression ratio under conditions of high compression ratios so as to ensure a high compression ratio to sufficiently improve fuel economy even in engine operation based on a stoichiometric air/fuel ratio. This makes it possible to employ, as an emission control catalyst to be disposed in the exhaust passage 153, a three-way catalyst which has excellent cost performance and emission conversion efficiency as compared with NOx catalysts, so as to facilitate improving emission performance and fuel economy even in a low speed/low-load operation zone.

As described above, even in engine operation zones (low-speed/ignition-retard operation zone A1 to a medium-to-high-load operation zone A including a WOT region $A_{WOT}$) where it has been generally believed that a large amount of ignition timing retard is essentially required for preventing knock, the engine according to the above embodiment can be operated while maintaining high torque and fuel economy based on an effective compression ratio $\epsilon_r$ set at 13 or more. Specifically, in an engine having an ignition timing $IG_b$ retarded to a point after a compression TDC to avoid knock, as shown in FIG. 22, a cool-flame reaction becomes prominent in cylinders after a compression TDC, and a multistage flaming phenomenon occurs in a combustion process after the compression TDC, as shown FIG. 4. This makes it possible to maintain a heat generation rate while reducing a combustion time loss, so as to obtain a sufficient torque. The maintained heat generation rate also makes it possible to minimize the ignition timing $IG_b$. Further, in the combustion process with the cool-flame reaction, a mol-number is increased to moderate an increase in in-cylinder temperature in spite of an increase in in-cylinder pressure, as shown in FIG. 5. In addition, the cool-flame reaction occurs in a central region of a combustion chamber but the occurrence is less prominent in an end gas region, as shown in FIG. 6. Thus, the increase in in-cylinder temperature is further suppressed. Under such temperature conditions, formaldehyde can be produced to facilitate consumption of OH radicals causing knock, so as to further suppress autoignition. In a design process of increasing a compression ratio in an engine operation zone which is the ignition-retard operation zone including the WOT region within at least low speed range, the above anti-knock mechanism can be incorporated to provide an improvement in thermal efficiency enough to compensate for lowering in engine power due to ignition timing retard, and obtain fuel economy closer to those of diesel engines without sacrificing engine power. Further, the engine is designed to reduce the effective compression ratio $\epsilon_r$ by means of controllably adjusting a closing timing of the intake valve 30. This can eliminate the need for employing a complicate mechanism for changing a geometrical compression ratio.

In the above embodiment, when the engine is operated in a low speed/low-load operation zone B1, the effective compression ratio $\epsilon_r$, which is calculated based on an intake-valve closing timing defined by a valve lift amount of 1 mm, is reduced to less than 13, and the spark plug 34 is activated at a timing advanced relative to a compression TDC by a predetermined value. Further, when the engine is operated in the ignition-retard operation zone A, a retard amount $R_{Ig}$ of ignition timing relative to the compression TDC is set at a value less than an advance amount of ignition timing relative to the compression TDC for the low speed/low-load operation zone B1. Thus, in the above embodiment, when the engine is operated in the low speed/low-load operation zone B1, the effective compression ratio $\epsilon_r$ can be reduced to less than 13 so as to reliably prevent the occurrence of knock, and the ignition timing can be advanced relative to the compression TDC in the same manner as that of conventional engines to achieve adequate combustion at a relatively high compression ratio depending on operation states. Further, the effective compression ratio $\epsilon_r$ can be changed based on the closing timing of the intake valve 30 to reduce a pumping loss and provide enhanced fuel economy. Specifically, if the closing timing of the intake valve 30 is retarded (or advanced) in an engine with a usual compression ratio, the effective compression ratio $\epsilon_r$ is fairly lowered to cause instability in combustion. Thus, such engines have restrictions in an allowable range of retard amount (or advance amount), an allowable EGR ratio, etc. By contrast, in the above embodiment, the geometrical compression ratio is originally set at a fairly high value. Thus, even if the effective compression ratio $\epsilon_r$ is reduced, an actual compression ration can be still maintained at a high value, and combustion stability is enhanced. This makes it possible to extend the allowable range of retard amount (or advance amount) of the intake valve 30, and the EGR ratio can be increased as compared with low-compression engines, on condition of the same valve timing. Further, the retard amount $R_{Ig}$ of ignition timing in the low-speed/ignition-retard operation zone A is set at a relatively small value. Thus, in the low-speed/ignition-retard operation zone A (in the above embodiment, the ignition-retard operation zone A), after transition to an expansion stroke, an extremely high torque can be maintained while avoiding knock.

The low speed range in the above embodiment corresponds to a low speed level determined by dividing the entire engine speed range into three levels: low, medium and high. The above given stroke range (retard amount $R_{Ig}$) in this low speed range is set within 10% of the entire expansion stroke just after the piston 26 passes beyond the compression TDC. Specifically, in the above embodiment, the entire engine speed range is divided into three by these speed ranges. Then, in the low speed range, the closing timing of the intake valve 30 is adjusted in such a manner as to allow the effective compression ratio $\epsilon_r$ in the WOT region to be maintained at 13 or more, and the ignition timing is retarded within 10% of the entire expansion stroke just after the piston 26 passes beyond the compression TDC. This makes it possible to achieve adequate combustion at a relatively high compression ratio depending on operation states.

In the above embodiment, in the engine speed range equal to or higher than the medium engine speed range, the ignition timing is changed to a point before the compression TDC. Further, in the above embodiment, in the high speed range higher than the medium engine speed range, the effective compression ratio $\epsilon_r$ is appropriately reduced to less than 13 depending on engine operation states.

Further, the engine according to the above embodiment is provided with combustion-time reduction means adapted, when the ignition timing is retarded to a point after a top dead center of a compression stroke, to reduce a combustion time of an air-fuel mixture. Thus, the combustion-time reduction means can maximize a heat generation rate in an expansion stroke to suppress a combustion time loss so as to obtain higher torque.

Figure 26:
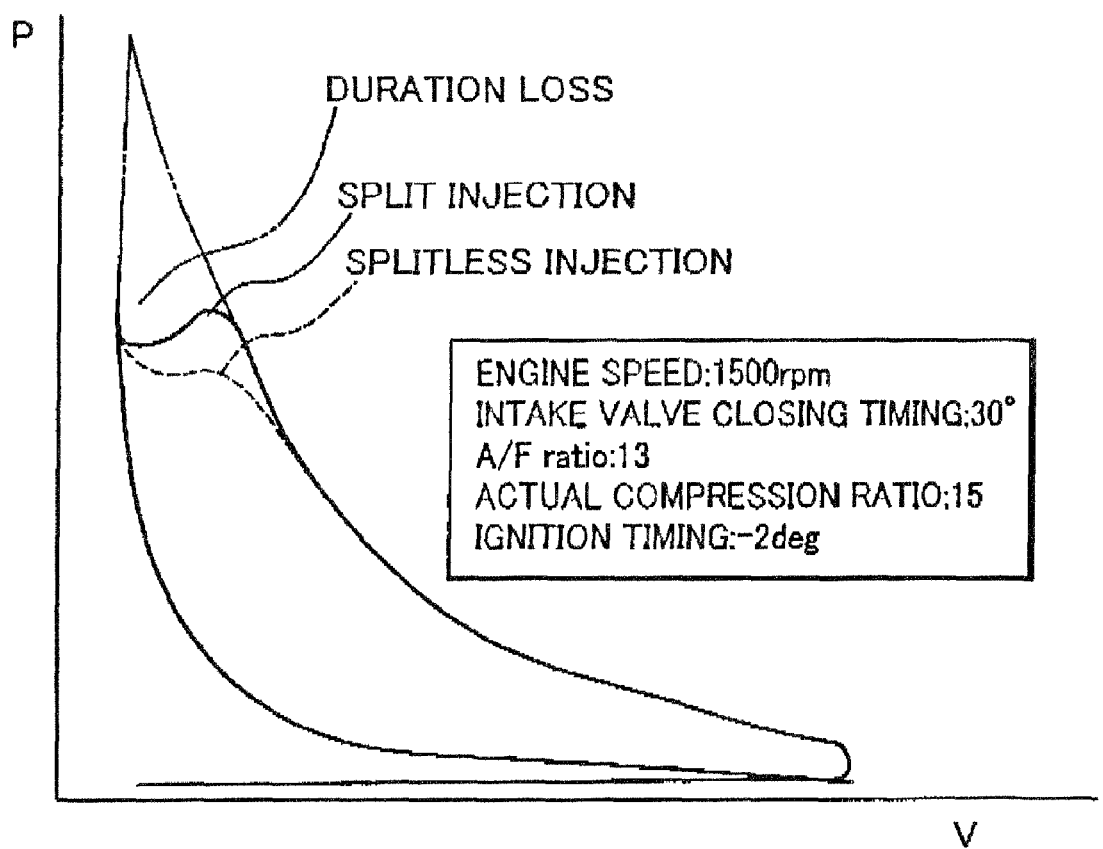
FIG. 26 is a PV diagram relating to the engine in FIG. 13.

FIG. 26 is a PV diagram relating to the embodiment illustrated in FIG. 13.

As shown in FIG. 26, when the ignition timing is retarded to a point after a compression TDC, a combustion time loss will occur as indicated by the two-dot chain line. The combustion-time reduction means (in the illustrated example, a split injection is performed as the combustion-time reduction means) can facilitate an increase in speed of in-cylinder pressure after ignition to reduce the combustion time loss.

A specific example of the combustion-time reduction means includes turbulence generation means for generating turbulences in cylinders (the swirl-forming control valve 133a in FIGS. 13 and 14, and the reverse squish in FIG. 16), and the split fuel injection described in connection with FIG. 23. Thus, in the above embodiment, a heat generation rate in an expansion stroke can be maximized to suppress a combustion time loss so as to obtain higher torque, by means of a relatively simplified mechanism or control. Further, the combustion-time reduction means may be multipoint ignition means adapted to activate the plural number of spark plugs 34. In this case, the multipoint ignition can facilitate increasing a combustion speed to maximize a heat generation rate in an expansion stroke so as to suppress a combustion time loss to obtain higher torque.

Particularly, when the split injection as illustrate in FIG. 23A is performed in the ignition retard operation zone A as the combustion-time reduction means, the split fuel injection can facilitate vaporization/atomization of fuel injected in the intake stroke to form a weakly stratified air-fuel mixture in combustion chambers. Thus, the weakly stratified air-fuel mixture formed in combustion chamber can provide enhanced anti-knock performance.

In the above embodiment, the engine is provided with an external EGR system 160 adapted to adjustably change an amount of external EGR gas according to control of the control unit 100, and the control unit 100 is operable, when the operation zone of the engine body 20 is the ignition retard operation zone including the WOT region $A_{WOT}$, within at least the low speed range, to allow the external EGR system 160 to introduce external EGR gas. In this case, a combustion temperature can be lowered to avoid knock while reducing a cooling loss to provide enhanced thermal efficiency. This makes it possible to obtain high torque and fuel economy. Specifically, in an engine having a high compression ratio, an in-cylinder temperature is sharply increased in a compression stroke to cause the risk of occurrence of knock. Moreover, the sharply generated heat is absorbed by a wall of the cylinder 24 and other component to cause a large heat loss. By contrast, when burnt gas exhausted from the exhaust valves 31 is introduced into the cylinder 24, the combustion temperature can be lowered even under a relatively high effective compression ratio, to suppress both knock and heat loss while maintaining high torque and fuel economy.

In the above embodiment, external EGR gas is introduced in the low-speed/low-load operation zone B1. This makes it possible to further suppress a heat loss in connection with a reduction in effective compression ratio $\epsilon_r$, so as to maintain fuel economy.

In the above embodiment, in the low-speed/low-load operation zone B1, to the close timing of the intake valve is shifted relative to a bottom dead center of an intake stroke by a predetermined amount so as to reduce the effective compression ratio $\epsilon_r$. In this case, the effective compression ratio $\epsilon_r$ can be reduced in an engine operation range apt to cause instability in combustion, to ensure a relatively high expansion ratio. This makes it possible to prevent knock due to the high compression ratio while reducing a pumping loss so as to provide enhanced fuel economy.

In the above embodiment, the engine includes the external EGR system 160 serving as an EGR system adapted to introduce EGR gas into each of the cylinders according to control of the control unit 100. In the low-speed/low-load operation zone B1, the control unit 110 is operable to allow the EGR system to introduce EGR gas. This makes it possible to further suppress a heat loss in connection with a reduction in effective compression ratio so as to maintain high torque and fuel economy. Specifically, in an engine having a high compression ratio, an in-cylinder temperature is sharply increased in a compression stroke. The sharply generated heat is absorbed by the cylinder wall and other component to cause a large heat loss. By contrast, when burnt gas exhausted from the exhaust valves is introduced into the cylinders, the combustion temperature can be lowered in connection with a reduction in effective compression ratio, to suppress heat loss so as to provide high fuel economy.

In the above embodiment, an air/fuel ratio is set at a stoichiometric value in the low-speed/low-load operation zone B1. As described above, a high expansion ratio can be assured by reducing the effective compression ratio under the high compression ratio condition, to sufficiently enhance fuel economy even in an operation at the stoichiometric air/fuel ratio. This makes it possible to employ, as an emission control catalyst to be disposed in the exhaust passage 153, a three-way catalyst which has excellent cost performance and emission conversion efficiency as compared with NOx catalysts, so as to facilitate improving emission performance even in the low speed/low-load operation zone.

In the above embodiment, the low-speed/low-load operation zone B1 includes an idling operation zone B2. In this case, even in the idling operation zone B2 highly frequently used, the high fuel economy can be maintained.

In the above embodiment, the control unit 100 is also serves as in-cylinder temperature estimation means for estimating an internal temperature of the cylinder of the engine body 20. The control unit 100 is operable to detect a cold-start operation based on the estimated in-cylinder temperature, and controllably set the closing timing of the intake valve 30 at a point around an intake BDC in such a manner to increase the effective compression ratio $\epsilon_r$ and ensure a sufficient amount of in-cylinder air. In this case, a sufficient in-cylinder volume can be ensured while increasing the effective compression ratio $\epsilon_r$ so as to increase a volumetric efficiency. This makes it possible to obtain excellent flaming/combustion performance and a sufficient torque to increase the engine speed.

In the above embodiment, the engine includes the accelerator position sensor SW6 serving as engine-acceleration detection means for detecting an engine-acceleration operation, and the control unit 100 is operable, based on the detection of the engine-acceleration detection means, to detect a rapid engine-acceleration operation from a low-load operation zone, and retard the ignition timing directly to an allowable maximum point within a predetermined stroke range (retard amount Rig) just after a compression TDC. This makes it possible to avoid knock due to high-temperature fresh air to be charged during the rapid acceleration.

In the above embodiment, the fuel injection valve 32 is a direct fuel injection type adapted to inject fuel toward and around an electrode of the spark plug 34. The piston crown surface of the piston 26 of the engine body 20 has the peripheral area formed as the raised portion 33 to generating reverse squish flows Ra, Rb when the piston 26 is moved from a compression stroke to a subsequent expansion stroke, and the central area formed as the concave portion 264, and the control unit 100 is operable to control the fuel injection valve 32 in such a manner as to inject fuel in a compression stroke.

In the above embodiment, the concave portion 264 formed in the central area of the crown surface of the piston 26 can ensure a flying distance of injected fuel and generate the reverse squishes Ra, Rb in the peripheral area of the piston 26 in an initial stage of an expansion stroke. Thus, the combustion time can be reduced to prevent knock and maximize thermal efficiency so as to suppress a combustion loss so as to contribute to increase in torque and enhancement in fuel economy.

As above, the engine according to the above embodiment can avoid knock while maintaining a high compression ratio in the ignition-retard operation zone A where an effective compression ratio $\epsilon_r$ has been conventionally lowered using a costly mechanism or an adjustment control of an intake-valve closing timing while sacrificing engine power. Thus, the present invention has significant advantages of being able to satisfy both cost performance and high engine power performance and obtain fuel economy closer to those of diesel engines.

The above embodiment is simply shown and described as one preferred embodiment of the present invention, and the present invention is not limited to the above embodiment.

For example, in the above embodiment, the engine body (the engine) is preferably operated using a fuel having a research octane number (RON) of 96 or more. In the ignition-retard operation zone A which is the high-load operation zone including the WOT region $A_{WOT}$, within the low speed range, the engine can maintain the effective compression ratio $\epsilon_r$ at 13 or more and retard the ignition timing $IG_b$ to a point after a compression TDC by the predetermined retard amount $R_{Ig}$ to obtain a high torque by taking advantage of a cool-flame reaction in the most effective manner. As mentioned above in connection with FIGS. 3 and 1, fuel having 96 RON or more injected into the cylinders can provide energy greater than activation energy triggering a cool-flame reaction, and the igniting retard can increase an amount of heat to be generated by the cool-flame reaction, to produce higher torque.

Preferably, in the above embodiment, an upper limit of the geometrical compression ratio $\epsilon$ of the engine body 20 is 16. In this case, even if a relatively high effective compression ratio $\epsilon_r$ is maintained under the conditions highly likely to cause autoignition, such as a low-speed/full-load operation with a high intake-air temperature or a hot-start operation, the occurrence of preignition or the like can be avoided.

Further, in one aspect of the present invention, when the engine body 20 is operated using a fuel having 91 RON or more, the engine body 20 may have a geometrical compression ratio set at 13.5 or more, and the control unit 100 may be designed to, when an engine operation zone is the ignition-retard operation zone A including the WOT region $A_{WOT}$, within the low speed range, adjust the intake-valve closing timing in such a manner as to maintain the effective compression ratio $\epsilon_r$ at 12.5 or more, and retard the ignition timing $IG_b$ to a point within the predetermined stroke range just after a compression TDC. According to this aspect of the present invention, even if fuel having a relatively low octane number (RON) is used, the engine can obtain a high torque by taking advantage of a cool-flame reaction in an effective manner in the engine operation zone which is the ignition-retard operation zone A including the WOT region $A_{WOT}$, within the low speed range.

Preferably, in the spark-ignition gasoline engine to be operated using a fuel having 91 RON or more, an upper limit of the geometrical compression ratio of the engine body 20 is 15.5. Even if a relatively high effective compression ratio $\epsilon_r$ is maintained under the conditions highly likely to cause autoignition, such as a low-speed/full-load operation with a high intake-air temperature or a hot-start operation, the engine can prevent the occurrence of preignition or the like.

As another aspect of the present invention, when the engine body 20 is operated using a fuel having 100 RON or more, an upper limit of the geometrical compression ratio of the engine body 20 is preferably 16.5. Even if a relatively high effective compression ratio $\epsilon_r$ is maintained under the conditions highly likely to cause autoignition, such as a low-speed/full-load operation with a high intake-air temperature or a hot-start operation, the engine according to this embodiment can prevent the occurrence of preignition or the like.

While the engine in the above embodiment employs the valve operating mechanism 40 adapted to steplessly change the closing timing of the intake valve 30, as a means to reduce the effective compression ratio $\epsilon_r$ the present invention is not limited to this mechanism. For example, a valve operating mechanism with a lost motion function may be used which is designed to selectively associate two intake cams with the intake valve 30 to change the opening/closing timings of the intake valves 30 in a two-stage manner.

Figure 27:
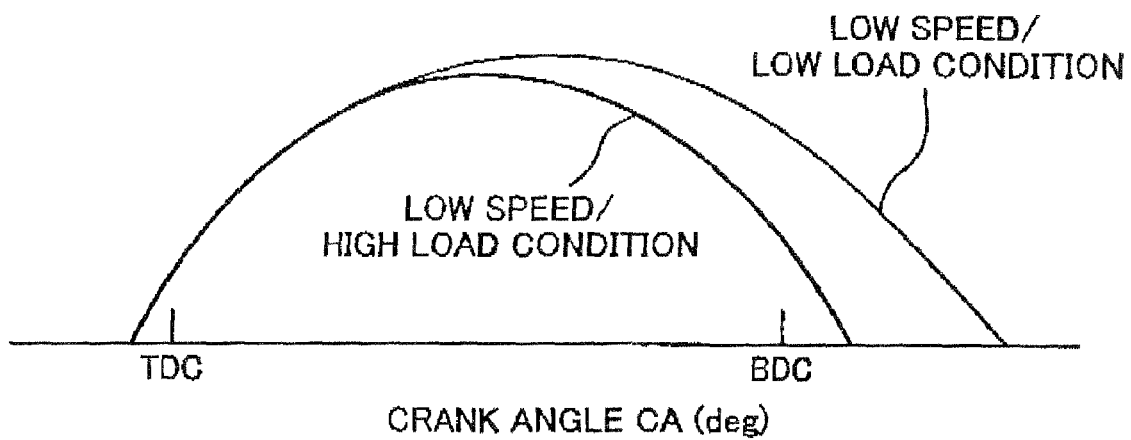
FIG. 27 is a graph showing one example of a control using a valve operating mechanism with a lost motion function.

FIG. 27 is a graph showing one example of a control using the lost-motion valve operating mechanism.

As shown in FIG. 27, in the engine employing the lost-motion valve operating mechanism, the control unit 100 is operable to retard the closing timing of the intake valve 30. In this case, although a part of fresh air introduced into the cylinder will be pushed back to cause a slight increase in pumping loss, the effective compression ratio $\epsilon_r$ can be reduced to avoid knock by use of a low-cost mechanism.

The lost-motion valve operating mechanism may also be used as means to perform an internal EGR mechanism.

Figure 28:
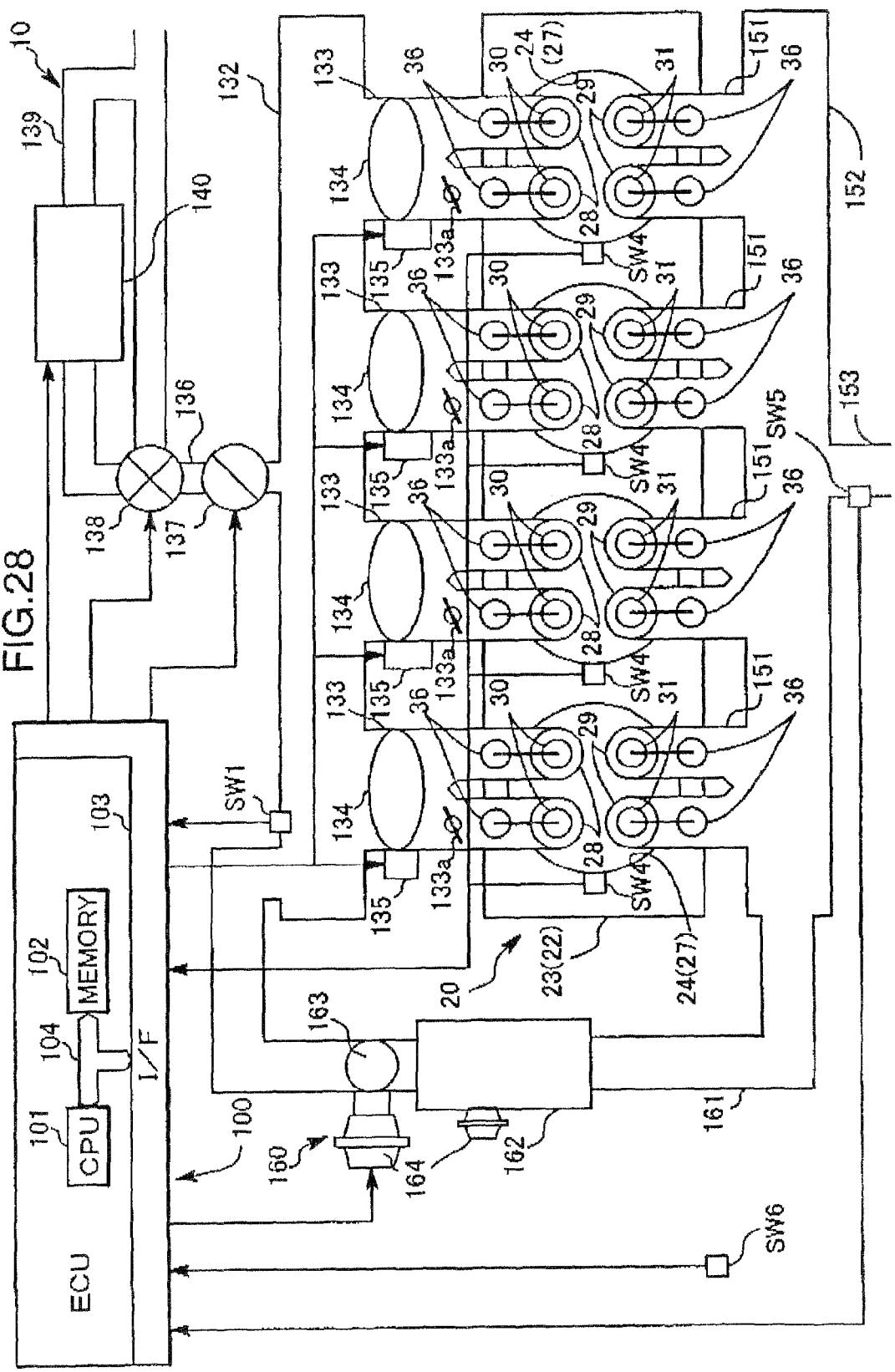
FIG. 28 is a schematic diagram showing an intake-air heating system serving as intake-air heating means, in a spark-ignition gasoline engine according to another embodiment of the present invention.

FIG. 28 is a schematic diagram showing an intake-air heating system as intake-air heating means for use in a spark-ignition gasoline engine according to another embodiment of the present invention.

Referring to FIG. 28, when the engine of present invention is used for homogenous-charge compression-ignition (HCCI) combustion, a heater 140 is preferably provided as the intake-air heating means.

Specifically, a three-way solenoid valve 138 is disposed on an upstream side of a throttle valve 137 of an intake passage 136, and the heater 140 is provided in a bypass passage connected to the three-way solenoid valve 138. A temperature sensor SW7 is mounted on the heater 140 to detect a temperature of intake air in the intake-air passage 139. This temperature sensor SW7 is connected to a control unit (not shown).

Figure 29:
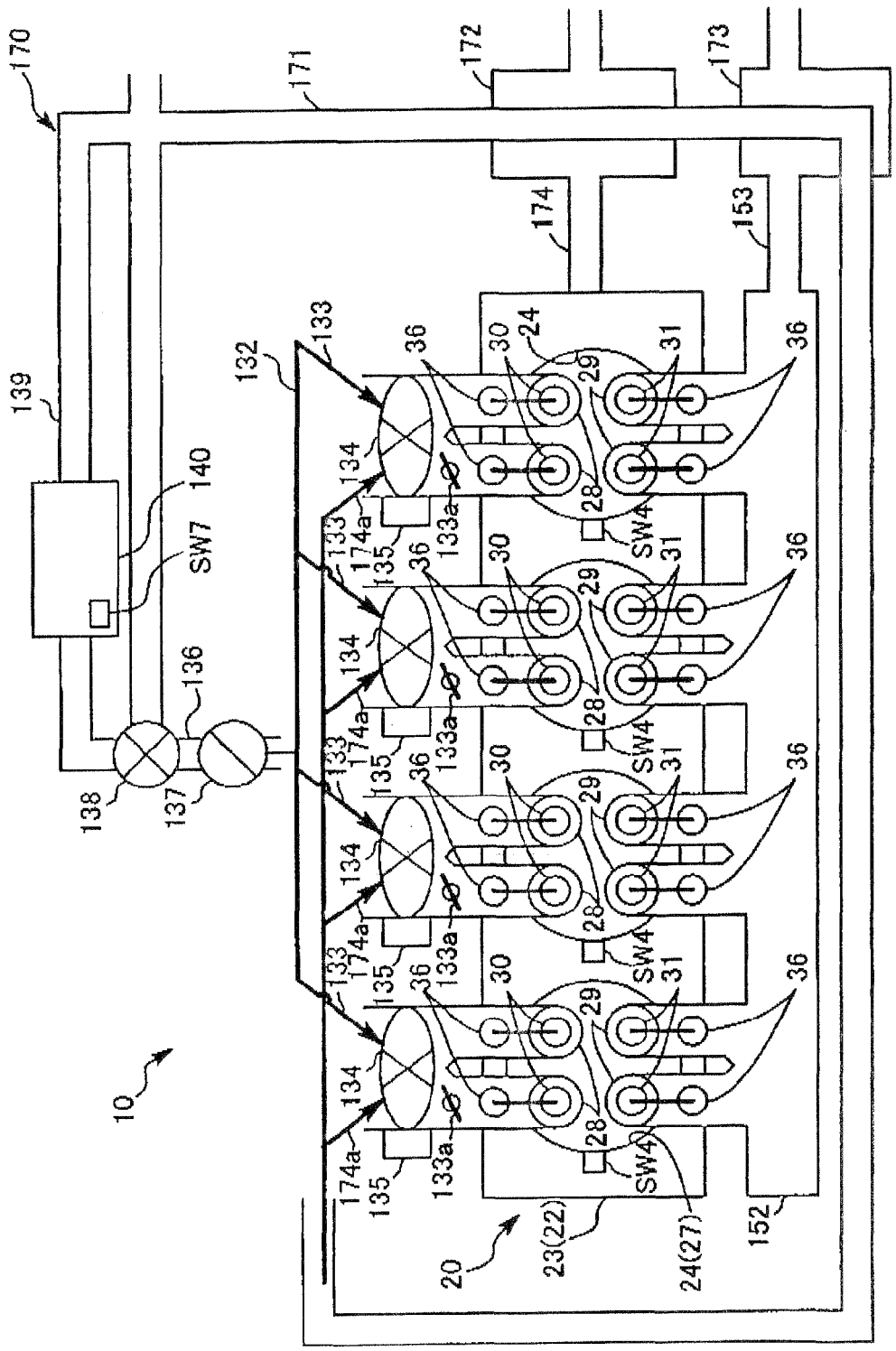
FIG. 29 is a schematic diagram showing the structure of the intake-air heating system in FIG. 28, which serves as the intake-air heating means.

FIG. 29 is a schematic diagram showing an intake-air heating system 170 as the intake-air heating means for use in the spark-ignition gasoline engine in FIG. 28.

Referring to FIG. 29, a heating passage 171 is branched from the intake-air passage 136. A coolant-based heat exchanger 172 and an exhaust-based heat exchanger 173 are associated with the heating passage 171 individually.

The heating passage 171 serves as a means to recirculate heat absorbed through heat the exchangers 172, 173 to the intake system. A plurality of branch pipes 174a connected to respective cylinders 24 are branched from to a downstream end of the heating passage 171. Each of the branch pipes 174a is connected to an intake-side inlet port of a corresponding one of a plurality of control valves 134.

The coolant-based heat exchanger 172 is connected to a water-cooling system 174 of an engine body 20 and adapted to allow intake air passing through the heating passage 171 to absorb heat of engine coolant which is being circulating from the engine body 20 to a radiator (not shown) after absorbing the heat from the engine body.

The exhaust-based heat exchanger 173 is connected to an exhaust passage 153 of an engine body 20 and adapted to allow intake air passing through the heating passage 171 to absorb heat of burnt gas. The exhaust-based heat exchanger 173 is associated with the heating passage 171 on the downstream side of the coolant-based heat exchanger 172.

In this embodiment, these heat exchangers 172, 173 serve as key components of the intake-air heating system 170.

The three-way solenoid valve 138 is designed to variably change a level of valve opening according to control of a control unit 100 in the same manner as that for the control valves 134. Thus, the three-way solenoid valve 138 can be selectively switched to introduce outside fresh air directly into an intake manifold 132 or introduce air heated by the heater 140 into the intake manifold 132.

With reference to FIGS. 30 to 33, a spark-ignition gasoline engine according to still another embodiment of the present invention will be described below.

As shown in FIGS. 30 to 32B, an engine body 20 has a cylinder bead 23 mounting therein a port fuel injection valve 32 which is opened to an intake port 28. This port fuel injection valve 32 is operable, in response to an fuel injection pulse signal from the control unit 100 and inject fuel corresponding to a pulse width of the signal, into a combustion chamber 27 through the intake port 28 in an intake stroke 28 of each cylinder.

Figure 32A:
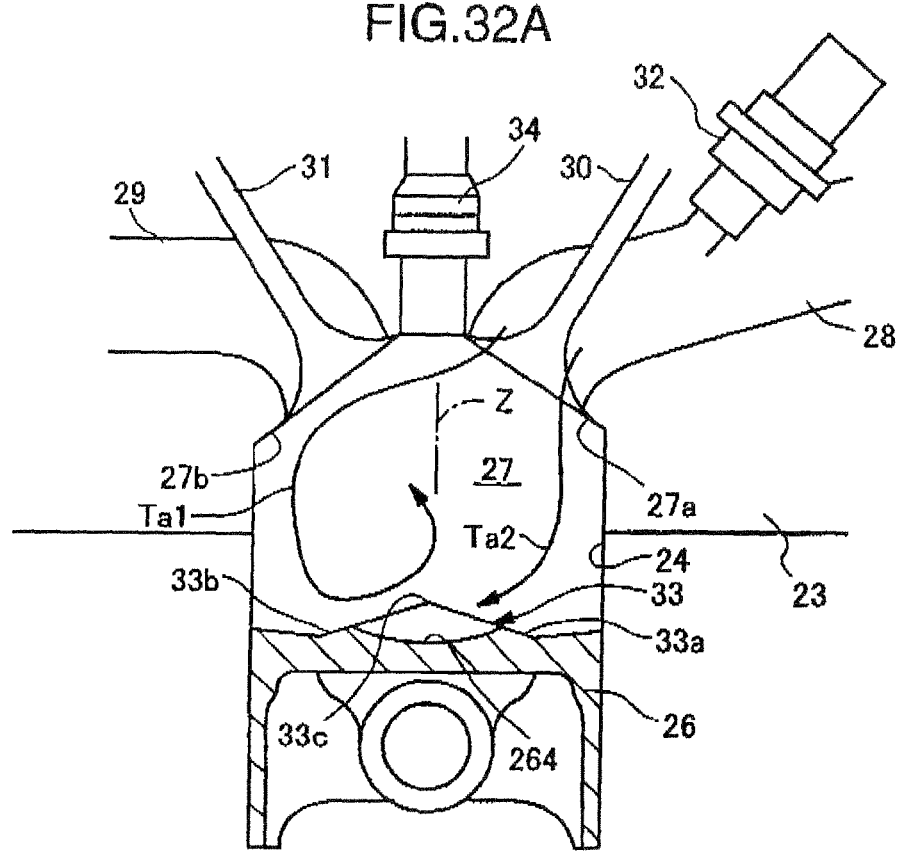
FIG. 32A is an explanatory diagram showing a gas flow in a combustion chamber of the engine in FIG. 30, in an initial stage of a compression stroke.
Figure 32B:
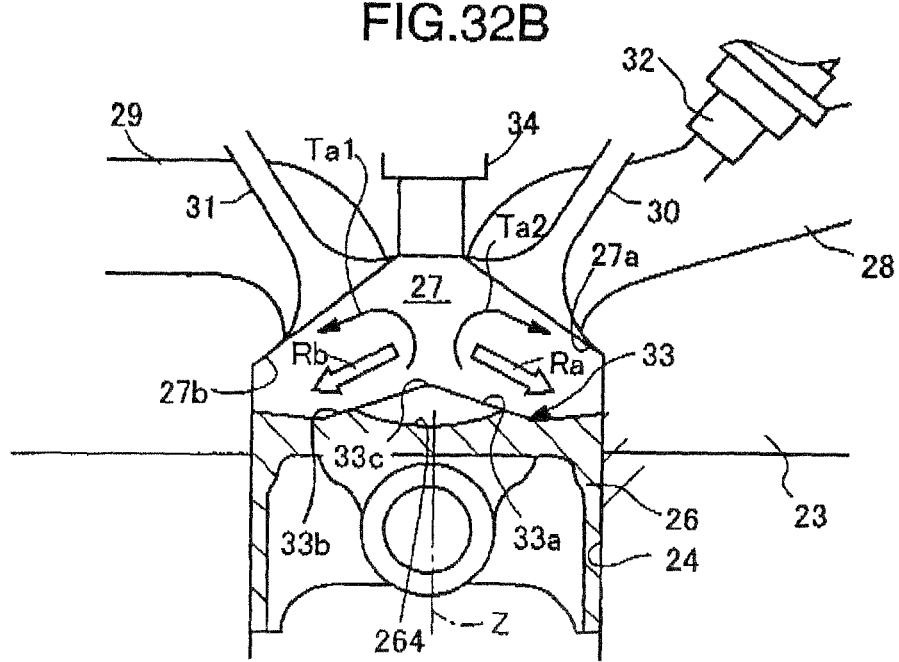
FIG. 32B is an explanatory diagram showing a gas flow in the combustion chamber in FIG. 32A, in an initial stage of an expansion stroke.

Further, as shown in FIGS. 32A and 32B, two squish-area forming surfaces 33$a$, 33$b$ are formed, respectively, in a given range of an intake-side peripheral area of a crown surface of the piston 26, and in a given range of an exhaust-side peripheral area of the crown surface, to inclinedly extend, respectively, along two inclined surface of a cylinder head 23. The piston crown surface also includes a raised portion 33 on an inward side of the squish-area forming surfaces 33$a$, 33$b$. Further, the raised portion 33 is provided in a top 33$c$ of the piston crown surface and on an inward of the top. The piston crown surface is formed with a concave portion 264 over a range of the top 33$c$ and the inclined surfaces 33$a$, 33$b$ of the raised portion 33.

Thus, in the embodiment illustrated in FIGS. 30 to 32A, two reverse squish flows Ra, Rb generated in an expansion stroke are strengthened to sufficiently increase a combustion speed in the squish area so as to increase a speed of primary flaming combustion to achieve rapid combustion. By contrast, a speed of initial combustion is reasonably increased. This makes it possible to significantly reduce a time period of the primary combustion so as to prevent the occurrence of knock and reduce a combustion time loss based on the rapid combustion so as to provide enhanced thermal efficiency.

In addition, the pair of inclined surfaces 33$a$, 33$b$ are disposed in parallel relation to respective inclined surfaces 27$a$, 27$b$ of a combustion-chamber roof. This makes it possible to evenly promote flame propagation in a space defined therebetween so as to effectively prevent detonation. In a region where the engine is operated at an effective compression ratio $\epsilon_r$ of 13 or more, the concave portion 264 also contributes to produce a cool flame in the combustion chamber 27 after the compression TDC so as to serve as means for providing further enhanced engine power.

Further, in the region where the engine is operated at an effective compression ratio $\epsilon_r$ of 13 or more, the concave portion 264 facilitates forming a cool-flame reaction in the combustion chamber 27 to serve as means for further enhance the engine power.

Figure 30:
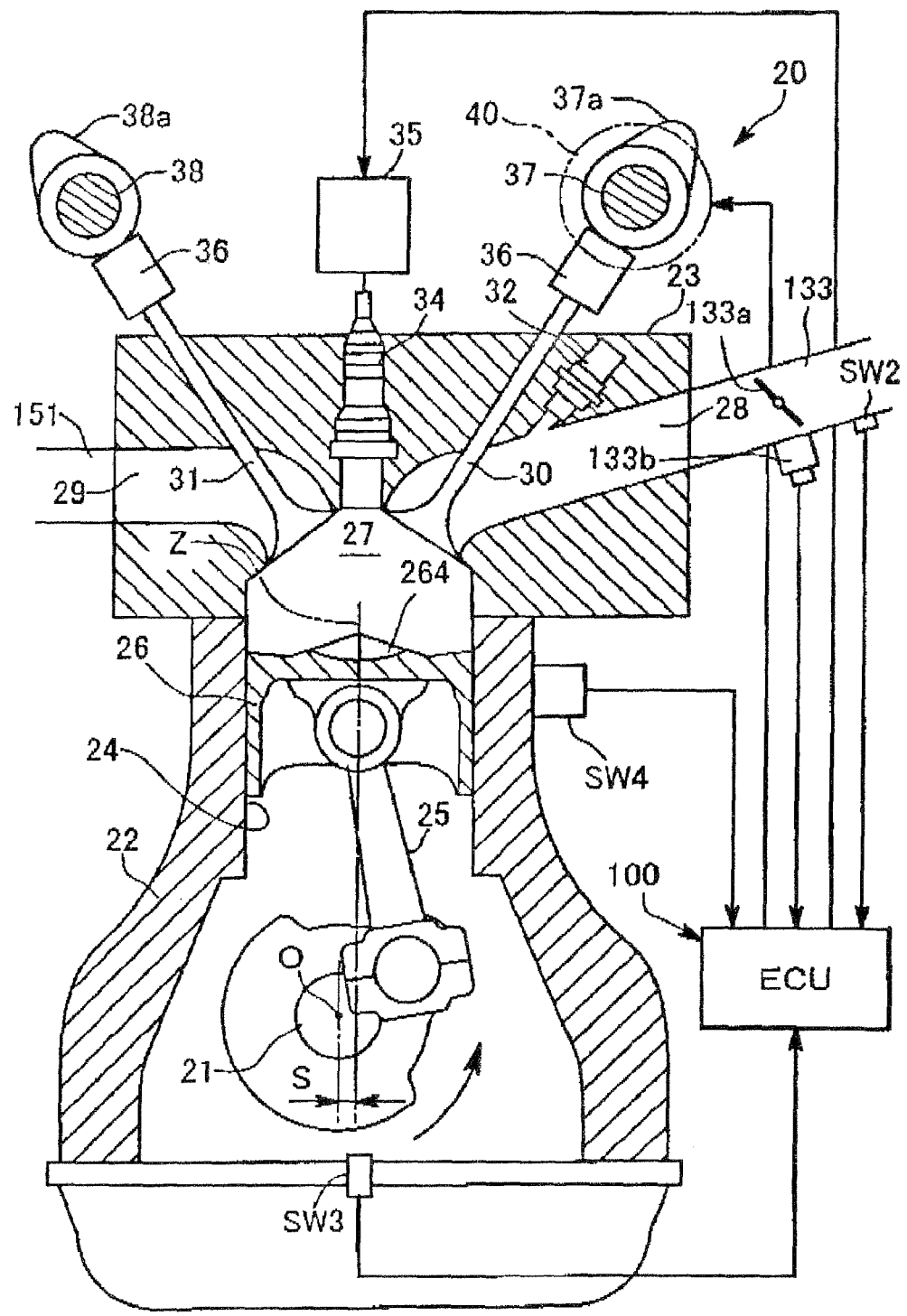
FIG. 30 is a schematic sectional view showing one cylinder of a port fuel injection-type four-stroke spark-ignition gasoline engine according to another embodiment of the present invention.
Figure 31:
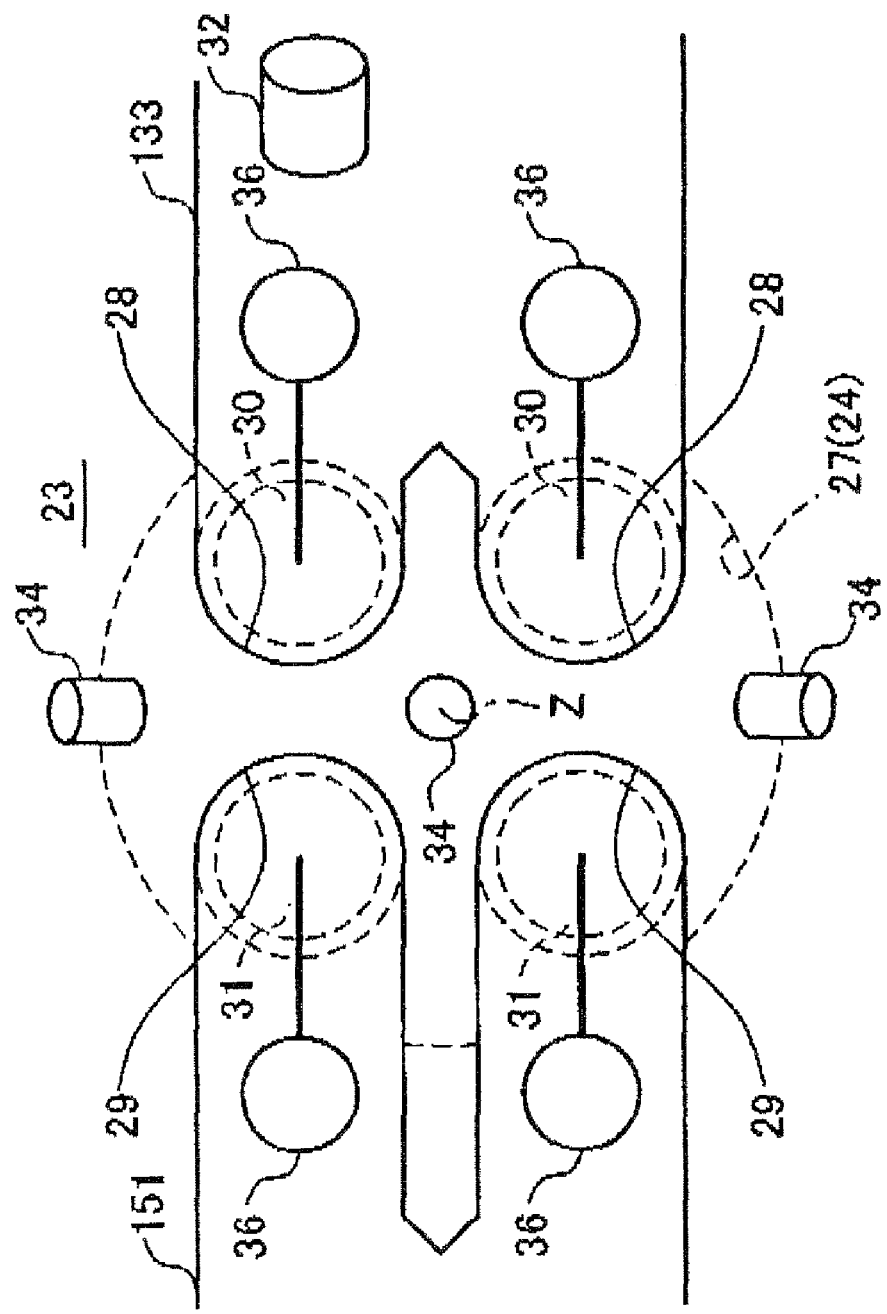
FIG. 31 is a schematic enlarged top plan view showing the cylinder in FIG. 30.
Figure 33:
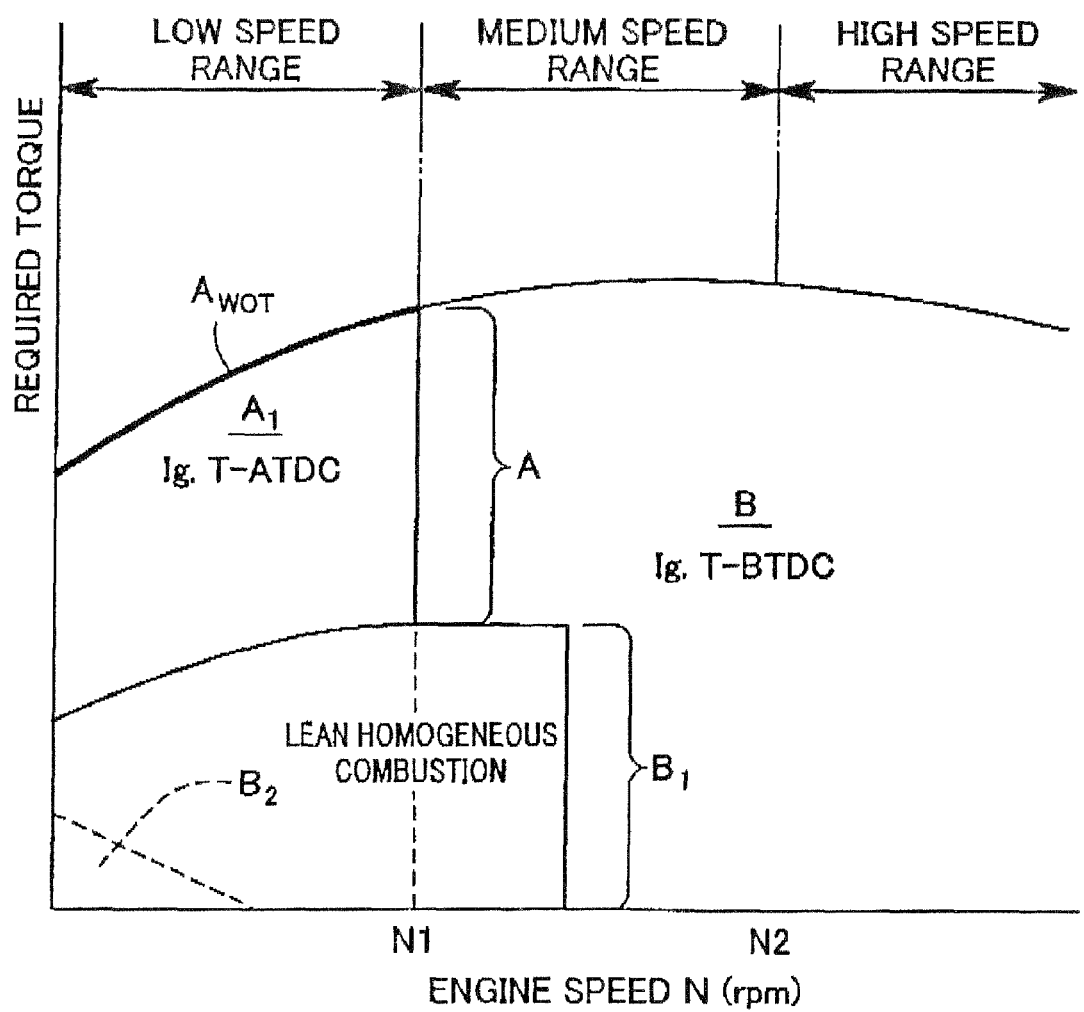
FIG. 33 is a graph showing a relationship between an engine speed and a required torque, which serves as a basis for a control map of a control system of a four-stroke spark-ignition gasoline engine according to another embodiment of the present invention.

FIG. 33 is a graph showing a relationship between an engine speed N and a required torque, which serves as a basis for the control map in the embodiment illustrated in FIG. 30.

Referring to FIG. 33, when an entire engine speed range is divided into a low speed range, a medium speed range and high speed range, in the same manner as that in FIG. 20, an ignition-retard operation zone A in the illustrated graph is set in a range of a given medium ignition-retard operation zone A1 to a WOT region $A_{WOT}$, within the above low speed range. In the ignition-retard operation zone A, a valve closing timing of the intake valve 30 is adjusted to allow the effective compression ratio $\epsilon_r$ which is calculated based on an intake-valve closing timing defined by a valve lift amount is 1 mm, to be maintained at 13 or more.

Further, as indicated by the broken line, a normal-ignition operation zone B has a low-load operation zone B1 which extends from the low speed range to an initial half of the medium speed range, and the low-load operation zone B1 includes an idling operation zone C1. In this example, a fuel injection amount in the low-load operation zone B1 is set to allow the engine to be operated by homogenous lean combustion.

The flowcharts in FIGS. 24 and 25 may be applied to the embodiment in FIGS. 30 to 33. Further, the modifications in FIGS. 27 to 29 may also be applied thereto according to need.

In summary, one aspect of the present invention, a spark-ignition gasoline engine having at least a spark plug, comprises an engine body having a geometrical compression ratio set at 14 or more, an intake valve and an exhaust valve which are provided, respectively, in intake and exhaust ports connected to each of a plurality of cylinders of the engine body, and adapted to open and close corresponding ones of the intake and exhaust ports, operation-state detection means adapted to detect an engine operation state, and control means adapted, based on detection of the operation-state detection means, to perform at least an adjustment control of an ignition timing of the spark plug, and an adjustment control of an effective compression ratio by means of an adjustment control of a closing timing of the intake valve. The control means is operable, when an operation zone of the engine body is a high-load operation zone including a wide open throttle region within at least a low speed range, to adjust a closing timing of the intake valve in such a manner as to maintain the effective compression ratio at 13 or more, and retard the ignition timing to a point within a predetermined stroke range just after a top dead center of a compression stroke. The effective compression ratio is calculated based on an intake-valve closing timing defined by a valve lift amount of 1 mm.

In a preferred embodiment, the engine body is operated using a fuel having a research octane number (RON) of 96 or more. In the engine operation zone which is a high-load operation zone including a wide open throttle (WOT) region within at least a low speed range, the engine can maintain the effective compression ratio at 13 or more and retard the ignition timing to a point within the predetermined stroke range to obtain a high torque by taking advantage of a cool-flame reaction in the most effective manner. Fuel having 96 RON or more injected into the cylinders can provide energy greater than activation energy triggering a cool-flame reaction at a compression ratio of 13 or more to produce higher torque, as described in detail later.

Preferably, in the above spark-ignition gasoline engine, an upper limit of the geometrical compression ratio of the engine body is 16. Even if a relatively high effective compression ratio is maintained under the conditions highly likely to cause autoignition, such as a low-speed/full-load operation with a high intake-air temperature or a hot-start operation, the engine according to this embodiment can prevent the occurrence of preignition or the like.

In a preferred embodiment, the engine is operated using a fuel having a research octane number (RON) of 100 or more, and an upper limit of the geometrical compression ratio of the engine body is preferably 16.5. Even if a relatively high effective compression ratio is maintained under the conditions highly likely to cause autoignition, such as a low-speed/full-load operation with a high intake-air temperature or a hot-start operation, the engine according to this embodiment can prevent the occurrence of preignition or the like.

In another aspect of the present invention, a spark-ignition gasoline engine having at least a spark plug and using a fuel having a research octane number (RON) of 91 or more comprises an engine body having a geometrical compression ratio set at 13.5 or more wherein the engine body being operated using a fuel having a research octane number (RON) of 91 or more, an intake valve and an exhaust valve which are provided, respectively, in intake and exhaust ports connected to each of a plurality of cylinders of the engine body, the intake and exhaust valves being adapted to open and close corresponding ones of the intake and exhaust ports, operation-state detection means adapted to detect an engine operation state, and control means adapted, based on detection of the operation-state detection means, to perform at least an adjustment control of an ignition timing of the spark plug, and an adjustment control of an effective compression ratio by means of an adjustment control of a closing timing of the intake valve. The control means is operable, when the engine operation zone is a high-load operation zone including a wide open throttle region within at least a low speed range, to adjust a closing timing of the intake valve in such a manner as to maintain the effective compression ratio at 12.5 or more, and retard the ignition timing to a point within a predetermined stroke range just after a top dead center of a compression stroke. The effective compression ratio is calculated based on an intake-valve closing timing defined by a valve lift amount of 1 mm.

According to this aspect of the present invention, even if fuel having a relatively low octane number (RON) is used, the engine can obtain a high torque by taking advantage of a cool-flame reaction in the most effective manner in the engine operation zone which is a high-load operation zone including a WOT region within at least a low speed range.

Preferably, in the spark-ignition gasoline engine to be operated using a fuel having 91 RON or more, an upper limit of the geometrical compression ratio of the engine body is 15.5. Even if a relatively high effective compression ratio is maintained under the conditions highly likely to cause autoignition, such as a low-speed/full-load operation with a high intake-air temperature or a hot-start operation, the engine according to this embodiment can prevent the occurrence of preignition or the like.

In the spark-ignition gasoline engine of the present invention wherein a geometrical compression ratio is set at 14 or more, the control means may be operable, when the engine operation state is a low-speed/low-load operation zone, to reduce the effective compression ratio to less than 13, and activate the spark plug at a timing advanced relative to a top dead center of a compression stroke by a predetermined amount, wherein the predetermined stroke range is set to be less than the amount of ignition timing advance relative to the top dead center of the compression stroke in the low-speed/low-load operation zone. According to this embodiment, in the low-speed/low-load operation zone, the effective compression ratio is reduced to less than 13 to reliably prevent the occurrence of knock, and the ignition timing is advanced relative to a compression TDC in the same manner as that in conventional engines to achieve adequate combustion at a relatively high compression ratio depending on engine operation states. In addition, the effective compression ratio can be changed based on the closing timing of the intake valve to reduce a pumping loss and provide enhanced fuel economy. Specifically, if the closing timing of the intake valve is retarded (or advanced) in an engine with a usual compression ratio, the effective compression ratio is fairly lowered to cause instability in combustion. Thus, such engines have restrictions in an allowable range of retard amount (or advance amount), an allowable EGR ratio, etc. By contrast, in the engine of the present invention, the geometrical compression ratio is originally set at a fairly high value. Thus, even if the effective compression ratio is reduced, an actual compression ration can be still maintained at a high value, and combustion stability is enhanced. This makes it possible to extend the allowable range of retard amount (or advance amount) of the intake valve, and the EGR ratio can be increased as compared with the low-compression engines, on condition of the same valve timing. Further, the retard amount of ignition timing in the low speed range is set at a relatively small value. Thus, in a low-speed/high-load operation zone, after transition to an expansion stroke, an extremely high torque can be maintained while avoiding knock.

In the spark-ignition gasoline engine of the present invention wherein a geometrical compression ratio is set at 14 or more, the low speed range to be set in the control means may correspond to a low speed level determined by dividing an entire engine speed range into three levels: low, medium and high, and the predetermined stroke range may be set within 10% of an entire expansion stroke just after a piston of the cylinder passes beyond the top dead center of the compression stroke. Specifically, in the above embodiment, the entire engine speed range is divided into three by these engine speed ranges. Then, in the low speed range, the closing timing of the intake valve is adjusted in such a manner as to allow the effective compression ratio in the WOT region to be maintained at 13 or more, and the ignition timing is retarded within 10% of the entire expansion stroke just after the piston passes beyond the compression TDC. This makes it possible to achieve adequate combustion at a relatively high compression ratio depending on operation states. In this case, it is not essential to divide the entire engine speed range into a plurality of ranges equally.

Preferably, in the spark-ignition gasoline engine of the present invention wherein a geometrical compression ratio is set at 14 or more, the control means is operable, in the engine speed range equal to or higher than a medium speed ranger, to change the ignition timing to a point before the top dead center of the compression stroke.

Preferably, the above engine in each aspect of the present invention includes combustion-time reduction means adapted, when the ignition timing is retarded to a point after a top dead center of a compression stroke, to reduce a combustion time of an air-fuel mixture. In this case, the combustion-time reduction means can maximize a heat generation rate in an expansion stroke to suppress a combustion time loss so as to obtain higher torque.

Preferably, in this embodiment, the combustion-time reduction means includes turbulence generation means for generating turbulences in each of the cylinders. In this case, a heat generation rate in an expansion stroke can be maximized to suppress a combustion time loss so as to obtain higher torque, by means of a relatively simplified mechanism or control.

Preferably, in the above embodiments, the spark plug is provided in a plural number to each of the cylinders, and the combustion-time reduction means includes multipoint ignition means adapted to activate the plural number of spark plugs. In this case, the multipoint ignition can facilitate increasing a combustion speed to maximize a heat generation rate in an expansion stroke so as to suppress a combustion time loss to obtain higher torque.

Preferably, the above engine in each aspect of the present invention includes an external EGR system adapted to adjustably change an amount of external EGR gas to be introduced into each of the cylinders according to control of the control means, and the control means is operable, when the engine operation zone is the high-load operation zone including the wide open throttle region within at least the low speed range, to allow the external EGR system to introduce external EGR gas. In this case, a combustion temperature can be lowered to avoid knock while reducing a cooling loss to provide enhanced thermal efficiency. This makes it possible to obtain high torque and fuel economy. Specifically, in an engine having a high compression ratio, an in-cylinder temperature is sharply increased in a compression stroke to cause the risk of occurrence of knock. Moreover, the sharply generated heat is absorbed by a cylinder wall and other component to cause a large heat loss. By contrast, when burnt gas exhausted from the exhaust valves is introduced into the cylinders, the combustion temperature can be lowered even under a relatively high effective compression ratio, to suppress both knock and heat loss while maintaining high torque and fuel economy.

Preferably, in the engine having the external EGR system, the control means is operable, in at least a low-speed/low-load operation zone, to allow the external EGR system to introduce external EGR gas. This makes it possible to further suppress a heat loss in connection with a reduction in effective compression ratio so as to maintain high torque and fuel economy.

Preferably, in the above engine in each aspect of the present invention, the control means is operable, in at least a low-speed/low-load operation zone, to shift the close timing of the intake valve relative to a bottom dead center of an intake stroke by a predetermined amount so as to reduce the effective compression ratio. In this case, the effective compression ratio can be reduced in an engine operation range apt to cause instability in combustion, to ensure a relatively high expansion ratio. This makes it possible to prevent knock due to the high compression ratio while reducing a pumping loss so as to provide enhanced fuel economy.

Preferably, the above engine designed to shift the close timing of the intake valve relative to a bottom dead center of an intake stroke by a predetermined amount in the low-speed/low-load operation zone so as to reduce the effective compression ratio, includes an EGR system adapted to introduce EGR gas into each of the cylinders according to control of the control means, and the control means is operable, in at least the low-speed/low-load operation zone, to allow the EGR system to introduce EGR gas. This makes it possible to further suppress a heat loss in connection with a reduction in effective compression ratio so as to maintain high torque and fuel economy. Specifically, in an engine having a high compression ratio, an in-cylinder temperature is sharply increased in a compression stroke. The sharply generated heat is absorbed by a cylinder wall and other component to cause a large heat loss. By contrast, when burnt gas exhausted from the exhaust valves is introduced into the cylinders, the combustion temperature can be lowered in connection with a reduction in effective compression ratio, to suppress heat loss so as to provide high fuel economy.

Preferably, in the engine having an EGR system adapted to introduce EGR gas into each of the cylinders according to control of the control means, the control means is operable, in at least the low-speed/low-load operation zone, to set an air/fuel ratio at a stoichiometric value. As described above, a high expansion ratio can be assured by reducing the effective compression ratio under the high compression ratio condition, to sufficiently enhance fuel economy even in an operation at the stoichiometric air/fuel ratio. This makes it possible to employ, as an emission control catalyst to be disposed in an exhaust passage, a three-way catalyst which has excellent cost performance and emission conversion efficiency as compared with NOx catalysts, so as to facilitate improving emission performance even in a low speed/low-load operation zone.

Preferably, in the engine having an EGR system adapted to introduce EGR gas into each of the cylinders according to control of the control means, the low-speed and low-load operation zone to be set in the control means includes an idling operation zone. In this case, even in the idling operation zone highly frequently used, the high fuel economy can be maintained.

Preferably, the above engine in each aspect of the present invention includes in-cylinder temperature estimation means for estimating an in-cylinder temperature in the engine body, and the control means is operable to detect a cold-start operation based on the in-cylinder temperature estimated by the in-cylinder temperature estimation means, and control the closing timing of the intake valve in such a manner to increase the effective compression ratio and ensure a sufficient amount of in-cylinder air. In this case, a sufficient in-cylinder volume can be ensured while increasing the effective compression ratio so as to increase a volumetric efficiency. This makes it possible to obtain excellent flaming/combustion performance and a sufficient torque to increase the engine speed.

Preferably, the above engine in each aspect of the present invention includes engine-acceleration detection means for detecting an engine-acceleration operation, and the control means is operable, based on the detection of the engine-acceleration detection means, to detect a rapid engine-acceleration operation from a low-load operation zone, and retard the ignition timing directly to an allowable maximum point within the predetermined stroke range just after a top dead center of a compression stroke. This makes it possible to avoid knock due to high-temperature fresh air to be charged during the rapid acceleration.

Preferably, the above engine in each aspect of the present invention includes a fuel injection valve adapted to variably change a fuel injection timing according to control of the control means, and the fuel injection valve is a direct fuel injection type adapted to inject fuel toward and around an electrode of the spark plug.

Preferably, in the engine employing the above direct fuel injection valve, the control means is operable, when the engine operation zone is a medium/high-load operation zone ranging from at least a given medium-load operation zone to the wide open throttle region within the low speed range, to perform a split injection control of allowing the fuel injection valve to inject fuel at a plurality of times at predetermined timings within an intake stroke and a subsequent compression stroke. In this case, the split fuel injection can facilitate vaporization/atomization of fuel injected in the intake stroke to form a weakly stratified air-fuel mixture in combustion chambers so as to reduce the combustion time to provide high engine power and enhanced fuel economy.

Preferably, in the engine employing the direct fuel injection valve, the engine body includes a piston with a piston crown surface which has an peripheral area formed as a raised portion to generating a reverse squish flow when the piston is moved from a compression stroke to a subsequent expansion stroke, and a central area formed as a concave portion, and the control means is operable to control the fuel injection valve in such a manner as to inject fuel in a compression stroke. The concave portion formed in the central area of the crown surface of the piston can ensure a flying distance of injected fuel, and form a reverse squish in an initial stage of an expansion stroke. Thus, the combustion time can be reduced to prevent knock and maximize thermal efficiency so as to suppress a combustion loss so as to contribute to increase in torque and enhancement in fuel economy. In addition, in an engine operation zone having the effective compression ratio set at 13 or more, the concave portion can contribute to creation of a cool-flame reaction in a combustion chamber after a compression TDC to serve as a means to provide higher engine power.

Preferably, in the above engine in each aspect of the present invention, the intake port is provided with a port fuel injection valve adapted to variously change a fuel injection timing according to control of the control means, and the control means is operable, in a low/medium-load operation zone within the low speed range, to reduce the effective compression ratio to less than 13, and set the ignition timing to a point within the predetermined stroke range just after just after a top dead center of a compression stroke.

Further, in the above engine having the port fuel injection valve, each of the cylinders of the engine body is preferably provided with a piston having a piston crown surface with a central area formed as a concave portion. In an engine operation zone having the effective compression ratio set at 13 or more, the concave portion can contribute to creation of a cool-flame reaction in a combustion chamber after a compression TDC to serve as a means to provide higher engine power.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

This application is based on Japanese Patent Application Serial Nos. 2006-100952, 2006-100954, 2007-039897 and 2007-039898, filed in Japan Patent Office on, respectively, Mar. 31, 2006, Mar. 31, 2006, Feb. 20, 2007 and Feb. 20, 2007, the contents of which are hereby incorporated by reference.

What is claimed is:

1. A spark-ignition gasoline engine having at least a spark plug and using a fuel having a research octane number (RON) of 91 or more, comprising: an engine body having a geometrical compression ratio set at 13.5 or more, said engine body being operated using a fuel having a research octane number (RON) of 91 or more; an intake valve and an exhaust valve which are provided, respectively, in intake and exhaust ports connected to each of a plurality of cylinders of said engine body, said intake and exhaust valves being adapted to open and close corresponding ones of said intake and exhaust ports; operation-state detection means adapted to detect an operation state of said engine body; and control means adapted, based on detection of said operation-state detection means, to perform at least an adjustment control of an ignition timing of said spark plug, said control means being operable, when the engine operation zone is a high load operation zone including a wide open throttle region, within at least a low speed range, to retard said ignition timing to a point within a predetermined stroke range just after a top dead center of a compression stroke.

2. The spark-ignition gasoline engine as defined in claim 1, wherein said control means is operable, in the engine speed zone equal to or higher than a medium speed range, to change the ignition timing to a point before the top dead center of the compression stroke.

3. A spark-ignition gasoline engine having at least a spark plug, comprising:
an engine body having a geometrical compression ratio set at 14 or more;
an intake valve and an exhaust valve which are provided, respectively, in intake and exhaust ports connected to each of a plurality of cylinders of said engine body, said intake and exhaust valves being adapted to open and close corresponding ones of said intake and exhaust ports;
operation-state detection means adapted to detect an operation state of said engine body; and
control means adapted, based on detection of said operation-state detection means, to perform at least an adjustment control of an ignition timing of said spark plug, said control means being operable, when an engine operation zone is a high-load operation zone including a wide open throttle region within at least a low speed range, retard said ignition timing to a point within a predetermined stroke range just after a top dead center of a compression stroke.

4. The spark-ignition gasoline engine as defined in claim 3, wherein said engine body is operated using a fuel having a research octane number (RON) of 100 or more, wherein an upper limit of the geometrical compression ratio of said engine body is 16.5.

5. The spark-ignition gasoline engine as defined in claim 3, wherein said control means is operable, in the engine speed zone equal to or higher than a medium speed range, to change the ignition timing to a point before the top dead center of the compression stroke.

6. The spark-ignition gasoline engine as defined in claim 3, which includes a fuel injection valve adapted to variably change a fuel injection liming according to control of said control means, wherein said control means is operable, when the engine operation zone is a medium/high-load operation zone ranging from at least a given medium-load operation zone to the wide open throttle region within the low speed range, to perform a split injection control of allowing said fuel injection valve to inject fuel at a plurality of times at predetermined timings within an intake stroke and a subsequent compression stroke.

7. The spark-ignition gasoline engine as defined in claim 3, which includes in-cylinder temperature estimation means for estimating an in-cylinder temperature in said engine body, wherein said control means is operable to detect a cold-start operation based on the in-cylinder temperature estimated by said in-cylinder temperature estimation means, and control the closing timing of said intake valve in such a manner to increase the effective compression ratio and ensure a sufficient amount of in-cylinder air.

8. The spark-ignition gasoline engine as defined in claim 3, which includes engine-acceleration detection means for detecting an engine-acceleration operation, wherein said control means is operable, based on the detection of said engine-acceleration detection means, to detect a rapid engine-acceleration operation from a low-load operation zone, and retard the ignition timing directly to an allowable maximum point within said predetermined stroke range just after a top dead center of a compression stroke.

9. The spark-ignition gasoline engine as defined in claim 3, which includes a fuel injection valve adapted to variably change a fuel injection timing according to control of said control means, said fuel injection valve being a direct fuel injection-type adapted to inject fuel toward and around an electrode of said spark plug, wherein: said engine body includes a piston with a piston crown surface which has an peripheral area formed as a raised portion to generating a reverse squish flow when said piston is moved from a compression stroke to a subsequent expansion stroke, and a central area formed as a concave portion; and said control means is operable to control said fuel injection valve in such a manner as to inject fuel in a compression stroke.

10. The spark-ignition gasoline engine as defined in claim 3, wherein: each of said cylinders of said engine body is provided with a piston having a piston crown surface with a central area formed as a concave portion.

11. The spark-ignition gasoline engine as defined in claim 3, wherein said engine body is operated using a fuel having a research octane number (RON) of 96 or more.

12. The spark-ignition gasoline engine as defined in claim 11, wherein an upper limit of the geometrical compression ratio of said engine body is 16.

13. The spark-ignition gasoline engine as defined in claim 3, which includes an external EGR system adapted to adjustably change an amount of external EGR gas to be introduced into each of the cylinders according to control of said control means, wherein said control means is operable, when the engine operation zone is the high-load operation zone including the wide open throttle region within at least the low speed range, to allow said external EGR system to introduce external EGR gas.

14. The spark-ignition gasoline engine as defined in claim 13, wherein said control means is operable, in at least a low-speed/low-load operation zone, to allow said external EGR system to introduce external EGR gas.

15. The spark-ignition gasoline engine as defined in claim 3, which includes combustion-time reduction means adapted, when the ignition timing is retarded to a point after a top dead center of a compression stroke, to reduce a combustion time of an air-fuel mixture.

16. The spark-ignition gasoline engine as defined in claim 15, wherein said spark plug is provided in a plural number to each of said cylinders, and said combustion-time reduction means includes multipoint ignition means adapted to activate said plural number of spark plugs.

17. The spark-ignition gasoline engine as defined in claim 15, wherein said combustion-time reduction means includes turbulence generation means for generating turbulences in each of the cylinders.

18. The spark-ignition gasoline engine as defined in claim 17, wherein an upper limit of the geometrical compression ratio of said engine body is 15.5.

19. The spark-ignition gasoline engine as defined in claim 3, wherein said control means is operable, in at least a low-speed/low-load operation zone, to shift the close timing of said intake valve relative to a bottom dead center of an intake stroke by a predetermined amount so as to reduce the effective compression ratio.

20. The spark-ignition gasoline engine as defined in claim 19, which includes an EGR system adapted to introduce EGR gas into each of the cylinders according to control of said control means, wherein said control means is operable, in at least said low-speed/low-load operation zone, to allow said EGR system to introduce EGR gas.

21. The spark-ignition gasoline engine as defined in claim 20, wherein said control means is operable, in said low-speed/low-load operation zone, to set an air/fuel ratio at a stoichiometric value.

* * * * *